United States Patent
Nakajima et al.

(10) Patent No.: US 9,617,942 B2
(45) Date of Patent: Apr. 11, 2017

(54) CONTROL DEVICE FOR INTERNAL COMBUSTION ENGINE BASED ON IN-CYLINDER TEMPERATURE AND OXYGEN CONCENTRATION

(71) Applicants: Toshiya Nakajima, Susono (JP); Koji Kitano, Susono (JP); Isamu Gotou, Susono (JP); Naoki Suzuki, Susono (JP)

(72) Inventors: Toshiya Nakajima, Susono (JP); Koji Kitano, Susono (JP); Isamu Gotou, Susono (JP); Naoki Suzuki, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 136 days.

(21) Appl. No.: 14/646,537

(22) PCT Filed: Nov. 22, 2013

(86) PCT No.: PCT/JP2013/081491
§ 371 (c)(1),
(2) Date: May 21, 2015

(87) PCT Pub. No.: WO2014/081009
PCT Pub. Date: May 30, 2014

(65) Prior Publication Data
US 2015/0300283 A1   Oct. 22, 2015

(30) Foreign Application Priority Data

Nov. 26, 2012 (JP) ................................ 2012-257180
Dec. 5, 2012 (JP) ................................ 2012-266032
Apr. 16, 2013 (JP) ................................ 2013-086137

(51) Int. Cl.
*F02D 41/30* (2006.01)
*F02D 41/14* (2006.01)
(Continued)

(52) U.S. Cl.
CPC ............. *F02D 41/30* (2013.01); *F02D 21/04* (2013.01); *F02D 35/023* (2013.01);
(Continued)

(58) Field of Classification Search
CPC ......... F02D 2200/021; F02D 2200/022; F02D 2200/0414; F02D 2200/0611;
(Continued)

(56) References Cited

U.S. PATENT DOCUMENTS

| 6,283,096 B1 | 9/2001 | Kimura |
| 2004/0261414 A1 | 12/2004 | Araki |
| 2009/0048762 A1* | 2/2009 | Kang ................... F02M 26/01 701/103 |

FOREIGN PATENT DOCUMENTS

| EP | 1 925 799 A2 | 5/2008 |
| JP | 11-107820 | 4/1999 |

(Continued)

*Primary Examiner* — Erick Solis
*Assistant Examiner* — Robert Werner
(74) *Attorney, Agent, or Firm* — Finnegan, Henderson, Farabow, Garrett & Dunner, LLP

(57) ABSTRACT

A control device 100 for an internal combustion engine includes an in-cylinder oxygen concentration acquisition unit configured to acquire an in-cylinder oxygen concentration, an in-cylinder temperature acquisition unit configured to acquire an in-cylinder temperature, a target in-cylinder temperature acquisition unit configured to acquire a target in-cylinder temperature during main injection based on the in-cylinder oxygen concentration acquired by the in-cylinder oxygen concentration acquisition unit, and an in-cylinder oxygen concentration control unit configured to execute (Continued)

in-cylinder oxygen concentration control for controlling an in-cylinder oxygen concentration during pilot injection performed prior to the main injection based on the difference between the target in-cylinder temperature during the main injection acquired by the target in-cylinder temperature acquisition unit and the in-cylinder temperature acquired by the in-cylinder temperature acquisition unit.

8 Claims, 25 Drawing Sheets

(51) Int. Cl.
    *F02D 41/40*     (2006.01)
    *F02D 41/20*     (2006.01)
    *F02D 21/04*     (2006.01)
    *F02D 41/18*     (2006.01)
    *F02D 35/02*     (2006.01)
    *F02D 41/00*     (2006.01)
    *F02M 26/00*     (2016.01)

(52) U.S. Cl.
    CPC ....... *F02D 35/026* (2013.01); *F02D 41/0007* (2013.01); *F02D 41/0052* (2013.01); *F02D 41/1456* (2013.01); *F02D 41/1458* (2013.01); *F02D 41/18* (2013.01); *F02D 41/20* (2013.01); *F02D 41/403* (2013.01); *F02D 2200/0414* (2013.01); *F02D 2200/0611* (2013.01); *F02M 26/00* (2016.02); *Y02T 10/144* (2013.01); *Y02T 10/44* (2013.01); *Y02T 10/47* (2013.01)

(58) Field of Classification Search
    CPC ........... F02D 2200/101; F02D 41/1441; F02D 41/1454; F02D 41/1458; F02D 41/18; F02D 41/401; F02D 41/403; F02D 41/052; F02D 9/02; F02D 2009/0213; F02D 2009/0225; F02D 2009/0235; F02D 35/0007; F02D 35/025; F02D 35/026
    USPC .................. 123/299, 435; 701/103–105, 109
    See application file for complete search history.

(56) References Cited

FOREIGN PATENT DOCUMENTS

| | | |
|---|---|---|
| JP | 2004-308440 | 11/2004 |
| JP | 2005-48692 | 2/2005 |
| JP | 2008-133738 | 6/2008 |
| JP | 2008-255832 | 10/2008 |
| JP | 2009-221934 | 10/2009 |
| JP | 2009-257248 | 11/2009 |
| JP | 2010-24908 | 2/2010 |
| JP | 2010-151058 | 7/2010 |
| JP | 2010-209793 | 9/2010 |
| JP | 2012-67731 | 4/2012 |

* cited by examiner

FIG. 4
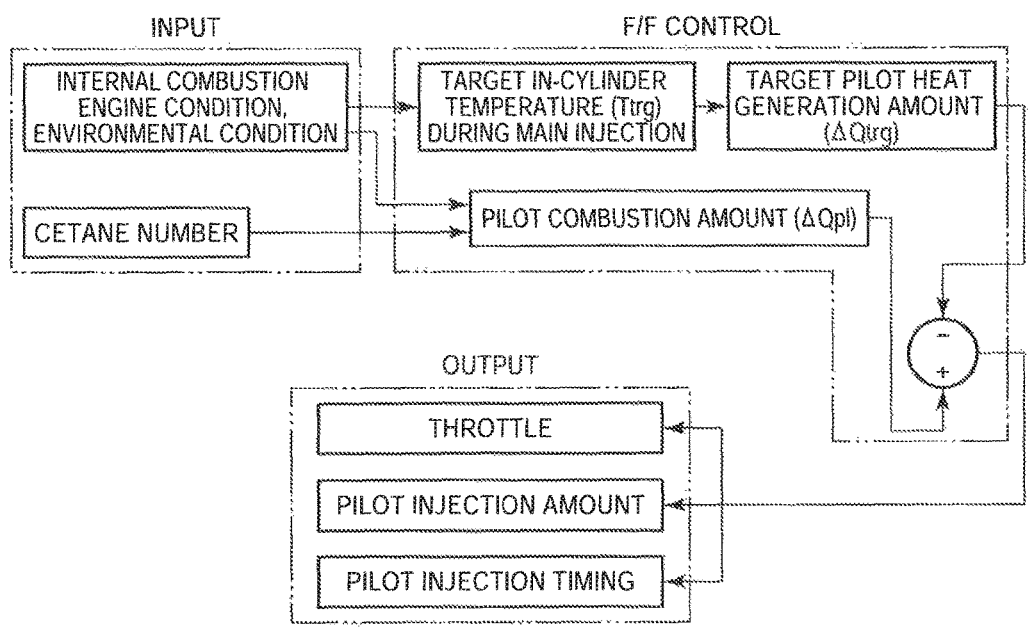
(a)
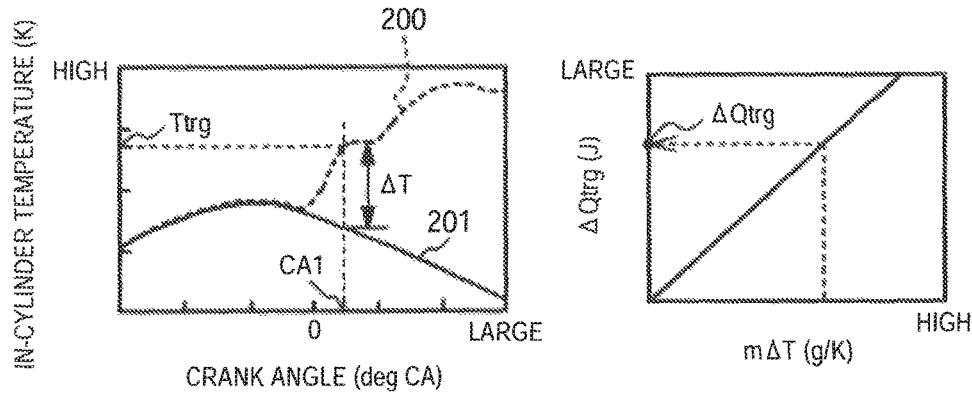
(b)  (c)

FIG. 11
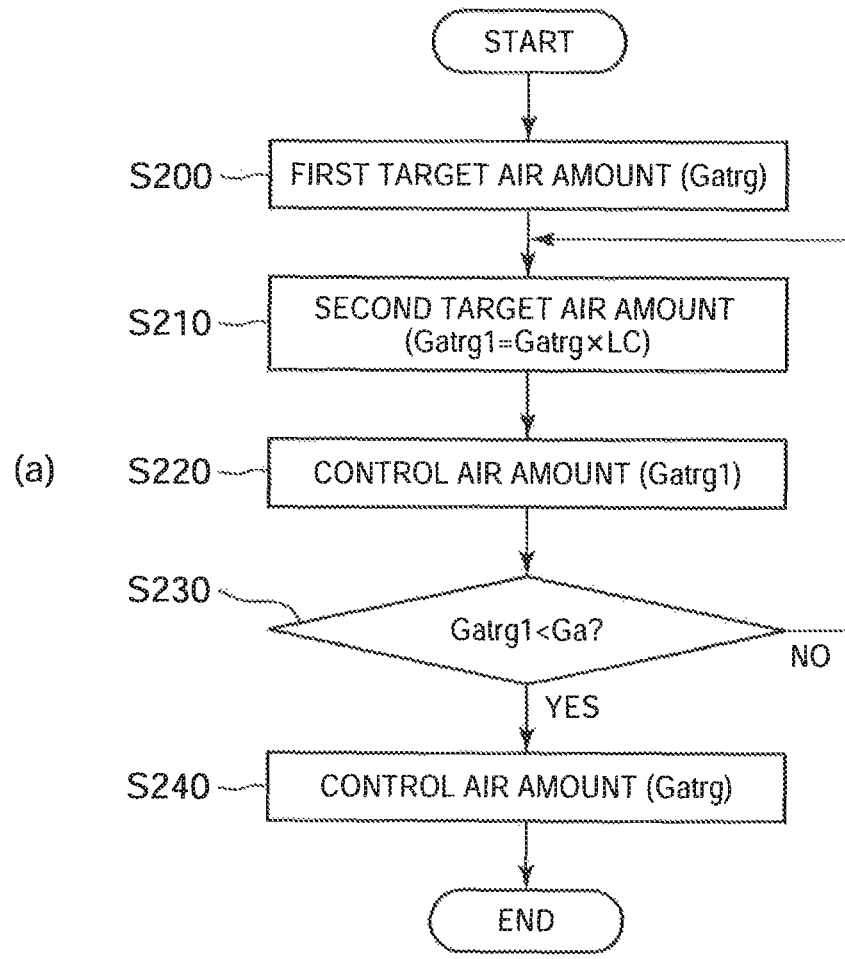
(a)
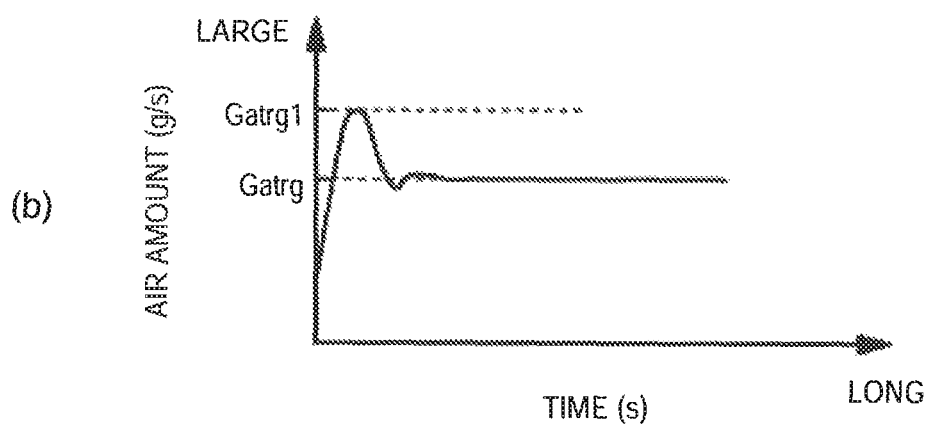
(b)

FIG. 12
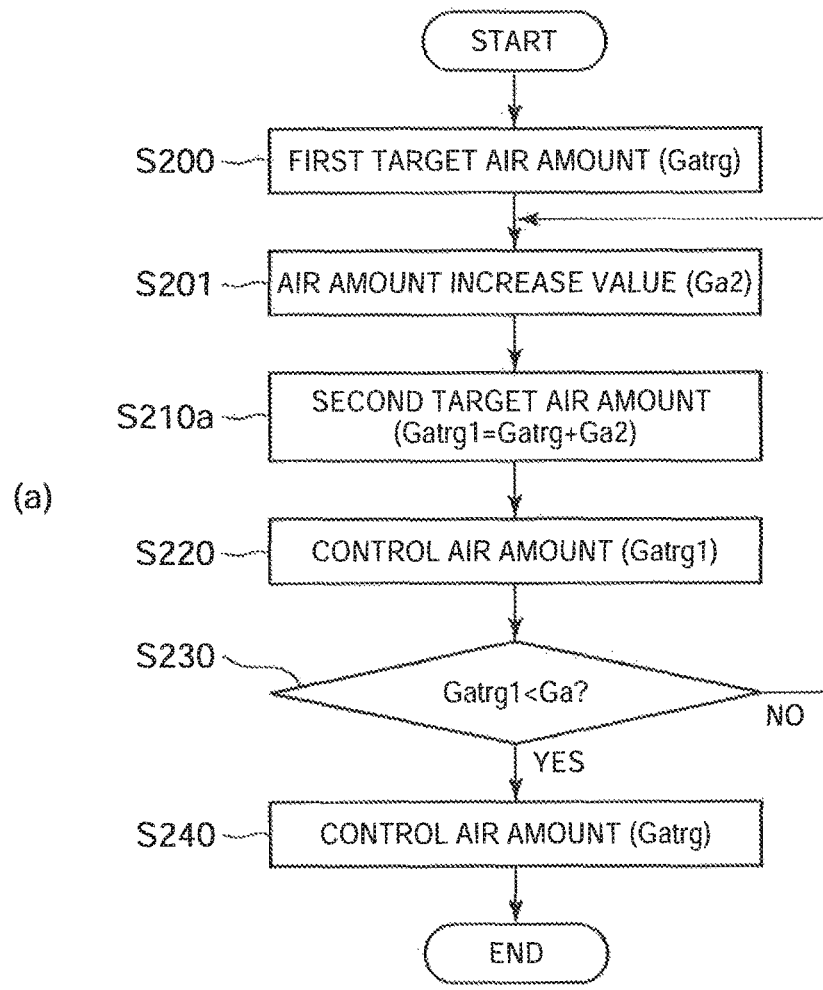
(a)
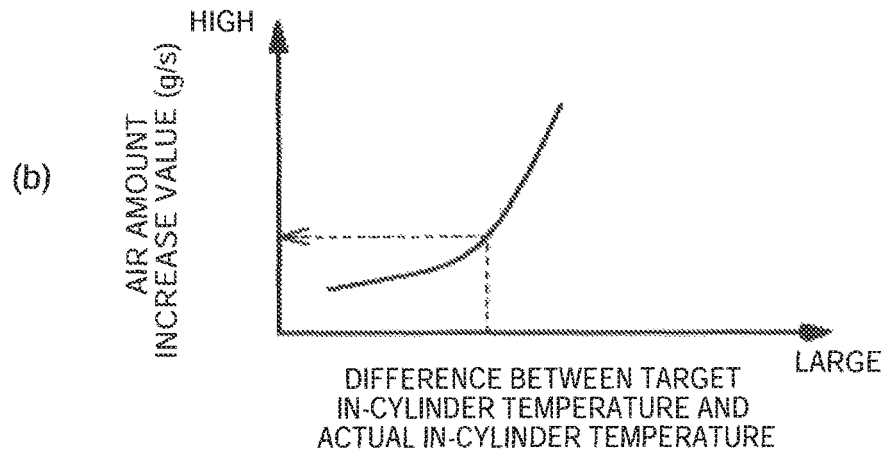
(b)

FIG. 14
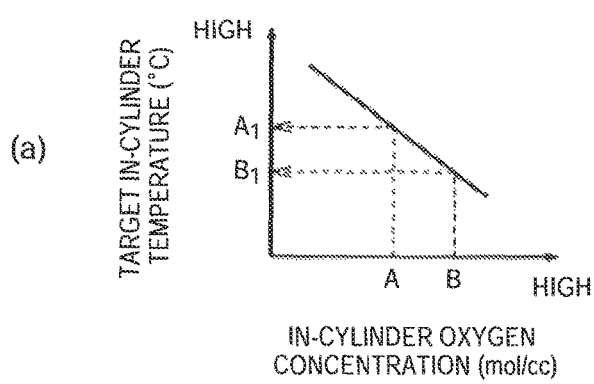
(a)
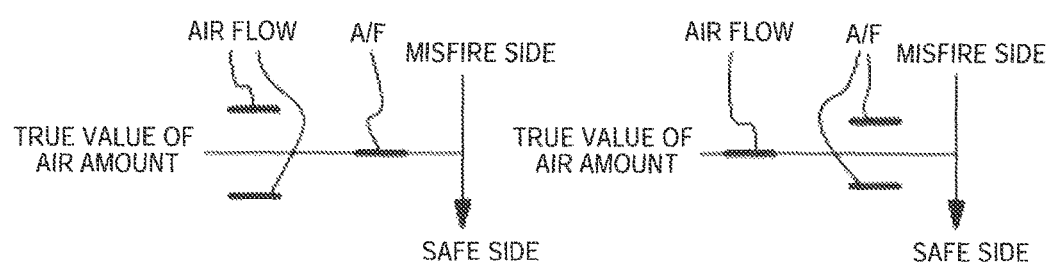
(b)　　　　　　　　　(c)

CONTROL DEVICE FOR INTERNAL COMBUSTION ENGINE BASED ON IN-CYLINDER TEMPERATURE AND OXYGEN CONCENTRATION

CROSS-REFERENCE TO RELATED APPLICATIONS

This application is a national phase application of International Application No. PCT/JP2013/081491, filed Nov. 22, 2013, and claims the priority of Japanese Application Nos. 2012-257180, filed Nov. 26, 2012, 2012-266032, filed Dec. 5, 2012, and 2013-086137, filed Apr. 16, 2013, the content of all of which is incorporated herein by reference.

TECHNICAL FIELD

The invention relates to a control device for an internal combustion engine.

BACKGROUND ART

In the related art, control devices for internal combustion engines that perform pilot injection prior to main injection are known as control devices for internal combustion engines. For example, PTL 1 discloses, as one of such control devices, a control device that controls pilot injection based on the cetane number of a fuel so that the initiation of fuel combustion during the pilot injection precedes the initiation of combustion of the fuel for the main injection.

CITATION LIST

Patent Literature

PTL 1: Japanese Patent Application Publication No. 2004-308440 (JP 2004-308440 A)

SUMMARY OF THE INVENTION

In the case of the technique according to PTL 1, the cetane number that can be applied to the control device needs to be set in advance and the pilot injection needs to be performed within the range of the initially-set cetane number. Accordingly, it is difficult to appropriately control the pilot injection with the technique according to PTL 1 in a case where a fuel having a cetane number that is lower than the initially-set cetane number is used. Accordingly, the combustion state of the internal combustion engine may be deteriorated in a case where a fuel having a low cetane number is used according to the technique disclosed in PTL 1.

The invention is to provide a control device for an internal combustion engine that is capable of suppressing deterioration of the combustion state of an internal combustion engine even in a case where a fuel having a low cetane number is used.

A control device for an internal combustion engine according to the invention includes an in-cylinder oxygen concentration acquisition unit configured to acquire an in-cylinder oxygen concentration as the oxygen concentration in a cylinder of the internal combustion engine, an in-cylinder temperature acquisition unit configured to acquire an in-cylinder temperature as the temperature in the cylinder, a target in-cylinder temperature acquisition unit configured to acquire a target in-cylinder temperature during main injection based on the in-cylinder oxygen concentration acquired by the in-cylinder oxygen concentration acquisition unit, and an in-cylinder oxygen concentration control unit configured to execute in-cylinder oxygen concentration control for controlling an in-cylinder oxygen concentration during pilot injection performed prior to the main injection based on the difference between the target in-cylinder temperature during the main injection acquired by the target in-cylinder temperature acquisition unit and the in-cylinder temperature acquired by the in-cylinder temperature acquisition unit.

According to the control device for an internal combustion engine of the invention, the difference between the target in-cylinder temperature and the in-cylinder temperature during the main injection can be decreased. Accordingly, deterioration of the combustion state of the internal combustion engine can be suppressed even in a case where a fuel having a low cetane number is used as a fuel of the internal combustion engine.

In the configuration described above, the target in-cylinder temperature acquisition unit may decrease the acquired target in-cylinder temperature as the in-cylinder oxygen concentration acquired by the in-cylinder oxygen concentration acquisition unit increases.

The amount of heat generation resulting from the combustion in the cylinder increases as the in-cylinder oxygen concentration increases, and thus the in-cylinder temperature also rises. Accordingly, the target in-cylinder temperature may decrease as the in-cylinder oxygen concentration increases. Accordingly, an appropriate target in-cylinder temperature in accordance with the in-cylinder oxygen concentration can be acquired according to this configuration.

In the configuration described above, the target in-cylinder temperature acquisition unit may increase the acquired target in-cylinder temperature as the cetane number of a fuel used in the internal combustion engine decreases.

It is preferable that the target in-cylinder temperature is high because ignitability decreases as the cetane number decreases. Accordingly, an appropriate target in-cylinder temperature in accordance with the cetane number can be acquired according to this configuration.

In the configuration described above, the internal combustion engine may be provided with a throttle arranged in an intake passage and an EGR valve arranged in an EGR passage, and the in-cylinder oxygen concentration control unit may control the EGR valve to be closed after decreasing a throttle amount in a case where the in-cylinder oxygen concentration during the pilot injection is increased, the EGR valve is open, and the throttle amount of the throttle exceeds a predetermined value.

In a case where the in-cylinder oxygen concentration during the pilot injection is increased, the EGR valve is open, the throttle amount of the throttle exceeds a predetermined value, and the EGR valve is closed without decreasing the throttle amount of the throttle, a side of the intake passage further downstream from the throttle may have a negative pressure and a misfire may occur as a result thereof. According to this configuration, however, the occurrence of the misfire can be suppressed because the EGR valve is controlled to be closed after the throttle amount is decreased in a case where the EGR valve is open and the throttle amount of the throttle exceeds a predetermined value.

In the configuration described above, the in-cylinder oxygen concentration control unit may execute the in-cylinder oxygen concentration control in a case where the octane number of the fuel used in the internal combustion engine is equal to or less than a predetermined value.

The configuration described above may further include an additional injection amount control unit configured to control an additional injection amount as the amount of fuel injection during additional injection after the main injection in accordance with an increment in the in-cylinder oxygen concentration during the execution of the in-cylinder oxygen concentration control. According to this configuration, the additional injection amount during the additional injection can be controlled in accordance with the increment in the in-cylinder oxygen concentration even in a case where the in-cylinder oxygen concentration increases during the execution of the in-cylinder oxygen concentration control. Accordingly, a reduction in exhaust gas temperature resulting from an increase in the in-cylinder oxygen concentration can be supplemented by a rise in the exhaust gas temperature caused by the additional injection. As a result, a reduction in the performance of an exhaust gas control apparatus of the internal combustion engine can be suppressed, and thus deterioration of exhaust gas emission can be suppressed.

In the configuration described above, the in-cylinder oxygen concentration control unit may allow the in-cylinder oxygen concentration during the pilot injection to be higher in a case where the in-cylinder temperature acquired by the in-cylinder temperature acquisition unit is lower than the target in-cylinder temperature during the main injection calculated by the target in-cylinder temperature calculation unit than in a case where the in-cylinder temperature is equal to or higher than the target in-cylinder temperature.

In the configuration described above, the in-cylinder oxygen concentration control unit may increase the amount of air flowing into the cylinder in increasing the in-cylinder oxygen concentration during the pilot injection.

According to the invention, it is possible to provide a control device for an internal combustion engine that is capable of suppressing deterioration of the combustion state of an internal combustion engine even in a case where a fuel having a low cetane number is used.

BRIEF DESCRIPTION OF THE DRAWINGS

FIG. 4(a) is a functional block diagram of a control device for a case where the control device controls a throttle, a pilot injection amount, and pilot injection timing, and FIGS. 4(b) and 4(c) are diagrams for showing a technique for calculating a target pilot heat generation amount ($\Delta Qtrg$).

FIG. 11(a) is a diagram illustrating an example of a flowchart for air amount control by a control device according to a third embodiment during the execution of in-cylinder oxygen concentration control, and FIG. 11(b) is a diagram schematically illustrating a time-dependant change in the amount of air flowing into a cylinder during the execution of the in-cylinder oxygen concentration control according to the third embodiment.

FIG. 12(a) is a diagram illustrating an example of a flowchart for air amount control by a control device according to a first modification example of the third embodiment during the execution of in-cylinder oxygen concentration control, and FIG. 12(b) is a diagram visualizing a map of an air amount increase value.

FIG. 14(a) is a diagram visualizing a map that is used when a target in-cylinder temperature is acquired based on an in-cylinder oxygen concentration, FIG. 14(b) is a diagram schematically illustrating the presence or absence of a misfire in the case of degradation of an air flow sensor, and FIG. 14(c) is a diagram schematically illustrating the presence or absence of a misfire in the case of degradation of an A/F sensor.

MODES FOR CARRYING OUT THE INVENTION

Hereinafter, embodiments of the invention will be described.

First Embodiment

Figure 1:
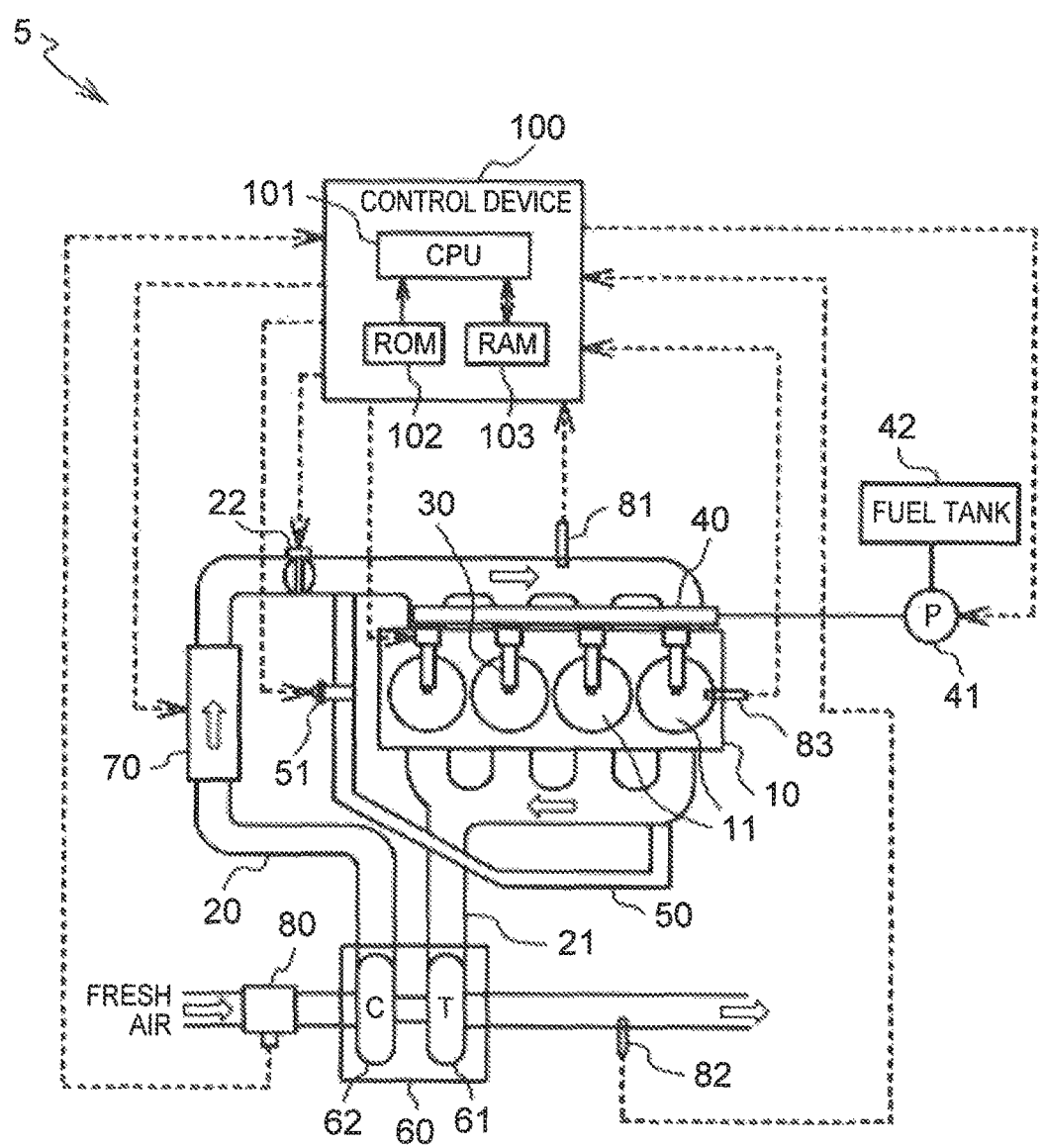
FIG. 1 is a schematic diagram illustrating an example of an internal combustion engine according to a first embodiment.

A control device (hereinafter, referred to as a control device 100) for an internal combustion engine according to a first embodiment of the invention will be described. An example of the configuration of the internal combustion engine to which the control device 100 is applied will be described first and then the control device 100 will be described in detail. FIG. 1 is a schematic diagram illustrating an example of an internal combustion engine 5 to which the control device 100 is applied. The internal combustion engine 5 that is illustrated in FIG. 1 is mounted on a vehicle. In this embodiment, a compression ignition-type internal combustion engine is used as an example of the internal combustion engine 5. The internal combustion engine 5 is provided with an engine main body 10, an intake passage 20 an exhaust passage 21, a throttle 22, a fuel injection valve 30, a common rail 40, a pump 41, an exhaust gas recirculation (EGR) passage 50, an EGR valve 51, a supercharger 60, an intercooler 70, various sensors, and the control device 100.

The engine main body 10 has a cylinder block where a cylinder 11 is formed, a cylinder head that is arranged in an upper portion of the cylinder block, and a piston that is arranged in the cylinder 11. In this embodiment, a plurality of (specifically, four) the cylinders 11 are provided. The intake passage 20 branches on a downstream side to be connected to the respective cylinders 11. Fresh air flows in from an upstream side end portion of the intake passage 20. The exhaust passage 21 branches on an upstream side to be connected to the respective cylinders 11. The throttle 22 is arranged in the intake passage 20. The throttle 22 is opened and closed in response to an instruction from the control device 100 so that the amount of air introduced into the cylinders 11 is adjusted.

Piping allows the fuel injection valve 30, the common rail 40, and the pump 41 to communicate with each other. A fuel that is stored in a fuel tank 42 (diesel oil is used as the fuel in this embodiment) is pumped by the pump 41, supplied to the common rail 40, is increased in pressure in the common rail 40, and then is supplied to the fuel injection valve 30. In this embodiment, a plurality of the fuel injection valves 30 are arranged in the engine main body 10 so as to directly inject the fuel to the respective cylinders 11. Places where the fuel injection valves 30 are arranged are not limited to those of the configuration illustrated in FIG. 1. For example, the fuel injection valves 30 may be arranged to inject the fuel to the intake passage 20.

The EGR passage 50 is a passage for recirculating part of exhaust gas discharged from the cylinders 11 to the cylinders 11. Hereinafter, the exhaust gas introduced into the cylinders 11 will be referred to as EGR gas. The EGR passage 50 according to this embodiment connects the middle of the passage of the intake passage 20 and the middle of the passage of the exhaust passage 21 to each other. The EGR valve 51 is arranged in the EGR passage 50. The EGR valve 51 is opened and closed in response to an instruction from the control device 100 so that the amount of the EGR gas is adjusted.

The supercharger 60 is a device that compresses air which is suctioned into the internal combustion engine 5. The supercharger 60 according to this embodiment is provided with a turbine 61 that is arranged in the exhaust passage 21 and a compressor 62 that is arranged in the intake passage 20. The turbine 61 and the compressor 62 are connected to each other by a connecting member. In a case where the turbine 61 rotates in response to a force from the exhaust gas that passes through the exhaust passage 21, the compressor 62 that is connected to the turbine 61 also rotates. The air in the intake passage 20 is compressed as a result of the rotation of the compressor 62. Then, the air that flows into the cylinders 11 is supercharged. The intercooler 70 is arranged on a side of the intake passage 20 further downstream from the compressor 62 and further upstream from the throttle 22. A refrigerant is introduced into the intercooler 70. The intercooler 70 cools the air in the intake passage 20 by using the refrigerant that is introduced into the intercooler 70. The flow rate of the refrigerant that is introduced into the intercooler 70 is controlled by the control device 100.

In FIG. 1, an air flow sensor 80, a temperature sensor 81, an A/F sensor 82, and an in-cylinder pressure sensor 83 are illustrated as examples of the various sensors. The air flow sensor 80 is arranged on a side of the intake passage 20 further upstream from the compressor 62. The air flow sensor 80 detects the amount of the air (g/s) in the intake passage 20 and transmits the result of the detection to the control device 100. The control device 100 acquires the amount of the air flowing into the cylinders 11 based on the detection result from the air flow sensor 80. The temperature sensor 81 is arranged at a site of the intake passage 20 on a further downstream side from the throttle 22. The temperature sensor 81 detects the temperature of the air in the intake passage 20 and transmits the result of the detection to the control device 100. The A/F sensor 82 is arranged at a site of the exhaust passage 21 on a further downstream side from the turbine 61. The A/F sensor 82 detects the air-fuel ratio (A/F) of the exhaust gas in the exhaust passage 21 and transmits the result of the detection to the control device 100. The in-cylinder pressure sensor 83 is arranged in the engine main body 10. The in-cylinder pressure sensor 83 detects an in-cylinder pressure, which is the pressure in the cylinder 11, and transmits the result of the detection to the control device 100. The internal combustion engine 5 is provided with various other sensors, such as a crank position sensor, in addition to these sensors.

The control device 100 is a device that controls the internal combustion engine 5. In this embodiment, an electronic control unit that is provided with a central processing unit (CPU) 101, a read only memory (ROM) 102, and a random access memory (RAM) 103 is used as an example of the control device 100. The CPU 101 is a device that executes control processing, computation processing, and the like. The ROM 102 and the RAM 103 are devices having the function of a storage unit for storing information required for the operation of the CPU 101. Each of the steps in each of the flowcharts (differential limitation) is executed by the CPU 101.

The control device 100 controls the fuel injection valves 30 to execute main injection. In addition, the control device 100 controls the fuel injection valves 30 to execute pilot injection for fuel injection prior to the main injection. In other words, the pilot injection is fuel injection that is performed prior to the main injection. When the pilot injection is executed, a rapid rise in combustion pressure and combustion temperature can be suppressed during the main injection. In addition, the control device 100 acquires an in-cylinder oxygen concentration that is the oxygen concentration in the cylinders 11, acquires an in-cylinder temperature that is the temperature in the cylinders 11, acquires a target in-cylinder temperature that is a target in-cylinder temperature for the main injection based on the in-cylinder oxygen concentration, and executes in-cylinder oxygen concentration control for controlling the in-cylinder oxygen concentration during the pilot injection based on the difference between the target in-cylinder temperature and the in-cylinder temperature. Details of the in-cylinder oxygen concentration control are as follows, which will be described with reference to a flowchart below.

Figure 2:
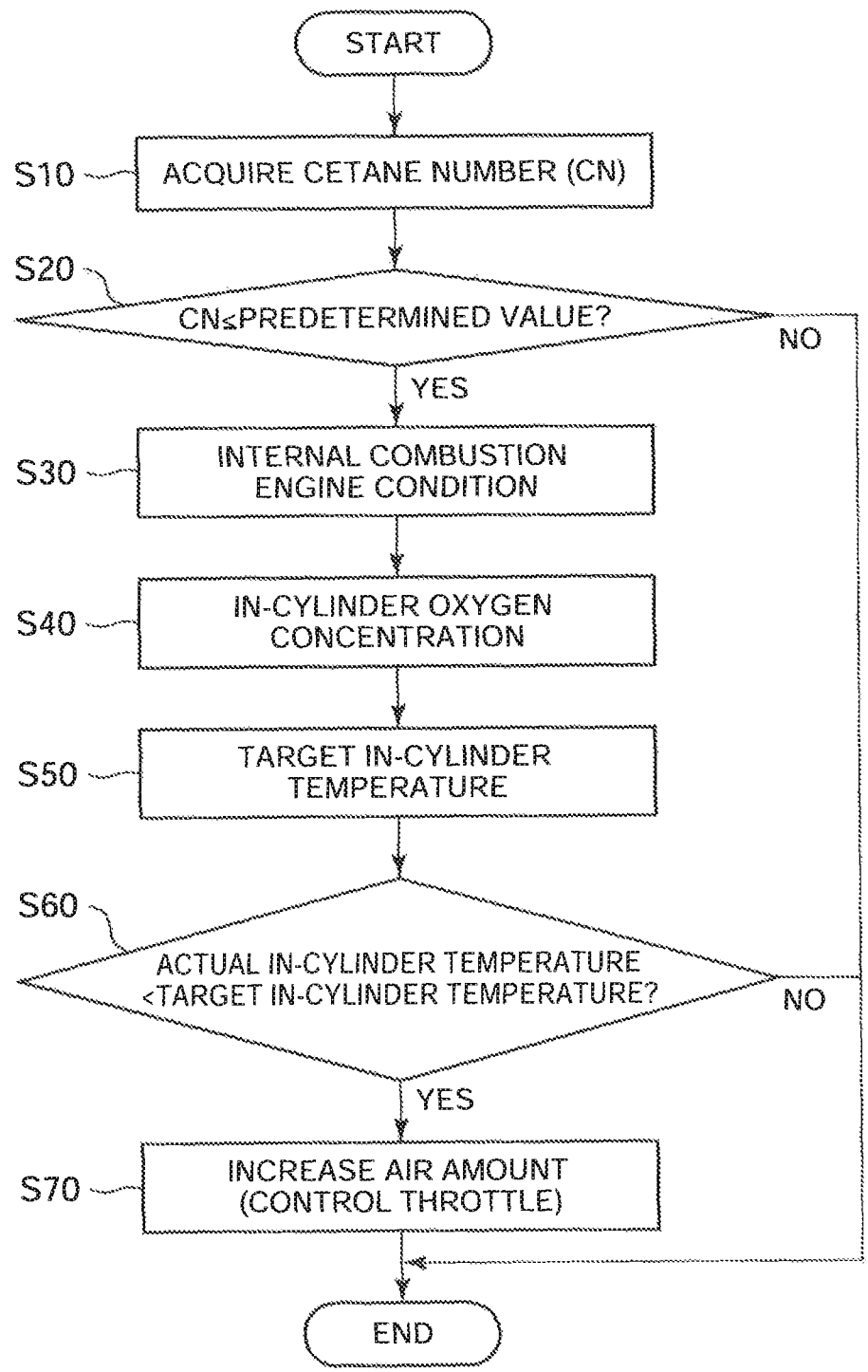
FIG. 2 is a diagram illustrating an example of a flowchart for the execution of in-cylinder oxygen concentration control by a control device according to the first embodiment.

FIG. 2 is a diagram illustrating an example of a flowchart for the execution of the in-cylinder oxygen concentration control by the control device 100. The control device 100 executes the flowchart in FIG. 2 during the execution of the pilot injection (more specifically, immediately before the execution of the pilot injection). The control device 100 repeatedly executes the flowchart in FIG. 2 at a predetermined cycle. The control device 100 acquires the cetane number (CN) of the fuel of the internal combustion engine 5 first (Step S10). Herein, the specific gravity and the cetane number of the fuel tend to be inversely proportional to each other, and thus the cetane number can be acquired based on the specific gravity of the fuel. In Step S10, the control device 100 according to this embodiment acquires the cetane number based on the specific gravity of the fuel. In this case, the internal combustion engine 5 is provided with a specific gravity sensor (not illustrated) that detects the specific gravity of the fuel in the fuel tank 42. A map associating the specific gravity and the cetane number of the fuel with each other is stored in the storage unit. In Step S10, the control device 100 acquires the cetane number by acquiring, from the map, a cetane number that corresponds to the specific gravity of the fuel which is detected by the specific gravity sensor. The specific method by which the control device 100 acquires a cetane number is not limited thereto, and known techniques can be used.

Then, the control device 100 determines whether or not the cetane number that is acquired in Step S10 is equal to or less than a predetermined value (Step S20). In this embodiment, a value at which a misfire occurs in the internal combustion engine 5 in a case where the cetane number is equal to or less than this predetermined value and the in-cylinder oxygen concentration control according to this embodiment is not executed is used as the predetermined value. In this embodiment, 48 is used as an example of the predetermined value. The specific value of the predetermined value is not limited thereto. The predetermined value is stored in the storage unit. In Step S20, the control device 100 determines whether or not the cetane number that is acquired in Step S10 is equal to or less than the predetermined value that is stored in the storage unit.

In the case of a negative determination (No) in Step S20, the control device 100 terminates the execution of the flowchart. In this case, the control device 100 controls the opening of the throttle 22 to a predetermined opening (hereinafter, this predetermined opening will be referred to as a normal value in some cases). In the case of a positive determination (Yes) in Step S20, the control device 100 acquires the condition of the internal combustion engine 5 (Step S30). The condition of the internal combustion engine 5 means the condition of the internal combustion engine 5 that is required for the calculation of the in-cylinder oxygen concentration in Step S40 (described later). In Step S30, the control device 100 according to this embodiment acquires the amount of the air flowing into the cylinders 11 and the volume of a combustion chamber at fuel injection timing as the conditions of the internal combustion engine 5. The control device 100 acquires the amount of the air flowing into the cylinders 11 based on the detection result from the air flow sensor 80. The control device 100 acquires the volume of the combustion chamber (space that is surrounded by the piston, the cylinder block, and the cylinder head) at the fuel injection timing based on the position of the piston at the fuel injection timing. The control device 100 acquires the position of the piston based on a crank angle that is detected by the crank position sensor.

Then, the control device 100 acquires the in-cylinder oxygen concentration that is the oxygen concentration in the cylinders 11 (Step S40). The control device 100 according to this embodiment acquires the mol concentration (mol/cc) of the oxygen in the cylinders 11 as the in-cylinder oxygen concentration. Specifically, the control device 100 acquires the mol concentration of the oxygen in the cylinders 11 based on the amount of the air flowing into the cylinders 11 and the volume of the combustion chamber at the fuel injection timing. More specifically, the control device 100 acquires the mol concentration of the oxygen in the cylinders 11 in accordance with the following equation (1) and by using the amount of the air flowing into the cylinders 11 and the volume of the combustion chamber at the fuel injection timing acquired in Step S30.

$$\text{Mol concentration of the oxygen in the cylinders } 11 = (\text{amount of the air flowing into the cylinders } 11 \times 0.23) \div (32 \times \text{volume of the combustion chamber at the fuel injection timing}) \quad (1)$$

The specific method by which the in-cylinder oxygen concentration is acquired is not limited thereto. For example, the control device 100 may acquire the in-cylinder oxygen concentration by using a map from which the in-cylinder oxygen concentration can be extracted. In addition, in a case where the internal combustion engine 5 is provided with a sensor that is capable of directly detecting the in-cylinder oxygen concentration, the control device 100 may acquire the in-cylinder oxygen concentration based on a detection result from this sensor.

Figure 3:
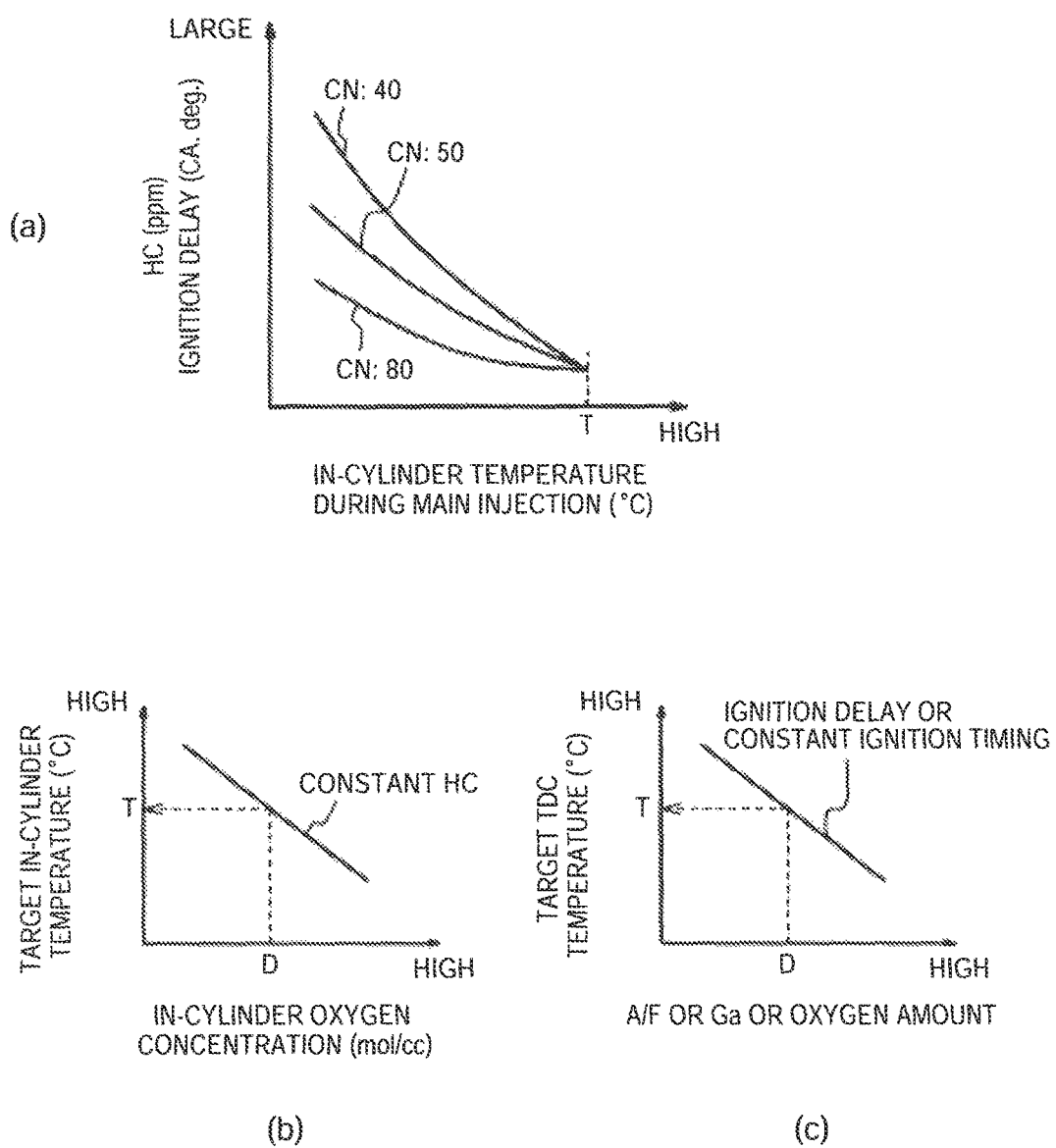
FIG. 3(a) is a schematic diagram illustrating a relationship among a cetane number, a combustion state index, and an in-cylinder temperature during main injection.
FIG. 3(b) is a diagram visualizing a map that is used when a target in-cylinder temperature is acquired based on an in-cylinder oxygen concentration.
FIG. 3(c) is a diagram visualizing a map that is used when a target TDC temperature is acquired based on an A/F, an air amount (Ga), or an in-cylinder oxygen amount.

Then, the control device 100 acquires the target in-cylinder temperature (Step S50) based on the in-cylinder oxygen concentration that is acquired in Step S40. Step S50 will be described with reference to FIGS. 3($a$) and 3($b$). FIG. 3($a$) is a schematic diagram illustrating a relationship among the cetane number, an index that shows the combustion state of the internal combustion engine 5 (hereinafter, referred to as a combustion state index in some cases), and the in-cylinder temperature during the main injection. The vertical axis in FIG. 3(a) represents the combustion state index. Specifically, the vertical axis represents the amount of hydrocarbon (HC) in the exhaust gas or the degree of ignition delay as an example of the combustion state index. The horizontal axis in FIG. 3(a) represents the in-cylinder temperature during the main injection.

In FIG. 3(a), a curve that shows the combustion state index of a case where a fuel having a cetane number (CN) of 40 is used, a curve that shows the combustion state index of a case where a fuel having a cetane number of 50 is used, and a curve that shows the combustion state index of a case where a fuel having a cetane number of 80 is used are illustrated. The cetane number is an index that shows ignitability. The higher the value, the easier ignition becomes. The lower the value, the higher the possibility of the ignition delay. When the ignition delay occurs, the HC amount increases. In FIG. 3(a), the vertical-axis value decreases, for each of the three curves, toward the right-hand side on the horizontal axis. The vertical-axis values of the three curves converge to a predetermined value when the in-cylinder temperature during the main injection is T (° C.).

As is apparent from FIG. 3(a), the ignition delay becomes less likely to occur and the HC amount decreases as the in-cylinder temperature during the main injection increases. As is apparent from FIG. 3(a), an in-cylinder temperature during the main injection (T° C.) at which the combustion state index is constant (specifically, the ignition delay is constant and the amount is also constant) regardless of the value of the cetane number is present.

In Step S50 in FIG. 2, the control device 100 according to this embodiment acquires the in-cylinder temperature during the main injection (T° C.) at which the combustion state index is constant regardless of the value of the cetane number as the target in-cylinder temperature. In the present application, being constant includes not only being constant in the strict sense of the word with the value not changing at all but also includes being within a constant range (that is, the fluctuation being within a predetermined range). Specifically, the control device 100 acquires the target in-cylinder temperature based on the in-cylinder oxygen concentration that is acquired in Step S40. FIG. 3(b) is a diagram visualizing a map that is used when the target in-cylinder temperature is acquired based on the in-cylinder oxygen concentration. The solid line illustrated in FIG. 3(b) (hereinafter, referred to as a reference line) represents the in-cylinder temperature during the main injection at which the HC amount is constant (including the case of being within a constant range) regardless of the value of the cetane number. FIG. 3(b) is a map in which the target in-cylinder temperature is defined in association with the in-cylinder oxygen concentration so that the acquired target in-cylinder temperature decreases as the in-cylinder oxygen concentration increases. The map of FIG. 3(b) is obtained in advance by an experiment, simulation, or the like and is stored in the storage unit.

In Step S50, the control device 100 acquires the target in-cylinder temperature by extracting the target in-cylinder temperature corresponding to the in-cylinder oxygen concentration that is acquired in Step S40 from the map in the storage unit. For example, the control device 100 acquires the T (° C.) as the target in-cylinder temperature in a case where the in-cylinder oxygen concentration that is acquired in Step S40 is D (mol/cc). The target in-cylinder temperature that is acquired in this manner is the in-cylinder temperature during the main injection (T° C.) at which the combustion state index (HC in this embodiment) is constant regardless of the value of the cetane number. The map that is used in Step S50 is not limited to FIG. 3(b). For example, the in-cylinder temperature during the main injection at which the degree of the ignition delay is constant (including the case of being within a constant range) regardless of the cetane number can also be used as the reference line that is illustrated in FIG. 3(b).

In Step S50, the control device 100 can also use the top dead center (TDC) temperature during the main injection at which the combustion state index is constant regardless of the cetane number (hereinafter, referred to as a target TDC temperature) as the target in-cylinder temperature. In addition, the control device 100 can also acquire the target TDC temperature not based on the in-cylinder oxygen concentration but based on the A/F, an air amount (Ga), or a in-cylinder oxygen amount. FIG. 3(c) is a diagram visualizing a map that is used when the target TDC temperature is acquired based on the A/F, the air amount (Ga), or the in-cylinder oxygen amount. The solid line (reference line) that is illustrated in FIG. 3(c) represents the target TDC temperature during the main injection at which the degree of the ignition delay or ignition timing is constant (including the case of being within a constant range) regardless of the cetane number. In this case, the control device 100 acquires the A/F, the air amount (Ga), or the in-cylinder oxygen amount in Step S40 in FIG. 2 and acquires the target TDC temperature corresponding to the value that is acquired in Step S40 from the map of FIG. 3(c) in Step S50. In Step S50, the control device 100 according to this embodiment does not use the map of FIG. 3(c). Instead, the target in-cylinder temperature is acquired by using the map of FIG. 3(b) described above.

Referring to FIG. 2, the control device 100 acquires the in-cylinder temperature after Step S50, and determines (Step S60) whether or not the acquired in-cylinder temperature is lower than the target in-cylinder temperature that is acquired in Step S50. In the following description, the in-cylinder temperature that is acquired in Step S60 will be referred to as an actual in-cylinder temperature. This actual in-cylinder temperature is the in-cylinder temperature at the present point in time. The specific method by which the actual in-cylinder temperature is acquired by the control device 100 is not particularly limited, and known techniques can be used. As an example, the control device 100 according to this embodiment estimates the actual in-cylinder temperature based on an index that has a correlation with the actual in-cylinder temperature. The control device 100 uses the temperature of the air in the intake passage 20 (air temperature) and the load of the internal combustion engine 5 as examples of the index. The higher the air temperature, the higher the actual in-cylinder temperature. The higher the load, the higher the actual in-cylinder temperature. In this case, a map in which the actual in-cylinder temperature is defined in association with the air temperature or the load (number of revolutions is used as an example of the load in this embodiment) is stored in the storage unit of the control device 100. The control device 100 acquires the air temperature in the intake passage 20 based on the detection result from the temperature sensor 81 and acquires the number of revolutions (rpm) of the internal combustion engine 5 based on the detection result from the crank position sensor. The control device 100 extracts the actual in-cylinder temperature from the map in the storage unit and based on the acquired air temperature and number of revolutions and acquires the extracted actual in-cylinder temperature as the actual in-cylinder temperature for Step S60.

The method by which the actual in-cylinder temperature is acquired by the control device 100 is not limited to the method described above. As another example, the control device 100 can also estimate the actual in-cylinder temperature based on the in-cylinder pressure that is detected by the in-cylinder pressure sensor 83 because the in-cylinder pressure and the actual in-cylinder temperature have a correlation. In a case where the internal combustion engine 5 is provided with a temperature sensor that is capable of directly detecting the actual in-cylinder temperature, the control device 100 can also acquire the actual in-cylinder temperature based on the detection result from the temperature sensor.

In the case of a negative determination in Step S60, the control device 100 terminates the execution of the flowchart. In this case, the control device 100 controls the opening of the throttle 22 to the normal value. In the case of a positive determination in Step S60, the control device 100 increases the in-cylinder oxygen concentration (Step S70). Specifically, the control device 100 controls the opening of the throttle 22 so that the amount of the air suctioned into the cylinders 11 increases. More specifically, the control device 100 decreases the throttle amount of the throttle 22 by controlling the opening of the throttle 22 to exceed the normal value and increases the amount of the air suctioned into the cylinders 11. As the air amount increases, the in-cylinder oxygen concentration during the pilot injection increases. As the in-cylinder oxygen concentration increases, the combustion in the cylinders 11 becomes active, and the actual in-cylinder temperature rises. Then, the difference between the target in-cylinder temperature and the actual in-cylinder temperature during the main injection can be decreased. In other words, Step S70 corresponds to the in-cylinder oxygen concentration control for controlling the in-cylinder oxygen concentration during the pilot injection so that the difference between the target in-cylinder temperature and the actual in-cylinder temperature during the main injection is decreased. Then, the control device 100 terminates the execution of the flowchart.

The CPU 101 of the control device 100 that acquires the in-cylinder oxygen concentration in Step S40 corresponds to an in-cylinder oxygen concentration acquisition unit that acquires the in-cylinder oxygen concentration. The CPU 101 of the control device 100 that acquires the target in-cylinder temperature in Step S50 corresponds to a target in-cylinder temperature acquisition unit. The CPU 101 of the control device 100 that acquires the actual in-cylinder temperature in Step S60 corresponds to an in-cylinder temperature acquisition unit that acquires the in-cylinder temperature. The CPU 101 of the control device 100 that executes the in-cylinder oxygen concentration control in Step S70 corresponds to an in-cylinder oxygen concentration control unit. Specifically, the CPU 101 of the control device 100 that executes Step S70 corresponds to the in-cylinder oxygen concentration control unit that allows the in-cylinder oxygen concentration during the pilot injection to be higher in a case where the in-cylinder temperature that is acquired by the in-cylinder temperature acquisition unit is exceeded by the target in-cylinder temperature during the main injection that is calculated by the target in-cylinder temperature calculation unit than in a case where the in-cylinder temperature is equal to or greater than the target in-cylinder temperature. In addition, the CPU 101 of the control device 100 that executes Step S70 corresponds to the in-cylinder oxygen concentration control unit that increases the amount of the air flowing into the cylinders 11 in increasing the in-cylinder oxygen concentration during the pilot injection.

According to the control device 100 of this embodiment, the execution of the in-cylinder oxygen concentration control allows the difference between the target in-cylinder temperature and the in-cylinder temperature (actual in-cylinder temperature) during the main injection to be decreased so that the in-cylinder temperature can become closer to the target in-cylinder temperature during the main injection. In this manner, deterioration of the combustion state of the internal combustion engine 5 can be suppressed even in a case where a fuel having a low cetane number is used as the fuel of the internal combustion engine 5. Specifically, according to the control device 100 of this embodiment, the HC of the internal combustion engine 5 can be constant. In addition, the occurrence of the misfire and deterioration of drivability can also be suppressed.

As described with reference to FIG. 3(*b*), the map that is used during the acquisition of the target in-cylinder temperature according to this embodiment is a map in which the in-cylinder oxygen concentration and the target temperature are defined in association with each other so that the acquired target in-cylinder temperature decreases as the in-cylinder oxygen concentration increases. Since the control device 100 acquires the target in-cylinder temperature by using this map, the control device 100 can decrease the value of the acquired target in-cylinder temperature as the in-cylinder oxygen concentration increases. In other words, the target in-cylinder temperature acquisition unit of the control device 100 decreases the value of the acquired target in-cylinder temperature as the in-cylinder oxygen concentration that is acquired by the in-cylinder oxygen concentration acquisition unit increases. Herein, the amount of the heat generated by the combustion in the cylinders 11 increases as the in-cylinder oxygen concentration increases, and thus the in-cylinder temperature also rises. Accordingly, the target in-cylinder temperature may decrease as the in-cylinder oxygen concentration increases. Accordingly, according to this configuration, an appropriate target in-cylinder temperature in accordance with the in-cylinder oxygen concentration can be acquired. As a result, the in-cylinder oxygen concentration control can be appropriately executed in accordance with the in-cylinder oxygen concentration. In this manner, deterioration of the combustion state of the internal combustion engine 5 can be effectively suppressed.

The control device 100 executes the in-cylinder oxygen concentration control (Step S70) in a case where the cetane number is equal to or less than a predetermined value (in the case of a positive determination in Step S20). According to this configuration, the in-cylinder oxygen concentration control can be executed in a case where a fuel having a low cetane number, which is likely to cause the combustion state of the internal combustion engine 5 to be deteriorated, is actually used.

The actual in-cylinder temperature can also be raised by increasing a pilot injection amount. As a result, the actual in-cylinder temperature can become closer to the target in-cylinder temperature. Accordingly, the control device 100 may raise the actual in-cylinder temperature by, for example, increasing the pilot injection amount (fuel injection amount during the pilot injection) instead of raising the in-cylinder oxygen concentration by controlling the throttle in Step S70. However, it is considered that allowing the actual in-cylinder temperature to become closer to the target in-cylinder temperature by controlling the in-cylinder oxygen concentration is the most effective because the in-cylinder oxygen concentration is considered to have the greatest effect on the combustion of the fuel in the cylinders. In addition, controlling the throttle 22 is considered to be the most effective in controlling the in-cylinder oxygen concentration. Accordingly, it is more preferable to control the throttle 22 in Step S70 as in this embodiment, than to control the pilot injection amount, in that the actual in-cylinder temperature can become closer to the target in-cylinder temperature more effectively.

Alternatively, the control device 100 can also control the throttle 22, the pilot injection amount, and pilot injection timing comprehensively in suppressing the deterioration of the combustion state of the internal combustion engine 5 in a case where a fuel having a low cetane number is used. Description of the control by the control device 100 in this case is as follows. FIG. 4(a) is a functional block diagram of the control device 100 for a case where the control device 100 controls the throttle 22, the pilot injection amount, and the pilot injection timing. The control device 100 acquires the condition of the internal combustion engine 5, a condition of the environment in which the internal combustion engine is used, and the cetane number as input information (INPUT).

The control device 100 executes feed forward control (F/F control) based on the acquired input information. Specifically, the control device 100 acquires a target in-cylinder temperature (Ttrg) during the main injection based on the condition of the internal combustion engine 5 and the environment condition. In addition, the control device 100 acquires a target pilot heat generation amount ($\Delta$Qtrg) based on the target in-cylinder temperature. In addition, the control device 100 acquires a pilot heat generation amount ($\Delta$Qpl) that is a heat generation amount during the execution of the pilot injection with a fuel having a cetane number acquired as the input information. Then, the control device 100 controls the throttle 22, the pilot injection amount, and the pilot injection timing (timing at which the pilot injection is performed) as outputs (OUTPUTs) so that the pilot heat generation amount ($\Delta$Qpl) becomes equal to the target pilot heat generation amount ($\Delta$Qtrg).

More detailed description of the F/F control and the OUTPUTS is as follows. First of all, a technique for calculating the target in-cylinder temperature (Ttrg) during the F/F control is identical to the technique that is described with reference to FIG. 3(b) and in Step S50 in FIG. 2. A technique for calculating the target pilot heat generation amount ($\Delta$Qtrg) is as follows. FIGS. 4(b) and 4(c) are diagrams for showing the technique for calculating the target pilot heat generation amount ($\Delta$Qtrg). Specifically, FIG. 4(b) schematically illustrates a time-dependant change in the in-cylinder temperature, and FIG. 4(c) is a diagram visualizing a map that is used during the calculation of the target pilot heat generation amount ($\Delta$Qtrg). The timing at which the crank angle is CA1 in FIG. 4(b) is the timing at which the main injection is executed. The curve 200 that is illustrated by the dotted line in FIG. 4(b) represents the in-cylinder temperature of a case where the combustion is actually performed during the main injection. The curve 201 that is illustrated by the solid line in FIG. 4(b) represents the in-cylinder temperature of a case where the misfire occurs during the main injection to cause the combustion not to be performed. The in-cylinder temperature for the timing after the crank angle CA1 on the curve 201 in FIG. 4(b) has a value that is acquired by calculation.

Referring to FIG. 4(b), the in-cylinder temperature has to be raised, by the $\Delta$T (K) that is the difference between the curve 200 and the curve 201 during the main injection (CA1), during the main injection in order to suppress the occurrence of the misfire in a case where a fuel having a low cetane number is used. As illustrated in FIG. 4(c), the control device 100 calculates the value obtained by multiplying m(g), which is the sum of the mass of the air and the mass of the fuel, by the value of $\Delta$T (K) (that is, m$\Delta$T). Then, the control device 100 extracts the target pilot heat generation amount $\Delta$Qtrg corresponding to the calculated m$\Delta$T from the map in FIG. 4(c). If the pilot heat generation amount can be increased by the extracted target pilot heat generation amount $\Delta$Qtrg, the in-cylinder temperature can be raised by $\Delta$T from the curve 201 where the misfire occurs as illustrated in FIG. 4(b), and the in-cylinder temperature can have the form of the curve 200.

The control device 100 controls, as the OUTPUTS, the throttle 22, the pilot injection amount, and the pilot injection timing so that the pilot heat generation amount ($\Delta$Qpl) becomes the target pilot heat generation amount ($\Delta$Qtrg) that is extracted from the map of FIG. 4(c). Even in a case where the throttle 22, the pilot injection amount, and the pilot injection timing are controlled as described above, the occurrence of the misfire of the internal combustion engine 5 in the case of the use of a fuel having a low cetane number can be suppressed. In other words, deterioration of the combustion state of the internal combustion engine 5 can be suppressed even in a case where a fuel having a low cetane number is used. The in-cylinder oxygen concentration control based on the control of the throttle 22 according to this embodiment that has been described with reference to FIGS. 1 to 3 can also be executed in combination with the control of the throttle 22 in the control that has been described with reference to FIG. 4(a). Specifically, the in-cylinder oxygen concentration control based on the control of the throttle 22 relating to Step S70 in FIG. 2, for example, can be executed in controlling the throttle 22 as one of the OUTPUTs according to FIG. 4(a).

First Modification Example

Figure 5:
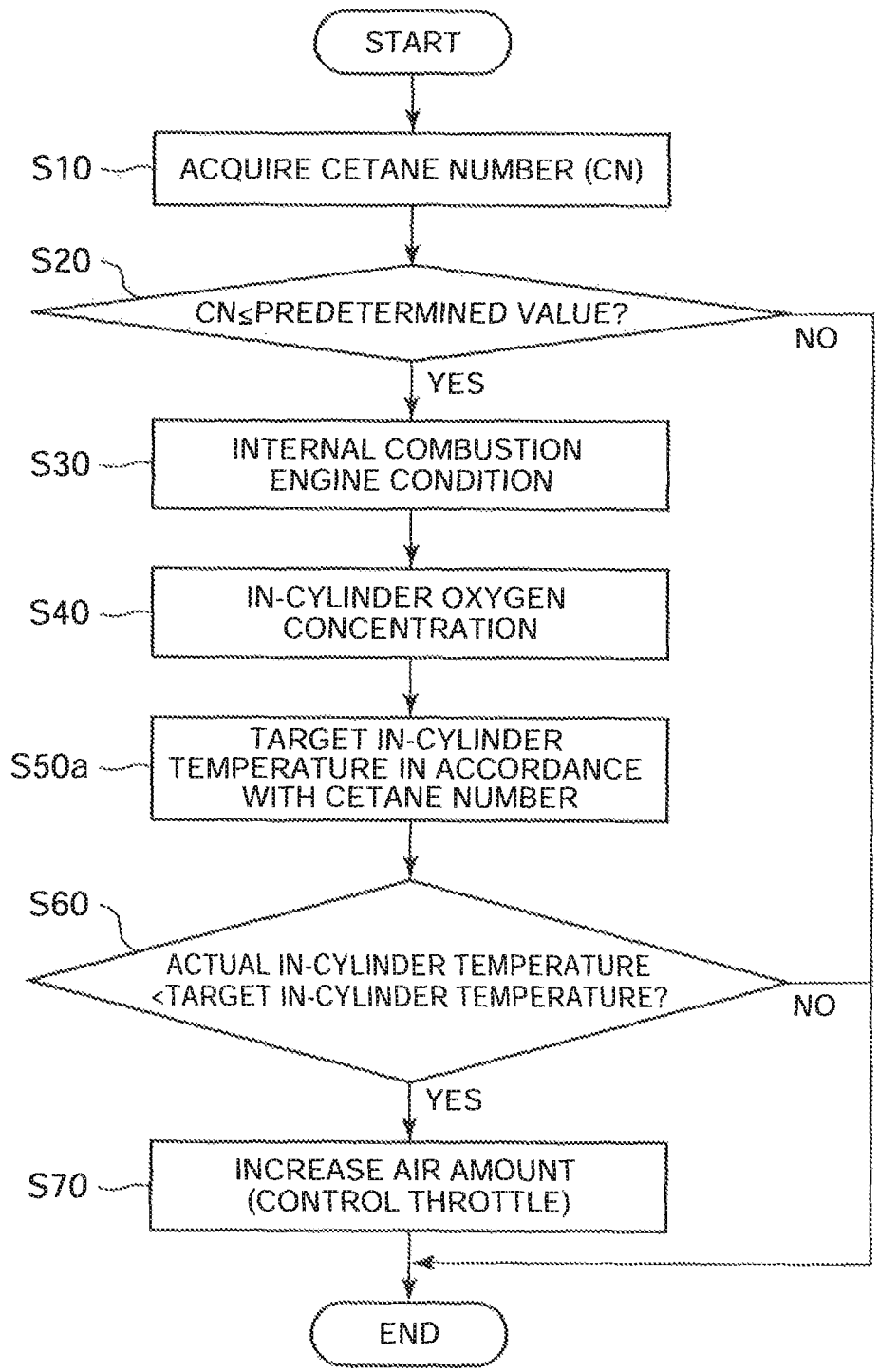
FIG. 5 is a diagram illustrating an example of a flowchart for the execution of in-cylinder oxygen concentration control by a control device according to a first modification example of the first embodiment.

Hereinafter, the control device 100 for an internal combustion engine according to a first modification example of the first embodiment will be described. The control device 100 according to this modification example is different from the control device 100 according to the first embodiment in that the flowchart in FIG. 5 to be described below is executed instead of that in FIG. 2. The rest of the configuration of the control device 100 according to this modification example is identical to that of the control device 100 according to the first embodiment. FIG. 5 is a diagram illustrating an example of a flowchart for the execution of the in-cylinder oxygen concentration control by the control device 100 according to this modification example. The flowchart in FIG. 5 is different from the flowchart in FIG. 2 according to the first embodiment in that Step S50a is provided instead of Step S50. In Step S50a, the control device 100 (specifically, the target in-cylinder temperature acquisition unit of the control device 100) acquires the target in-cylinder temperature in accordance with the cetane number. Specifically, in Step S50a, the control device 100 acquires the target in-cylinder temperature at which the combustion state of the internal combustion engine 5 during the main injection is constant based on the in-cylinder oxygen concentration that is acquired in Step S40 and the cetane number that is acquired in Step S10.

Figure 6:
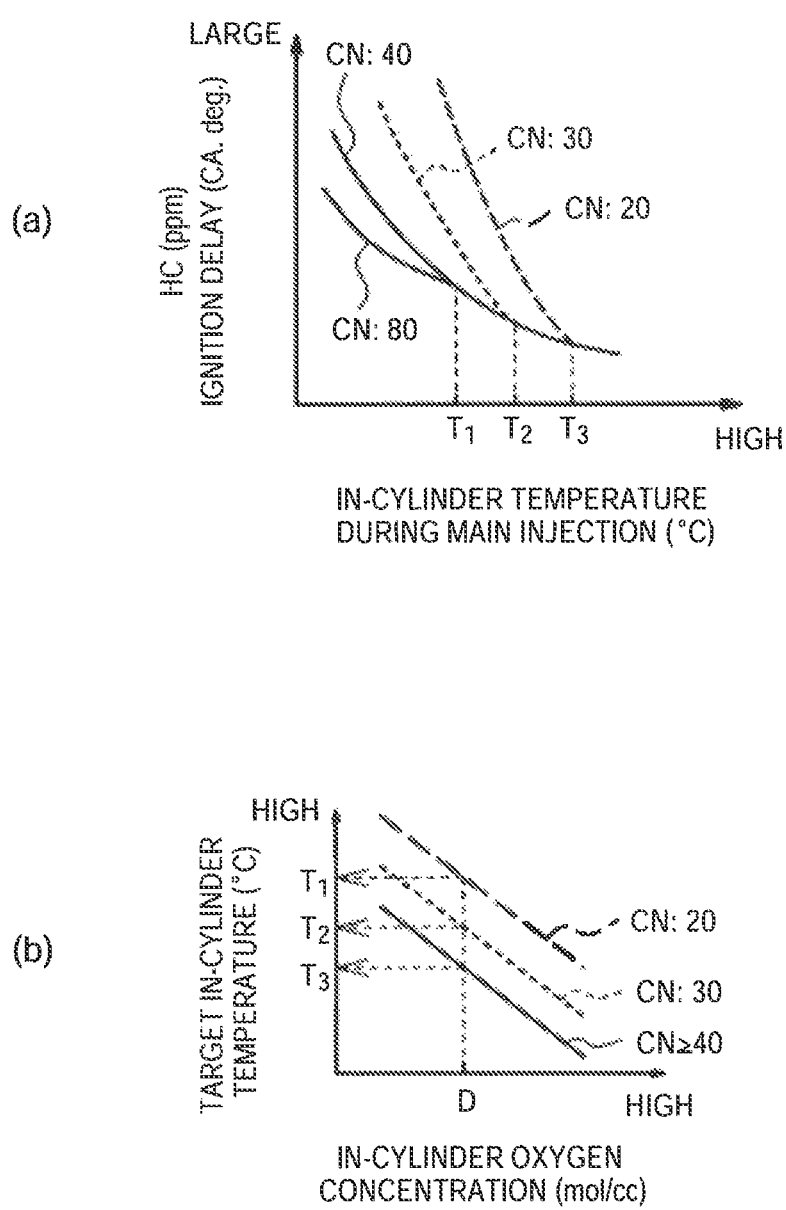
FIG. 6(a) is a schematic diagram illustrating a relationship among a cetane number, a combustion state index, and an in-cylinder temperature during main injection.
FIG. 6(b) is a diagram visualizing a map that is used during the acquisition of a target in-cylinder temperature according to the first modification example of the first embodiment.

Step S50a will be described in detail. FIG. 6(a) is a schematic diagram illustrating a relationship among the cetane number, the index that shows the combustion state of the internal combustion engine 5 (combustion state index), and the in-cylinder temperature during the main injection. A curve that shows the combustion state index (the HC amount or the degree of the ignition delay) of a case where a fuel having a cetane number (CN) of 80 is used, a curve that shows the combustion state index of a case where a fuel having a cetane number of 40 is used, a curve that shows the combustion state index of a case where a fuel having a cetane number of 30 is used, and a curve that shows the combustion state index of a case where a fuel having a cetane number of 20 is used are illustrated in FIG. 6(a). The curves showing the cetane numbers of 40 and 80 merge with each other at the moment when the in-cylinder temperature is $T_1$. The curve showing the cetane number of 30 merges with the curves showing the cetane numbers of 40 and 80 at the moment when the in-cylinder temperature is $T_2$. The curve showing the cetane number of 20 merges with the other curves at the moment when the in-cylinder temperature is $T_3$.

As is apparent from FIG. 6(a), the in-cylinder temperature during the main injection at which the combustion state index can be constant is on the side of a temperature higher than $T_1$ in a case where the cetane number is extremely low (specifically, in a case where the cetane number is less than 40). Accordingly, it can be said that it is preferable to increase the target in-cylinder temperature as the cetane number of the fuel decreases, even in a case where the fuel having an extremely low cetane number that is less than 40 is used, so that the deterioration of the combustion state can be effectively suppressed.

In Step S50a, the control device 100 increases the target in-cylinder temperature as the cetane number decreases. FIG. 6(b) is a diagram visualizing a map that is used during the acquisition of the target in-cylinder temperature according to this modification example. In FIG. 6(b), a reference line of a case where the cetane number is equal to or greater than 40, a reference line of a case where the cetane number is 30, and a reference line of a case where the cetane number is 20 are illustrated as examples of the reference line. These reference lines have higher positions as the value of the cetane number decreases. In other words, the map of FIG. 6(b) is a map in which the target in-cylinder temperature is defined in association with the in-cylinder oxygen concentration and the cetane number so that the acquired target in-cylinder temperature decreases as the in-cylinder oxygen concentration increases and the acquired target in-cylinder temperature increases as the cetane number decreases. This map is obtained in advance by an experiment, simulation, or the like and is stored in the storage unit of the control device 100.

In Step S50a, the control device 100 selects the reference line corresponding to the cetane number (CN) that is acquired in Step S10 and acquires, on the selected reference line, the target in-cylinder temperature corresponding to the in-cylinder oxygen concentration that is acquired in Step S40. Description of an example thereof referring to FIG. 6(b) is as follows. In a case where the cetane number that is acquired in Step S10 is 30 and the in-cylinder oxygen concentration that is acquired in Step S40 is D (mol/cc), for example, the control device 100 acquires $T_2$ (° C.) as the target in-cylinder temperature. The target in-cylinder temperature that is acquired in this manner decreases as the in-cylinder oxygen concentration increases and increases as the cetane number decreases. Then, the control device 100 executes Step S60 by using the target in-cylinder temperature that is acquired in Step S50a. In a case where the map of FIG. 6(b) does not have a reference line directly corresponding to the cetane number that is acquired in Step S10, the control device 100 may select the reference line having the value that is the closest to the cetane number acquired in Step S10. Alternatively, the control device 100 may use a reference line of an interpolated value.

According to the control device 100 of this modification example, the following effects can be achieved in addition to the effects of the first embodiment. Specifically, ignitability decreases as the cetane number decreases, and thus a higher target in-cylinder temperature is considered to be preferable. According to the control device 100, the acquired target in-cylinder temperature is increased as the cetane number of the fuel decreases in Step S50a. Accordingly, an appropriate target in-cylinder temperature in accordance with the cetane number can be acquired. Accordingly, the deterioration of the combustion state of the internal combustion engine 5 can be more effectively suppressed according to the control device 100.

Second Modification Example

Figure 7:
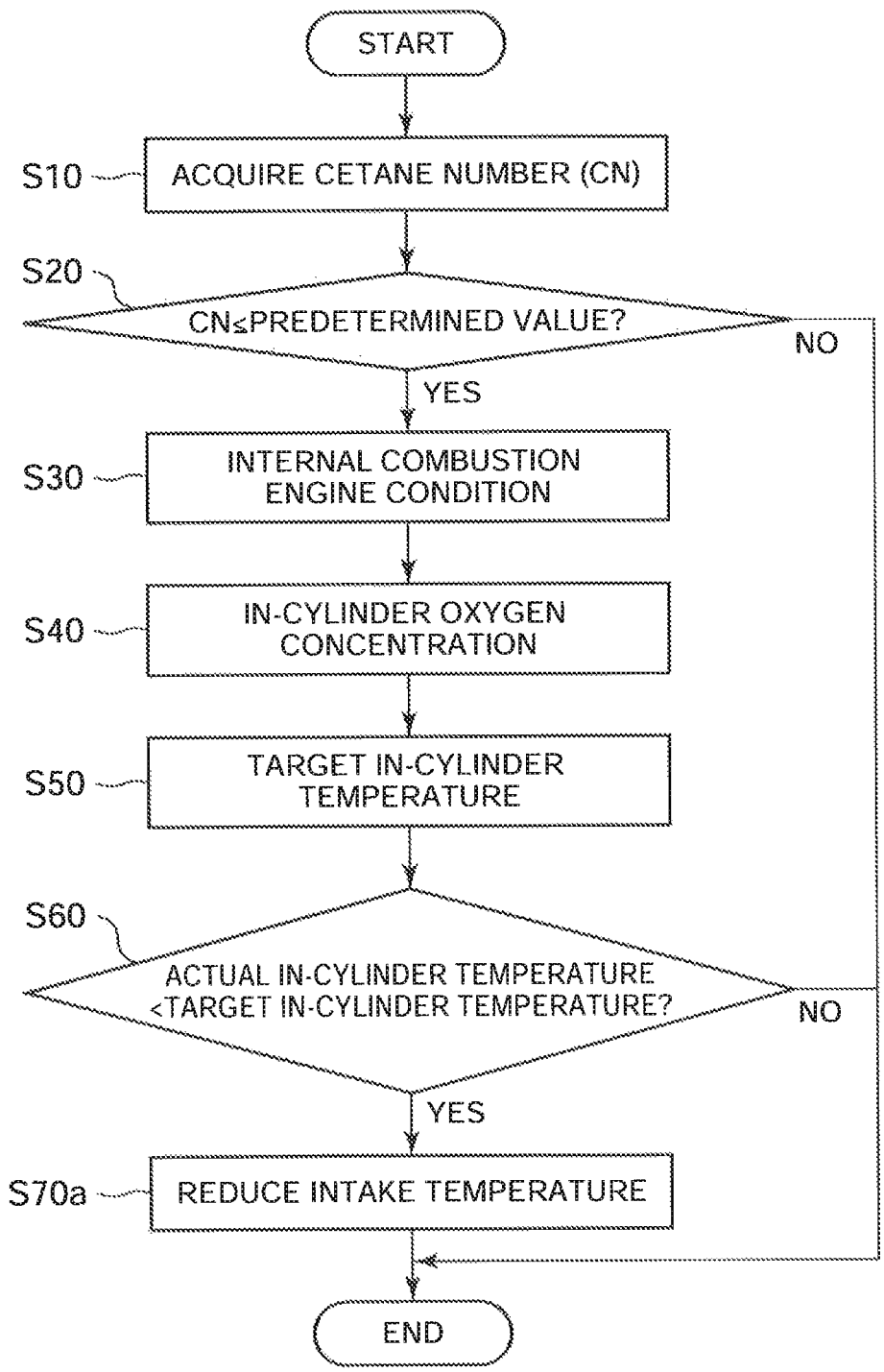
FIG. 7 is a diagram illustrating an example of a flowchart for the execution of in-cylinder oxygen concentration control by a control device according to a second modification example of the first embodiment.

Hereinafter, the control device 100 for an internal combustion engine according to a second modification example of the first embodiment will be described. The control device 100 according to this modification example is different from the control device 100 according to the first embodiment in that the flowchart in FIG. 7 to be described below is executed instead of that in FIG. 2. The rest of the configuration of the control device 100 according to this modification example is identical to that of the control device 100 according to the first embodiment. FIG. 7 is a diagram illustrating an example of a flowchart for the execution of the in-cylinder oxygen concentration control by the control device 100 according to this modification example. The flowchart in FIG. 7 is different from the flowchart in FIG. 2 according to the first embodiment in that Step S70a is provided instead of Step S70.

In Step S70a, the control device 100 (specifically, the in-cylinder oxygen concentration control unit of the control device 100) increases the oxygen concentration in the air auctioned into the cylinders 11 by reducing the temperature of the air suctioned into the cylinders 11 (hereinafter, referred to as an intake temperature in some cases) in increasing the in-cylinder oxygen concentration. The oxygen concentration (specifically, mol concentration) in the air suctioned into the cylinders 11 increases in a case where the intake temperature is reduced because the reduction in the intake temperature results in a rise in the density of the air suctioned into the cylinders 11 and this, in turn, causes the oxygen concentration in the air to rise.

Specifically, the control device 100 increases the flow rate of the refrigerant that is introduced into the intercooler 70 in reducing the intake temperature according to Step S70a. More specifically, the control device 100 increases the flow rate of the refrigerant that is introduced into the intercooler 70 by increasing the number of revolutions of a pump (not illustrated in FIG. 1) which introduces the refrigerant to the intercooler 70. As the flow rate of the refrigerant for the intercooler 70 increases, the intake cooling capacity of the intercooler 70 is improved, and thus the intake temperature can be reduced. The specific technique for executing Step S70a is not limited thereto.

The in-cylinder oxygen concentration control (Step S70a) is executed even in the control device 100 according to this modification example, and thus the difference between the target in-cylinder temperature and the actual in-cylinder temperature during the main injection can be decreased. Accordingly, deterioration of the combustion state of the internal combustion engine 5 can be suppressed even in a case where a fuel having a low cetane number is used as the fuel of the internal combustion engine 5. The control device 100 according to the first modification example of the first embodiment may execute Step S70a according to this modification example.

Third Modification Example

Figure 8:
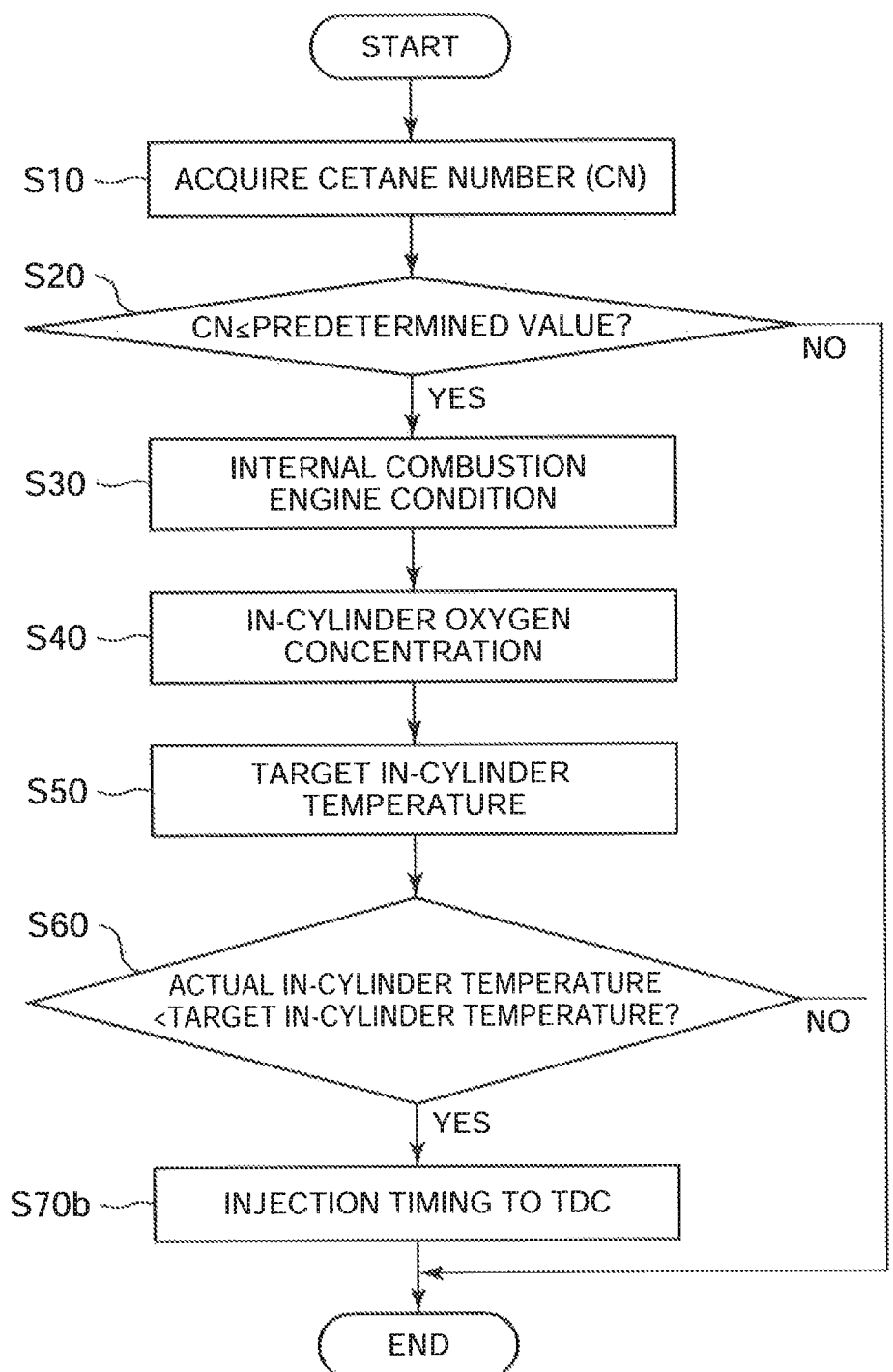
FIG. 8 is a diagram illustrating an example of a flowchart for the execution of in-cylinder oxygen concentration control by a control device according to a third modification example of the first embodiment.

Hereinafter, the control device 100 for an internal combustion engine according to a third modification example of the first embodiment will be described. The control device 100 according to this modification example is different from the control device 100 according to the first embodiment in that the flowchart in FIG. 8 to be described below is executed instead of that in FIG. 2. The rest of the configuration of the control device 100 according to this modification example is identical to that of the control device 100 according to the first embodiment. FIG. 8 is a diagram illustrating an example of a flowchart for the execution of the in-cylinder oxygen concentration control by the control device 100 according to this modification example. The flowchart in FIG. 8 is different from the flowchart in FIG. 2 according to the first embodiment in that Step S70b is provided instead of Step S70.

The in-cylinder oxygen concentration tends to increase as the position of the piston becomes closer to the top dead center (TDC). Accordingly, the in-cylinder oxygen concentration during the fuel injection can be increased as the fuel injection timing is a timing closer to the top dead center. The control device 100 (specifically, the in-cylinder oxygen concentration control unit of the control device 100) allows the pilot injection timing to become closer to the top dead center, compared to the pilot injection timing of the case of a negative determination in Step S20 or Step S60 (that is, the pilot injection timing of a case where the in-cylinder oxygen concentration control is not executed, which is referred to as normal injection timing), during the in-cylinder oxygen concentration control according to Step S70b.

Specifically, the control device 100 uses timing that is earlier than the top dead center as the normal injection timing. In Step S70b, the control device 100 carries out the pilot injection at the top dead center. More specifically, in Step S70b, the control device 100 acquires the crank angle (CA) based on the detection result from the crank position sensor and controls the fuel injection valve 30 so that the pilot injection is executed in a case where the acquired crank angle is the top dead center. The specific technique for executing Step S70b is not limited thereto.

The in-cylinder oxygen concentration control (Step S70b) is executed even in the control device 100 according to this modification example, and thus the difference between the target in-cylinder temperature and the actual in-cylinder temperature during the main injection can be decreased. Accordingly, deterioration of the combustion state of the internal combustion engine 5 can be suppressed even in a case where a fuel having a low cetane number is used as the fuel of the internal combustion engine 5. The control device 100 according to the first modification example of the first embodiment may execute Step S70b according to this modification example.

Second Embodiment

Figure 9:
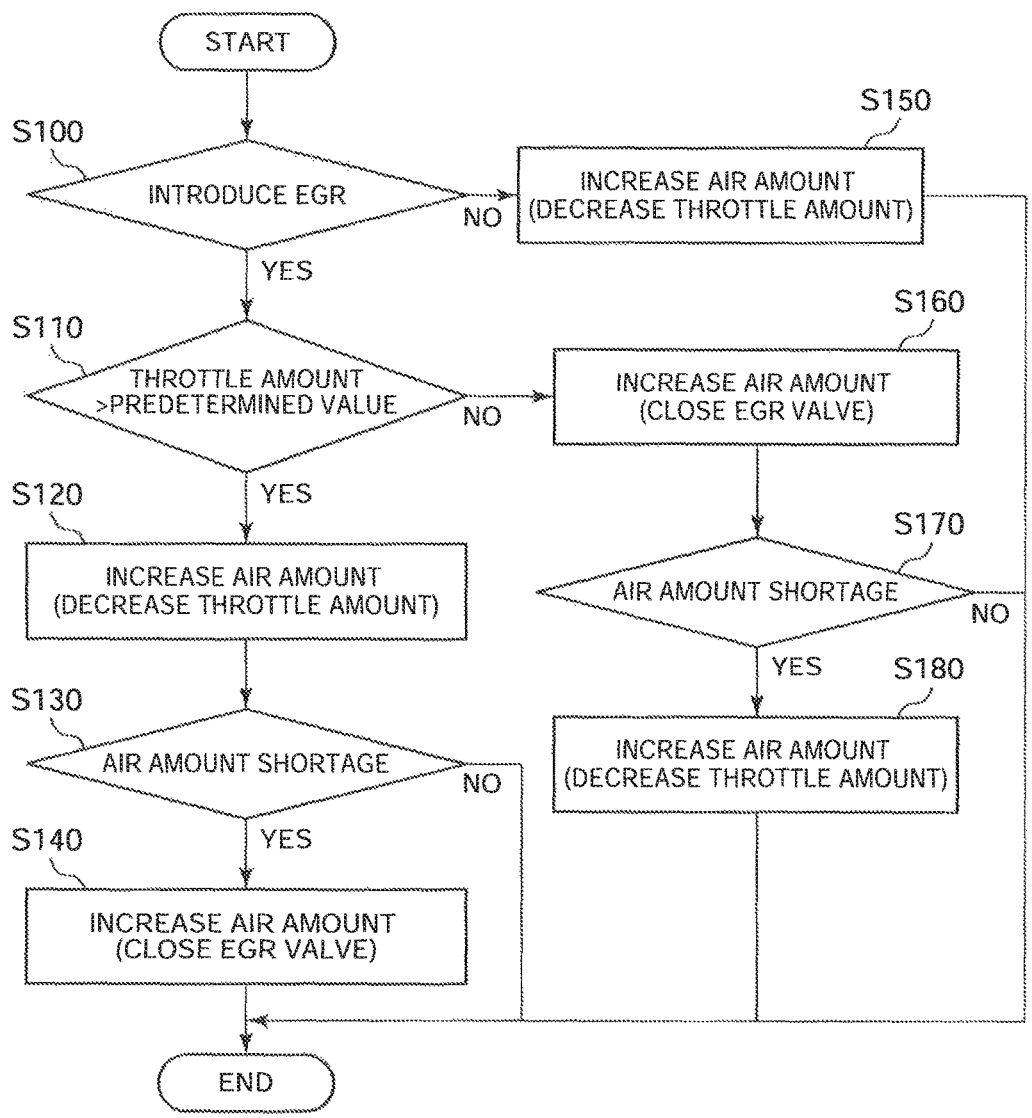
FIG. 9 is a diagram illustrating an example of a flowchart for air amount control by a control device according to a second embodiment during the execution of in-cylinder oxygen concentration control.

Hereinafter, the control device 100 for an internal combustion engine according to a second embodiment of the invention will be described. The control device 100 according to this embodiment (specifically, the in-cylinder oxygen concentration control unit of the control device 100) is different from the control device 100 according to the first embodiment in that the flowchart in FIG. 9 to be described below is executed instead of Step S70 in FIG. 2 according to the first embodiment. The rest of the configuration of the control device 100 according to this embodiment is identical to that of the control device 100 according to the first embodiment. FIG. 9 is a diagram illustrating an example of a flowchart for air amount control by the control device 100 according to this embodiment during the execution of the in-cylinder oxygen concentration control. In the case of a positive determination in Step S60 in FIG. 2, the control device 100 executes Step S100 in FIG. 9. In Step S100, the control device 100 determines whether or not the EGR gas is introduced into the cylinders 11. Specifically, in Step S100, the control device 100 determines whether or not the EGR valve 51 is open because the EGR gas is introduced into the cylinders 11 in a case where the EGR valve 51 is open.

In the case of a positive determination in Step S100, the control device 100 determines whether or not the throttle amount of the throttle 22 is equal to or greater than a predetermined value (Step S110). The amount of the air in the intake passage 20 decreases and the amount of the air flowing into the cylinders 11 also decreases as the throttle amount of the throttle 22 increases. In this embodiment, a throttle amount at which a side of the intake passage 20 further downstream from the throttle 22 has a negative pressure in a case where the EGR valve 51 is closed in a state where the throttle amount of the throttle 22 exceeds the predetermined value is used as the predetermined value. The predetermined value is obtained in advance and is stored in the storage unit. The predetermined value is not limited to the value described above. The throttle amount of the throttle 22 can be acquired based on the opening of the throttle 22.

In the case of a positive determination in Step S110, the control device 100 increases the amount of the air flowing into the cylinders 11 (Step S120) by decreasing the throttle amount of the throttle 22. Specifically, in Step S120, the control device 100 allows the throttle amount of the throttle 22 to be less than the throttle amount of the case of a negative determination in Step S20 in FIG. 2 or the throttle amount of the case of a negative determination in Step S60 (hereinafter, this throttle amount will be referred to as a normal throttle amount). The in-cylinder oxygen concentration increases as Step S120 is executed. Then, the difference between the target in-cylinder temperature and the actual in-cylinder temperature decreases. As a result, deterioration of the combustion state of the internal combustion engine 5 can be suppressed.

Then, the control device 100 determines whether or not the amount of the air flowing into the cylinders 11 falls short of a predetermined reference air amount (Step S130). In this embodiment, an air amount leading to the misfire is used as the reference air amount. En this case, the misfire occurs in a case where the amount of the air flowing into the cylinders 11 falls short of the reference air amount. The reference air amount is obtained in advance and is stored in the storage unit. The reference air amount is not limited to the air amount leading to the misfire.

In the case of a positive determination in Step S130, the control device 100 increases the amount of the air flowing into the cylinders 11 (Step S140) by controlling the EGR valve 51 to be closed. The execution of Step S140 also causes the in-cylinder oxygen concentration to increase. In this manner, the difference between the target in-cylinder temperature and the actual in-cylinder temperature decreases. As a result, deterioration of the combustion state of the internal combustion engine 5 can be suppressed. Then, the control device 100 terminates the execution of the flowchart.

In the case of a negative determination in Step S100 (that is, in a case where the EGR valve 51 is closed), the control device 100 increases the amount of the air flowing into the cylinders 11 by decreasing the throttle amount of the throttle 22 (Step S150). Details of Step S150 are similar to those of Step S120, and thus description thereof will be omitted herein. Then, the control device 100 terminates the execution of the flowchart.

In the case of a negative determination in Step S110 (that is, in a case where the throttle amount of the throttle 22 is equal to or less than a predetermined value), the control device 100 increases the amount of the air flowing into the cylinders 11 (Step S160) by controlling the EGR valve 51 to be closed. Details of Step S160 are similar to those of Step S140, and thus description thereof will be omitted herein. Then, the control device 100 determines whether or not the amount of the air flowing into the cylinders 11 falls short (Step S170). Details of Step S170 are similar to those of Step S130, and thus description thereof will be omitted herein. In the case of a positive determination in Step S170, the control device 100 increases the amount of the air flowing into the cylinders 11 (Step S180) by decreasing the throttle amount of the throttle 22. Details of Step S180 are similar to those of Step S120, and thus description thereof will be omitted herein. Then, the control device 100 terminates the execution of the flowchart. The control device 100 terminates the execution of the flowchart even in the case of a negative determination in Step S170.

According to the control device 100 of this embodiment described above, the in-cylinder oxygen concentration during the pilot injection is increased by controlling the EGR valve 51 to be closed (Step S140) after the throttle amount is decreased (after the execution of Step S120) in a case where the EGR valve 51 is open (in the case of a positive determination in Step S100) and the throttle amount of the throttle 22 exceeds a predetermined value (in the case of a positive determination in Step S110) in a case where the in-cylinder oxygen concentration during the pilot injection is increased. Herein, a side of the intake passage 20 further downstream from the throttle 22 may have a negative pressure in a case where the EGR valve 51 is open, the throttle amount of the throttle 22 exceeds a predetermined value, and the EGR valve 51 is closed without decreasing the throttle amount of the throttle 22. As a result, the misfire may occur. According to the control device 100, however, the EGR valve 51 is controlled to be closed after the throttle amount is decreased in a case where the EGR valve 51 is open and the throttle amount of the throttle 22 exceeds a predetermined value. Accordingly, the occurrence of the misfire can be suppressed. The control device 100 according to the first modification example of the first embodiment may execute the in-cylinder oxygen concentration increase control according to this embodiment.

First Modification Example

Figure 10:
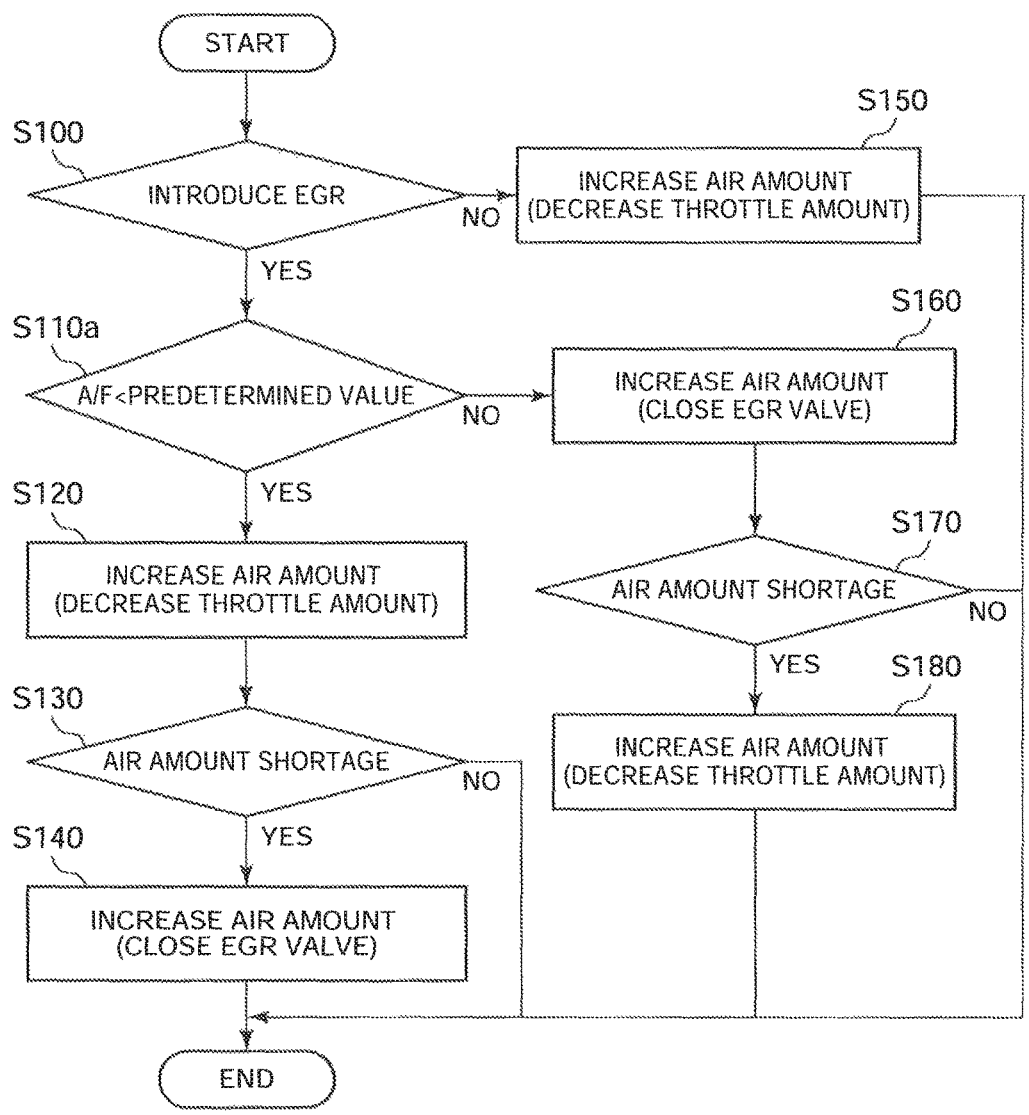
FIG. 10 is a diagram illustrating an example of a flowchart for air amount control by a control device according to a first modification example of the second embodiment during the execution of in-cylinder oxygen concentration control.

Hereinafter, the control device 100 for an internal combustion engine according to a first modification example of the second embodiment will be described. The control device 100 according to this modification example is different from the control device 100 according to the second embodiment in that the flowchart in FIG. 10 to be described below is executed instead of that in FIG. 9. The rest of the configuration of the control device 100 according to this modification example is identical to that of the control device 100 according to the second embodiment. FIG. 10 is a diagram illustrating an example of a flowchart for the air amount control by the control device 100 according to this modification example during the execution of the in-cylinder oxygen concentration control. The flowchart in FIG. 10 is different from the flowchart in FIG. 9 in that Step S110a is provided instead of Step S110.

In Step S110a, the control device 100 (specifically, the in-cylinder oxygen concentration control unit of the control device 100) determines whether or not the air-fuel ratio (A/F) of the exhaust gas in the exhaust passage 21 is less than a predetermined value. In this modification example, an air-fuel ratio at which a side of the intake passage 20 further downstream from the throttle 22 has a negative pressure in a case where the EGR valve 51 is closed in a state where the air-fuel ratio is less than the predetermined value is used as the predetermined value. The predetermined value is obtained in advance and is stored in the storage unit. The predetermined value is not limited to the value described above. In Step S110a, the control device 100 determines whether or not the air-fuel ratio acquired based on the detection result from the A/F sensor 82 is less than the predetermined value stored in the storage unit. Effects similar to those of the second embodiment can be achieved with the control device 100 according to this modification example.

Third Embodiment

Hereinafter, the control device 100 for an internal combustion engine according to a third embodiment of the invention will be described. The control device 100 according to this embodiment (specifically, the in-cylinder oxygen concentration control unit of the control device 100) is different from the control device 100 according to the first embodiment in that the flowchart in FIG. 11(a) to be described below is executed during the execution of the in-cylinder oxygen concentration control according to Step S70 in FIG. 2 for the first embodiment. The rest of the configuration of the control device 100 according to this embodiment is identical to that of the control device 100 according to the first embodiment. FIG. 11(a) is a diagram illustrating an example of a flowchart for the air amount control by the control device 100 according to this embodiment during the execution of the in-cylinder oxygen concentration control. The control device 100 executes Step S200 in FIG. 11(a) in the case of a positive determination in Step S60 in FIG. 2.

In Step S200, the control device 100 acquires a first target air amount (Gatrg) as a target value for the amount of the air flowing into the cylinders 11. Specifically, the control device 100 uses the amount of the air flowing into the cylinders 11 in the case of the execution of Step S70 in FIG. 2 as the first target air amount. More specifically, in Step S200, the control device 100 sets, as the first target air amount, the air amount having a value that is a predetermined amount greater than that of the amount of the air flowing into the cylinders 11 in the case of a negative determination in Step S20 in FIG. 2 or in the case of a negative determination in Step S60.

Then, the control device 100 acquires a second target air amount (Gatrg1), which has a value exceeding that of the first target air amount, as the target value for the amount of the air flowing into the cylinders 11 (Step S210). Specifically, the control device 100 acquires, as the second target air amount, the value obtained by multiplying a predetermined coefficient (C (>0)) by the first target air amount that is acquired in Step S200. Then, the control device 100 controls the throttle 22 (Step S220) so that the amount of the air flowing into the cylinders 11 becomes the second target air amount that is acquired in Step S210. Specifically, the control device 100 controls the throttle 22 so that the throttle amount of the throttle 22 becomes equal to a first value corresponding to the second target air amount.

Then, the control device 100 determines whether or not the air amount (Ga) that is acquired based on the detection result from the air flow sensor 80 exceeds the first target air amount (Step S230). The control device 100 executes Step S210 in the case of a negative determination in Step S230. In other words, the control in Step S220 is executed until the actual air amount (Ga) that is acquired based on the detection result from the air flow sensor 80 exceeds the first target air amount. In the case of a positive determination in Step S230, the control device 100 controls the throttle 22 (Step S240) so that the amount of the air flowing into the cylinders 11 becomes equal to the first target air amount. Specifically, the control device 100 controls the throttle amount of the throttle 22 to have a second value (value exceeding the first value) corresponding to the first target air amount. Then, the control device 100 terminates the execution of the flowchart.

FIG. 11(b) is a diagram schematically illustrating a time-dependant change in the amount of the air flowing into the cylinders 11 during the execution of the in-cylinder oxygen concentration control according to this embodiment. The vertical axis in FIG. 11(b) represents the amount of the air flowing into the cylinders 11, and the horizontal axis in FIG. 11(b) represents time. The first target air amount (Gatrg) and the second target air amount (Gatrg1) are shown on the vertical axis. In the case of the execution of the in-cylinder oxygen concentration control according to this embodiment, the amount of the air flowing into the cylinders 11 becomes equal to the second target air amount, which exceeds the first target air amount, first and then converges to the first target air amount.

Effects of the control device 100 according to this embodiment can be summarized as follows. First of all, according to the control device 100 of this embodiment, the amount of the air flowing into the cylinders 11 can be increased since Step S220 or Step S240 is executed during the in-cylinder oxygen concentration control. Accordingly, the in-cylinder oxygen concentration during the pilot injection can be increased. As a result, deterioration of the combustion state of the internal combustion engine 5 can be suppressed even in a case where a fuel having a low cetane number is used as the fuel of the internal combustion engine 5.

In addition, the control for increasing the air amount by using the throttle 22 takes time between a change in the opening of the throttle 22 and an actual increase in the amount of the air flowing into the cylinders 11, and thus an adequate responsiveness may not be ensured in some cases. According to the control device 100 of this embodiment, however, the throttle amount of the throttle 22 is decreased to the first value corresponding to the second target air amount first during the execution of the in-cylinder oxygen concentration control (Step S220) and then the throttle amount is controlled to have the second value (throttle amount corresponding to the first target air amount) exceeding the first value (Step S240). In this manner, the amount of the air flowing into the cylinders 11 can be increased to exceed the first target air amount first and then can be controlled to become equal to the first target air amount as described with reference to FIG. 11(b). As a result, the responsiveness of the in-cylinder oxygen concentration control can be improved. In this manner, deterioration of the combustion state of the internal combustion engine 5 can be effectively suppressed in a case where a fuel having a low cetane number is used as the fuel of the internal combustion engine 5.

The control device 100 according to the first modification example of the first embodiment may further execute the in-cylinder oxygen concentration control according to this embodiment. In addition, the control device 100 according to the second embodiment or the control device 100 according to the first modification example of the second embodiment may further execute the in-cylinder oxygen concentration control according to this embodiment. In a case where the control device 100 according to the second embodiment or the control device 100 according to the first modification example of the second embodiment executes the in-cylinder oxygen concentration control according to this embodiment, the control in FIG. 11(a) is executed when the throttle 22 is controlled according to Step S120, Step S150, or Step S180.

First Modification Example

Hereinafter, the control device 100 for an internal combustion engine according to a first modification example of the third embodiment will be described. The control device 100 according to this modification example is different from the control device 100 according to the third embodiment in that the flowchart in FIG. 12(a) to be described below is executed instead of that in FIG. 11(a). The rest of the configuration of the control device 100 according to this modification example is identical to that of the control device 100 according to the third embodiment. FIG. 12(a) is a diagram illustrating an example of a flowchart for the air amount control by the control device 100 according to this modification example during the execution of the in-cylinder oxygen concentration control. The flowchart in FIG. 12(a) is different from the flowchart in FIG. 11(a) in that Step S201 is additionally provided and in that Step S210a is provided instead of Step S210.

After Step S200, the control device 100 (specifically, the in-cylinder oxygen concentration control unit of the control device 100) executes Step S201. In Step S201, the control device 100 acquires an air amount increase value (Ga2). 12(b) is a diagram visualizing a map of the air amount increase value. The vertical axis in FIG. 12(b) represents the air amount increase value, and the horizontal axis in FIG. 12(b) represents the difference between the target in-cylinder temperature that is acquired in Step S50 in FIG. 2 and the actual in-cylinder temperature that is acquired in Step S60 in FIG. 2 (referred to as a temperature difference in some cases in this modification example). FIG. 12(b) is a map in which the air amount increase value is defined in association with the temperature difference so that the air amount increase value increases as the temperature difference increases. This map is obtained in advance and is stored in the storage unit of the control device 100. In Step S201 in FIG. 12(a), the control device 100 acquires the air amount increase value (Ga) by extracting, from the map of FIG. 12(b), the air amount increase value corresponding to the difference between the target in-cylinder temperature that is acquired in Step S50 in FIG. 2 and the actual in-cylinder temperature that is acquired in Step S60 in FIG. 2.

After Step S201, the control device 100 executes Step S210a. In Step S210a, the control device 100 acquires, as the second target air amount, the value obtained by adding the air amount increase value (Ga2) that is acquired in Step S201 to the first target air amount that is acquired in Step S200. The second target air amount that is calculated in this manner has a value exceeding that of the first target air amount. In other words, the control device 100 calculates the second target air amount based on the difference between the target in-cylinder temperature and the actual in-cylinder temperature (temperature difference).

The control device 100 according to this modification example can improve the responsiveness of the in-cylinder oxygen concentration control as is the case with the third embodiment. In addition, according to the control device 100 of this modification example, the responsiveness of the in-cylinder oxygen concentration control can be effectively improved in accordance with the difference between the target in-cylinder temperature and the actual in-cylinder temperature since the second target air amount is calculated based on the difference between the target in-cylinder temperature and the actual in-cylinder temperature. Accordingly, the deterioration of the combustion state of the internal combustion engine 5 can be more effectively suppressed.

The control device 100 according to the first modification example of the first embodiment may further execute the in-cylinder oxygen concentration control according to this modification example. In addition, the control device 100 according to the second embodiment or the control device 100 according to the first modification example of the second embodiment may further execute the in-cylinder oxygen concentration control according to this modification example.

Fourth Embodiment

Figure 13:
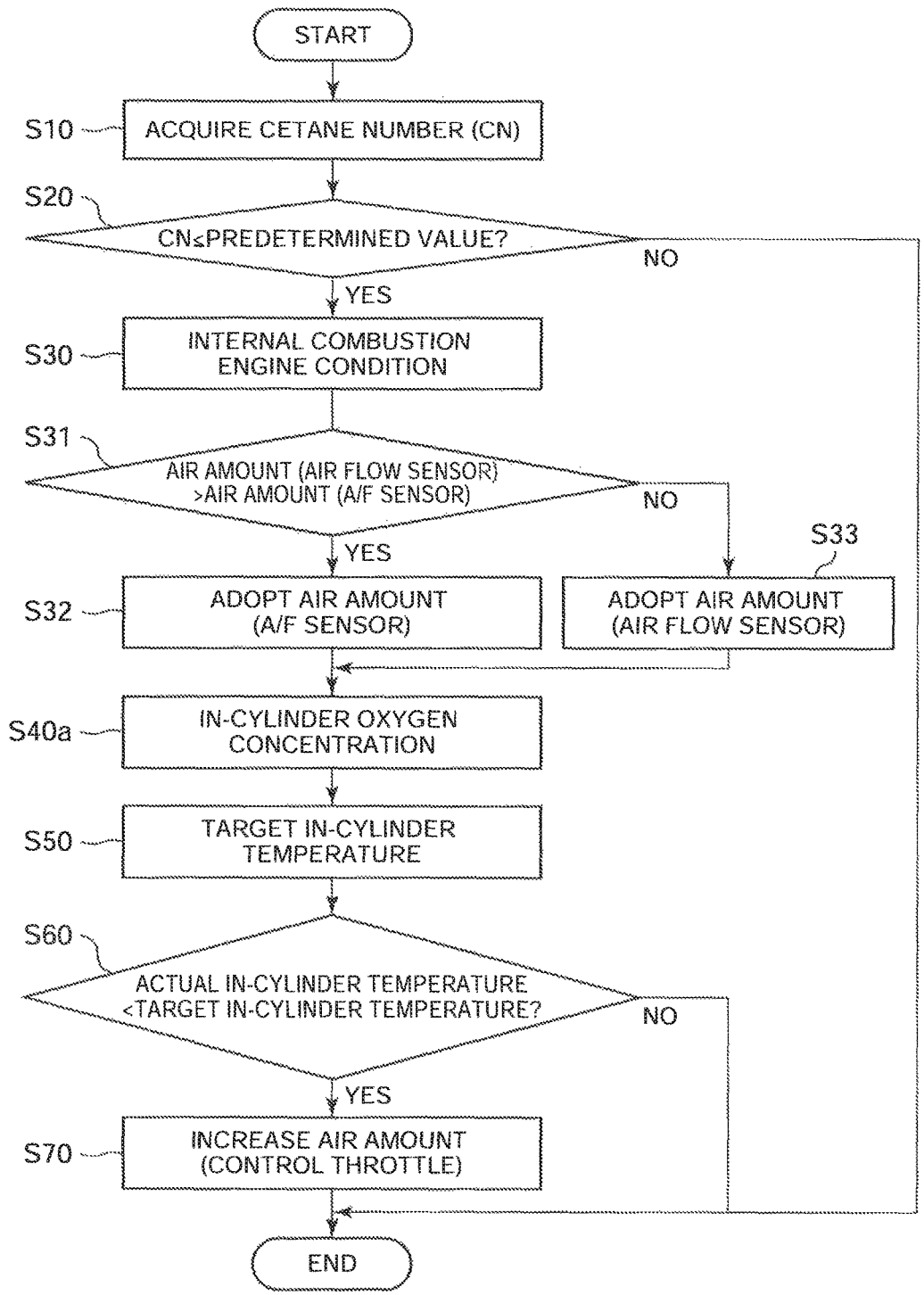
FIG. 13 is a diagram illustrating an example of a flowchart for the execution of in-cylinder oxygen concentration control by a control device according to a fourth embodiment.

Hereinafter, the control device 100 for an internal combustion engine according to a fourth embodiment of the invention will be described. The control device 100 according to this embodiment is different from the control device 100 according to the first embodiment in that the flowchart in FIG. 13 to be described below is executed instead of the flowchart in FIG. 2 according to the first embodiment. The rest of the configuration of the control device 100 according to this embodiment is identical to that of the control device 100 according to the first embodiment. FIG. 13 is a diagram illustrating an example of a flowchart for the execution of the in-cylinder oxygen concentration control by the control device 100 according to this embodiment. The flowchart in FIG. 13 is different from the flowchart in FIG. 2 in that Step S31, Step S32, and Step S33 are additionally provided and in that Step S40a is provided instead of Step S40.

In Step S31, the control device 100 (specifically, the in-cylinder oxygen concentration acquisition unit of the control device 100) acquires the amount of the air flowing into the cylinders 11 (hereinafter, simply referred to as an air amount in some cases) based on the detection result from the air flow sensor 80, acquires the air amount based on the detection result from the A/F sensor 82, and determines whether or not the air amount that is acquired based on the detection result from the air flow sensor 80 exceeds the air amount that is acquired based on the detection result from the A/F sensor 82. The control device 100 acquires, as the amount of the air flowing into the cylinders 11, the value obtained by multiplying the A/F detected by the A/F sensor 82 by the amount of fuel injection by the fuel injection valve 30. The specific method by which the amount of the air flowing into the cylinders 11 is acquired based on the detection result from the A/F sensor 82 is not limited thereto, and known techniques can be used.

It is considered that the determination accuracy for Step S31 is higher in a case where Step S31 is executed with the operation state of the internal combustion engine 5 being steady than in a case where Step S31 is executed with the operation state of the internal combustion engine 5 being transient. The control device 100 executes Step S31 in a case where the operation state of the internal combustion engine 5 is steady. Specifically, the control device 100 determines that the operation state of the internal combustion engine 5 is steady and executes Step S31 in a case where the amount of change in the opening of the throttle 22 per unit time is equal to or less than a predetermined value.

In the case of a positive determination in Step S31 (that is, in a case where the air amount acquired based on the detection result from the A/F sensor 82 is smaller), the control device 100 adopts the air amount acquired based on the detection result from the A/F sensor 82 (Step S32). Then, the control device 100 calculates the in-cylinder oxygen concentration (Step S40a) by using the air amount that is adopted in Step S32. Specifically, the control device 100 calculates the in-cylinder oxygen concentration by using the air amount that is adopted in Step S32 and in accordance with the equation (1) described in Step S40 in FIG. 2. In the case of a negative determination in Step S31 (that is, in a case where the air amount acquired based on the detection result from the air flow sensor 80 is smaller), the control device 100 adopts the air amount that is acquired based on the detection result from the air flow sensor 80 (Step S33). Then, the control device 100 calculates the in-cylinder oxygen concentration by using the air amount that is adopted in Step S33 (Step S40a).

Since Step S70 is executed, effects similar to those of the first embodiment can be achieved with the control device 100 according to this embodiment. In addition, according to the control device 100 of this embodiment, the in-cylinder oxygen concentration acquisition unit calculates the in-cylinder oxygen concentration by adopting the smaller one of the air amount that is acquired based on the detection result from the air flow sensor 80 and the air amount that is acquired based on the detection result from the A/F sensor 82 (Step S31 to Step S40a). Hereinafter, effects of the in-cylinder oxygen concentration calculation according to this embodiment will be described.

First of all, a control device that does not execute Step S31 to Step S33 according to this embodiment and calculates the in-cylinder oxygen concentration in Step S40a by using the air amount acquired based on the detection result from the air flow sensor 80 all the time is assumed as a comparative example (this control device will be referred to as a control device according to the comparative example). In a case where the air flow sensor 80 degrades in the control device according to the comparative example, the values of the air amount that is acquired based on the detection result from the air flow sensor 80 and the actual air amount are considered to differ from each other. As a result, the in-cylinder oxygen concentration that is calculated by using the air amount Which is acquired based on the degrading air flow sensor 80 differs from the in-cylinder oxygen concentration that is acquired based on the non-degrading air flow sensor 80 (that is, true in-cylinder oxygen concentration). As a result, the target in-cylinder temperature that is acquired based on the in-cylinder oxygen concentration differs from the true target in-cylinder temperature as well.

Herein, problems caused by the control device according to the comparative example described above will be more specifically described as follows by using, as an example, a case where the air amount that is acquired based on the detection result from the air flow sensor 80 is increased to exceed the actual air amount as a result of the degradation of the air flow sensor 80. FIG. 14(a), which is similar to FIG. 3(b), is a diagram visualizing a map that is used when the target in-cylinder temperature is acquired based on the in-cylinder oxygen concentration. The in-cylinder oxygen concentration (A) on the horizontal axis in FIG. 14(a) is the in-cylinder oxygen concentration that is calculated by using the air amount which is acquired based on the detection result from the non-degrading air flow sensor 80. The in-cylinder oxygen concentration (B) on the horizontal axis in FIG. 14(a) is the in-cylinder oxygen concentration that is calculated by using the air amount which is acquired based on the detection result from the degrading air flow sensor 80.

In a case where the air amount that is acquired based on the detection result from the air flow sensor 80 is increased to exceed the actual air amount as a result of the degradation of the air flow sensor 80, the in-cylinder oxygen concentration (B) that is acquired by using the air amount which is acquired based on the degrading air flow sensor 80 exceeds the in-cylinder oxygen concentration (A) that is acquired by using the air amount which is acquired based on the non-degrading air flow sensor 80. As a result, a target in-cylinder temperature ($B_1$) that is calculated in the case of the degradation of the air flow sensor 80 becomes lower than a target in-cylinder temperature ($A_1$) that is calculated in the case of the non-degradation of the air flow sensor 80 in a case where the control device according to the comparative example calculates the target in-cylinder temperature based on the map of FIG. 14(a). The misfire may occur in the internal combustion engine 5 in a case where the control device according to the comparative example executes Step S60 and Step S70 by using the target in-cylinder temperature ($B_1$), which is lower than the true target in-cylinder temperature ($A_1$). The control device according to the comparative example has the problem of the misfire that may occur in the internal combustion engine 5 in the case of the degradation of the air flow sensor 80 as described above. According to the control device 100 of this embodiment, the problem can be solved as described below.

FIG. 14(b) schematically illustrates the presence or absence of the misfire in the case of the degradation of the air flow sensor 80 among the air flow sensor 80 and the non-degradation of the A/F sensor 82. FIG. 14(c) schematically illustrates the presence or absence of the misfire in the case of the degradation of the A/F sensor 82 among the non-degradation of the air flow sensor 80 and the non-degradation of the A/F sensor 82. In FIGS. 14(b) and 14(c), the area over the horizontal axis that shows the true value of the air amount (true air amount) (that is, the area where the air amount acquired based on the detection result from the sensor exceeds the true air amount) is the area where the misfire occurs in the internal combustion engine 5 (misfire side). In FIGS. 14(b) and 14(c), the area under the horizontal axis is the area where no misfire occurs in the internal combustion engine 5 (safe side).

As illustrated in FIG. 14(b), the occurrence of the misfire in the internal combustion engine 5 can be suppressed, even in a case where the degradation of the air flow sensor 80 causes the air amount acquired based on the detection result from the air flow sensor 80 to exceed or be exceeded by the true value, insofar as the value of the smaller one of the detection result from the air flow sensor 80 and the detection result from the A/F sensor 82 is adopted. As illustrated in FIG. 14(c), the occurrence of the misfire in the internal combustion engine 5 can be suppressed, even in a case where the degradation of the A/F sensor 82 causes the air amount acquired based on the detection result from the A/F sensor 82 to exceed or be exceeded by the true value, insofar as the value of the smaller one of the detection result from the air flow sensor 80 and the detection result from the A/F sensor 82 is adopted. In other words, the occurrence of the misfire in the internal combustion engine 5 can be suppressed, even in the event of the degradation of the air flow sensor 80 or the A/F sensor 82, insofar as the in-cylinder oxygen concentration is calculated by adopting the smaller one of the air amount that is acquired based on the detection result from the air flow sensor 80 and the air amount that is acquired based on the detection result from the A/F sensor 82.

According to the control device 100 of this embodiment, the in-cylinder oxygen concentration is calculated from Step S31 to Step S40a by adopting the smaller one of the air amount that is acquired based on the detection result from the air flow sensor 80 and the air amount that is acquired based on the detection result from the A/F sensor 82. Accordingly, the occurrence of the misfire in the internal combustion engine 5 can be suppressed even in the case of the degradation of the air flow sensor 80 or the A/F sensor 82.

Each control device according to the first modification example, the second modification example, and the third modification example of the first embodiment, the second embodiment, the first modification example of the second embodiment, the third embodiment, and the first modification example of the third embodiment may execute the method (Step S31 to Step S40a in FIG. 13) for acquiring the in-cylinder oxygen concentration according to this embodiment.

First Modification Example

Figure 15:
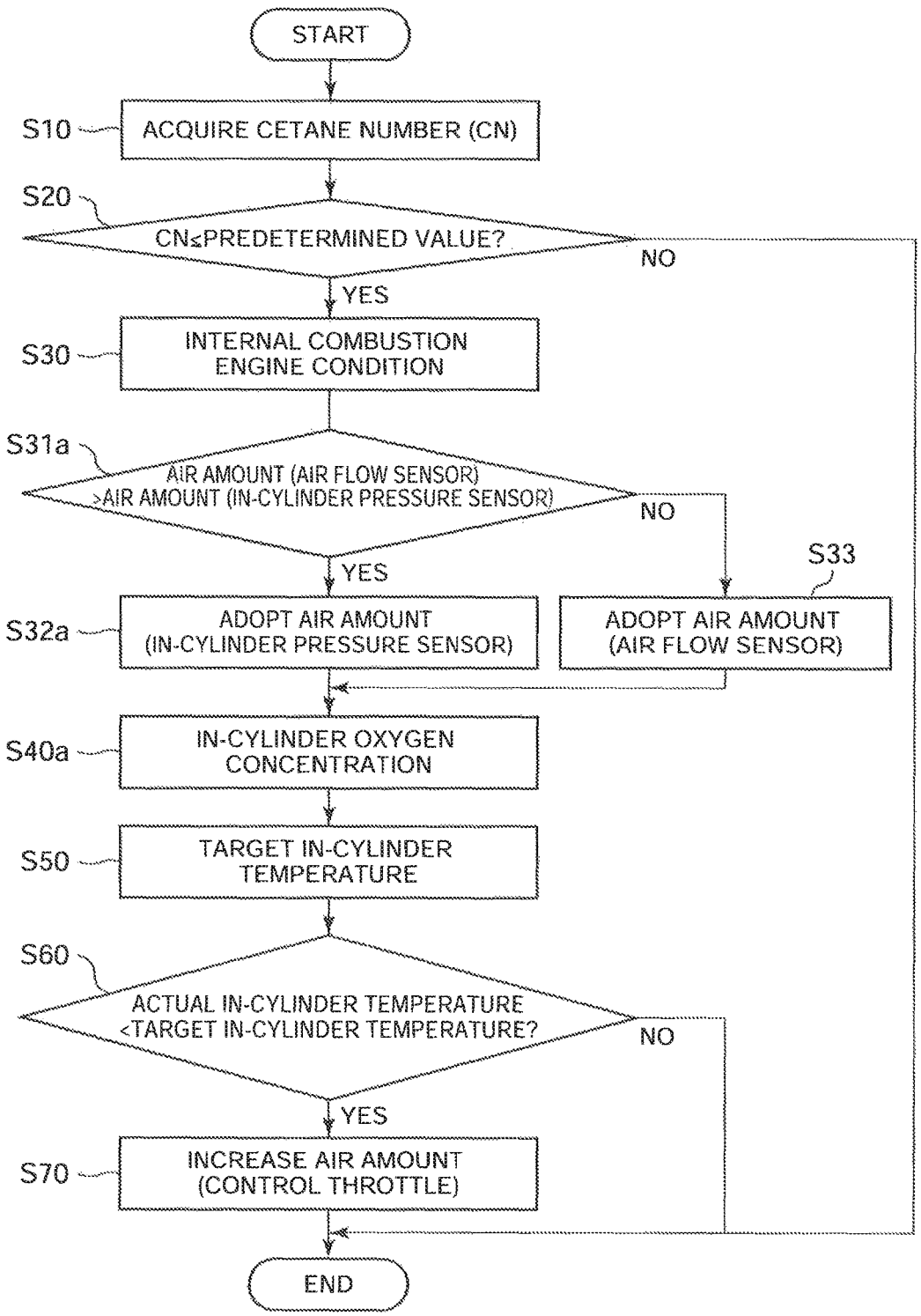
FIG. 15 is a diagram illustrating an example of a flowchart for the execution of in-cylinder oxygen concentration control by a control device according to a first modification example of the fourth embodiment.

Hereinafter, the control device 100 for an internal combustion engine according to a first modification example of the fourth embodiment will be described. The control device 100 according to this modification example is different from the control device 100 according to the fourth embodiment in that the flowchart in FIG. 15 to be described below is executed instead of that in FIG. 13. The rest of the configuration of the control device 100 according to this modification example is identical to that of the control device 100 according to the fourth embodiment. FIG. 15 is a diagram illustrating an example of a flowchart for the execution of the in-cylinder oxygen concentration control by the control device 100 according to this modification example. The flowchart in FIG. 15 is different from the flowchart in FIG. 13 in that Step S31a is provided instead of Step S31 and Step S32a is provided instead of Step S32.

Step S31a and Step S32a differ from Step S31 and Step S32 in FIG. 13 in that the in-cylinder pressure sensor 83 is used instead of the A/F sensor 82. Herein, the amount of the air flowing into the cylinders 11 can be acquired not only based on the air flow sensor 80 and the A/F sensor 82 but also based on the in-cylinder pressure that is detected by the in-cylinder pressure sensor 83. Herein, the control device 100 uses the in-cylinder pressure sensor 83 instead of the A/F sensor 82. The specific method by which the amount of the air flowing into the cylinders 11 is acquired based on the detection result from the in-cylinder pressure sensor 83 is not particularly limited and known methods can be applied thereto, and thus description thereof will be omitted.

In Step S31a, the control device 100 (specifically, the in-cylinder oxygen concentration acquisition unit of the control device 100) determines whether or not the air amount that is acquired based on the detection result from the air flow sensor 80 exceeds the air amount that is acquired based on the detection result from the in-cylinder pressure sensor 83. In the case of a positive determination in Step S31a, the control device 100 adopts the air amount that is acquired based on the detection result from the in-cylinder pressure sensor 83 (Step S32a). Then, the control device 100 calculates the in-cylinder oxygen concentration (Step S40a) by using the air amount that is adopted in Step S32a. In the case of a negative determination in Step S31a, the control device 100 executes Step S33. Then, the control device 100 calculates the in-cylinder oxygen concentration (Step S40a) by using the air amount that is adopted in Step S33.

Even with the control device 100 of this modification example, the occurrence of the misfire in the internal combustion engine 5 can be suppressed, even in the case of the degradation of the air flow sensor 80 or the in-cylinder pressure sensor 83, since the in-cylinder oxygen concentration is calculated (Step S31a to Step S40a) by adopting the smaller one of the air amount that is acquired based on the detection result from the air flow sensor 80 and the air amount that is acquired based on the detection result from the in-cylinder pressure sensor 83.

Each control device according to the first modification example, the second modification example, and the third modification example of the first embodiment, the second embodiment, the first modification example of the second embodiment, the third embodiment, and the first modification example of the third embodiment may execute the method (Step S31a to Step S40a in FIG. 15) for acquiring the in-cylinder oxygen concentration according to this modification example.

Fifth Embodiment

Figure 16:
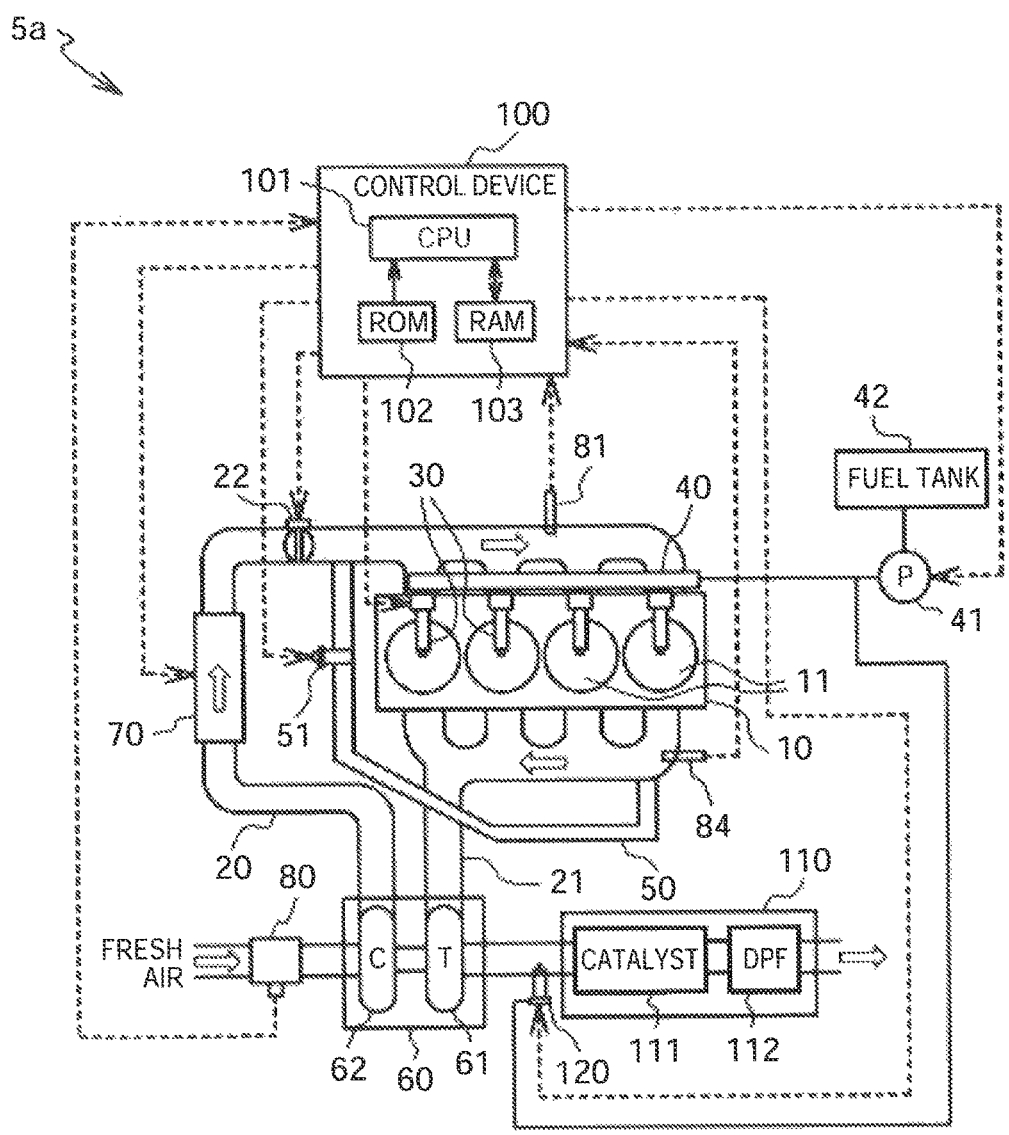
FIG. 16 is a schematic diagram illustrating an example of an internal combustion engine according to a fifth embodiment.

Hereinafter, the control device 100 for an internal combustion engine according to a fifth embodiment of the invention will be described. FIG. 16 is a schematic diagram illustrating an example of an internal combustion engine 5a to which the control device 100 according to this embodiment is applied. The internal combustion engine 5a that is illustrated in FIG. 16 differs from the internal combustion engine 5 that is illustrated in FIG. 1 in that the internal combustion engine 5a is additionally provided with a temperature sensor 84, an exhaust gas control apparatus 110, and a fuel addition valve 120. In addition, the internal combustion engine 5a that is illustrated in FIG. 16 differs from the internal combustion engine 5 in that the internal combustion engine 5a is not provided with the A/F sensor 82 and the in-cylinder pressure sensor 83. The configuration of the internal combustion engine 5a is not limited to the configuration in FIG. 16. For example, the internal combustion engine 5a may be provided with the AN sensor 82 and the in-cylinder pressure sensor 83. The temperature sensor 84 is arranged at a site on a side of the exhaust passage 21 further upstream from the turbine 61. The temperature sensor 84 detects the temperature of the exhaust gas and transmits the detection result to the control device 100. The place where the temperature sensor 84 is arranged is not limited to the place that is illustrated in FIG. 16.

The exhaust gas control apparatus 110 is an apparatus that purifies the exhaust gas in the exhaust passage 21. The exhaust gas control apparatus 110 according to this embodiment is provided with a catalyst 111 for exhaust gas control and a diesel particulate filter (DPF) 112. In this embodiment, the catalyst 111 is arranged on a side of the exhaust passage 21 further downstream from the turbine 61. The DPF 112 is arranged on a side of the exhaust passage 21 further downstream from the catalyst 111. In this embodiment, an oxidation catalyst is used as an example of the catalyst 111. The DPF 112 is a litter for collecting particulate matter (PM). The fuel addition valve 120 is arranged at a part of the exhaust passage 21 between the turbine 61 and the exhaust gas control apparatus 110. The fuel addition valve 120 adds a fuel to a side of the exhaust passage 21 further upstream from the exhaust gas control apparatus 110 in response to an instruction from the control device 100

The control device 100 according to this embodiment executes additional injection amount control for controlling an additional injection amount, which is a fuel injection amount during additional injection following the main injection, in accordance with an in-cylinder oxygen concentration increment during the execution of the in-cylinder oxygen concentration control. Details of the in-cylinder oxygen concentration control and the additional injection amount control according to this embodiment will be described as follows with reference to flowcharts.

Figure 17:
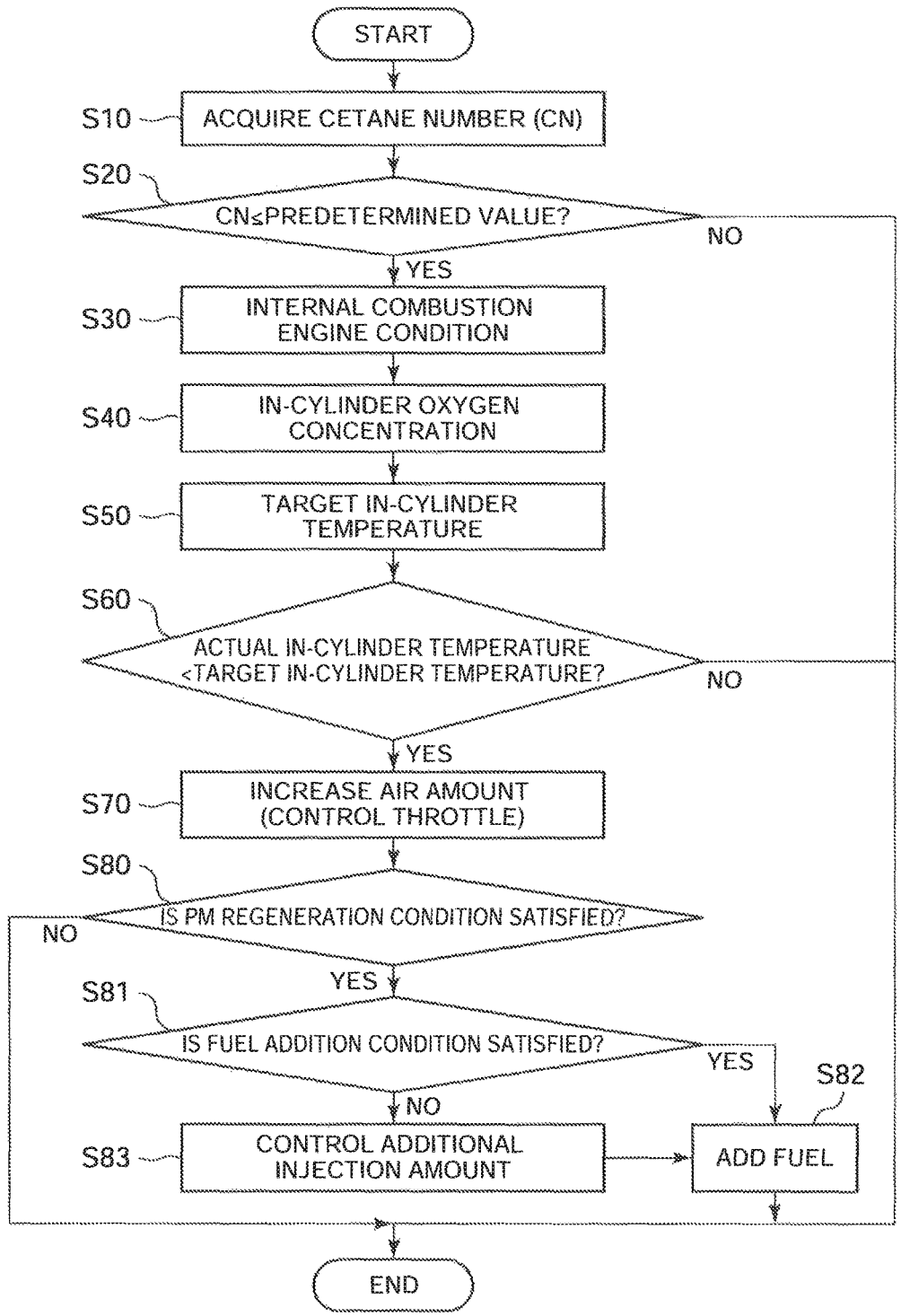
FIG. 17 is a diagram illustrating an example of a flowchart for the execution of in-cylinder oxygen concentration control and additional injection amount control by a control device according to the fifth embodiment.

FIG. 17 is a diagram illustrating an example of a flowchart for the execution of the in-cylinder oxygen concentration control and the additional injection amount control by the control device 100 according to this embodiment. The control device 100 according to this embodiment repeatedly executes the flowchart in FIG. 17 at a predetermined cycle. The flowchart in FIG. 17 differs from the flowchart illustrated in FIG. 2 in that the flowchart in FIG. 17 is additionally provided with Step S80 to Step S83. The control device 100 according to this embodiment executes Step S80 after the execution of Step S70.

In Step S80, the control device 100 determines whether or not a PM regeneration condition which is an initiation condition for a regeneration treatment by the exhaust gas control apparatus 110, is satisfied. In Step S80, the control device 100 according to this embodiment determines whether or not an index that has a correlation with the amount of the PM (accumulation amount) accumulated in the DPF 112 of the exhaust gas control apparatus 110 is equal to or greater than a predetermined value, and determines that the PM regeneration condition is satisfied in a case where the index is equal to or greater than the predetermined value. The control device 100 uses, as an example of the index, a vehicle traveling distance from the point in time of the previous execution of the regeneration treatment according to Step S82 (described later). Accordingly, in Step S80, the control device 100 determines whether or not the traveling distance of the vehicle from the point in time of the previous regeneration treatment execution exceeds a predetermined value, and determines that the PM regeneration condition is satisfied in a case where the traveling distance becomes equal to or greater than a predetermined value. A value at which it is considered to be preferable to execute the regeneration treatment for removing the PM in the DPF 112 in a case where the PM accumulation amount in the DPF 112 is equal to or greater than the predetermined value can be used as the predetermined value. The predetermined value is obtained in advance by an experiment, simulation, or the like and is stored in the storage unit.

The specific content of Step S80 is not limited to the content described above. In a case where the DPF 112 of the internal combustion engine 5a is provided with a sensor capable of detecting the PM accumulation amount in the DPF 112, for example, the control device 100 can acquire the PM accumulation amount by, acquiring the detection result from the sensor and can also determine whether or not the acquired PM accumulation amount is equal to or greater than a predetermined value.

In the case of a negative determination in Step S80, the control device 100 terminates the execution of the flowchart. In the case of a positive determination in Step S80, the control device 100 determines whether or not a fuel addition condition, which is an initiation condition for fuel addition by the fuel addition valve 120, is satisfied (Step S81). The specific content of Step S81 is as follows. In a case where the exhaust gas temperature is low, the combustion of the fuel attached to the DPF 112 is not effectively performed even when the fuel is added from the fuel addition valve 120. As a result, it is considered that the regeneration of the exhaust gas control apparatus 110 is not effectively performed. The control device 100 according to this embodiment, however, determines in Step S81 whether or not the exhaust gas temperature is equal to or greater than a predetermined value considered to allow the regeneration of the exhaust gas control apparatus 110 to be effectively performed, and determines that the fuel addition condition is satisfied in a case where the exhaust gas temperature is equal to or greater than the predetermined value.

The specific value of the predetermined value is not particularly limited. A temperature that is considered to allow an effective regeneration of the exhaust gas control apparatus 110 to be performed by the execution of the fuel addition which relates to Step S82 (described later) can be appropriately used as the predetermined value. This predetermined value is obtained appropriately and in advance by an experiment, simulation, or the like and is stored in the storage unit. In this embodiment, 200° C. is used as an example of the predetermined value. In other words, the control device 100 according to this embodiment determines in Step S81 whether or not the exhaust gas temperature is at least 200° C. The control device 100 acquires the exhaust gas temperature based on the detection result from the temperature sensor 84. The method by which the exhaust gas temperature is acquired by the control device 100 is not limited thereto. For example, the control device 100 may acquire the exhaust gas temperature based on an index that has a correlation with the exhaust gas temperature (for example, load of the internal combustion engine 5a, and, specifically, the number of revolutions of the internal combustion engine 5a, the amount of the fuel injection from the fuel injection valve 30, or the like).

In the case of a positive determination in Step S81, the control device 100 controls the fuel addition valve 120 so that the fuel is injected from the fuel addition valve. 120 (Step S82). The PM attached to the DPF 112 is combusted and removed as Step S82 is executed. Specifically, the fuel that is injected from the fuel addition valve 120 is attached to the catalyst 111, and the combustion of the fuel is promoted on the catalyst 111. As a result, the temperature of the exhaust gas that flows into the DPF 112 can be raised. Then, the PM attached to the DPF 112 can be combusted and removed. As a result, the regeneration of the DPF 112 can be achieved. After Step S82, the control device 100 terminates the execution of the flowchart.

In the case of a negative determination in Step S81, the control device 100 executes the additional injection amount control (Step S83). Specifically, in Step S83, the control device 100 controls the additional injection amount in accordance with the in-cylinder oxygen concentration increment during the execution of the in-cylinder oxygen concentration control according to Step S70. The significance of the execution of Step S70 in the case of a negative determination in Step S81 will be described as follows with reference to drawings.

Figure 18:
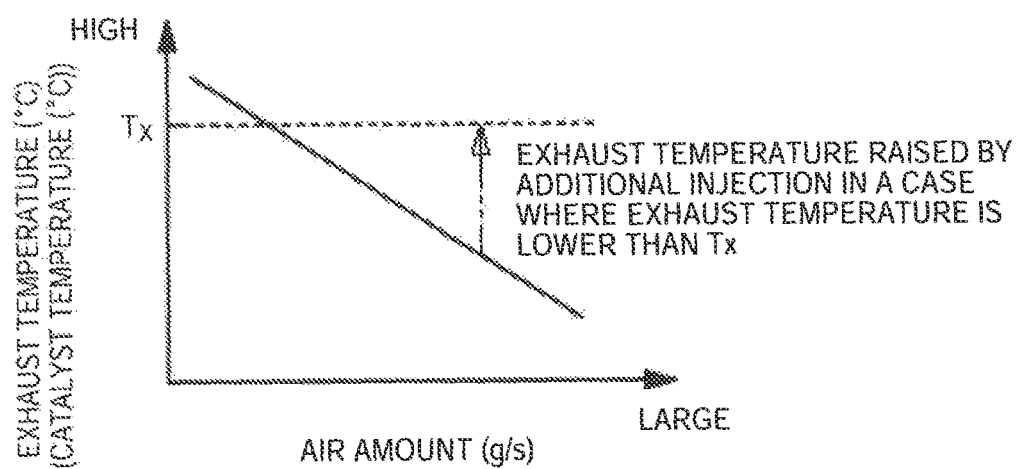
FIG. 18 is a diagram schematically illustrating a relationship between an exhaust gas temperature and the amount of air flowing into a cylinder.

FIG. 18 is a diagram schematically illustrating a relationship between the exhaust gas temperature and the amount of the air flowing into the cylinders 11. The vertical axis in FIG. 18 represents the exhaust gas temperature, and the exhaust gas temperature can be replaced with a catalyst temperature. The solid line that is illustrated in FIG. 18 represents the change in the exhaust gas temperature that results from an increase in the amount of the air flowing into the cylinders 11. In actuality, this solid line moves upward and downward in accordance with the load of the engine main body 10. The temperature Tx in FIG. 18 is a predetermined value that is used in the determination processing of Step S81 (200° C. in this embodiment). As is apparent from the solid line in FIG. 18, the exhaust gas temperature tends to be reduced as the amount of the air flowing into the cylinders 11 increases. Accordingly, the exhaust gas temperature may be reduced to become lower than Tx in a case where the amount of the air flowing into the cylinders 11 is increased by the execution of Step S70 in FIG. 17. A case where the exhaust gas temperature is reduced to become lower than the predetermined value (Tx) as a result of the increase in the amount of the air flowing into the cylinders 11 that is caused by the execution of Step S70 corresponds to the case of a negative determination in Step S81. In a case where the exhaust gas temperature becomes lower than the predetermined value (Tx) as a result of the execution of Step S70 (that is, in the case of a negative determination in Step S81), the control device 100 increases the exhaust gas temperature by executing the additional injection amount control according to Step S83.

The specific type of the additional injection is not particularly limited insofar as the fuel is injected from the fuel injection valve 30 after the main injection. At least one of post-injection and after-injection can be used as a specific example of the additional injection. Each of the post-injection and the after-injection is a type of injection for injecting the fuel from the fuel injection valve 30 at predetermined timing following the main injection. In addition, regarding the after-injection and the post-injection, the after-injection is executed at an earlier timing than the post-injection (timing close to that of the main injection). The control device 100 according to this embodiment performs the post-injection as an example of the additional injection.

Step S83 is executed as follows to be specific. First of all, the control device 100 uses a decrement in the throttle amount of the throttle 22 as a parameter that has a correlation with the in-cylinder oxygen concentration increment during the execution of Step S70. A map in which the decrement in the throttle amount of the throttle 22 and the additional injection amount are defined in association with each other is stored in the storage unit of the control device 100. This map defines the decrement in the throttle amount of the throttle 22 and the additional injection amount in association with each other so that the additional injection amount increases as the decrement in the throttle amount of the throttle 22 increases (that is, as the in-cylinder oxygen concentration increment increases). In Step S83, the control device 100 acquires, from the map, the additional injection amount corresponding to the decrement in the throttle amount of the throttle 22 during the execution of Step S70, and controls the fuel injection valve 30 so that the fuel is injected from the fuel injection valve 30 during the post-injection by the acquired additional injection amount. As a result of the execution of Step S83 in this manner, the additional injection amount according to Step S83 also increases as the in-cylinder oxygen concentration increases during the in-cylinder oxygen concentration control according to Step S70. In this manner, the control device 100 controls the additional injection amount in accordance with the in-cylinder oxygen concentration increment during the execution of the in-cylinder oxygen concentration control.

In Step S83, the control device 100 may execute the after-injection instead of the post-injection or may execute both the post-injection and the after-injection as the additional injection. In a case where the after-injection is executed instead of the post-injection as the additional injection, the control device 100 may control the fuel injection valve 30 so that the amount of the injection during the after-injection (this corresponds to the additional injection amount) increases in accordance with the in-cylinder oxygen concentration increment during the execution of the in-cylinder oxygen concentration control. In a case where both the post-injection and the after-injection are executed as the additional injection, the control device 100 may control the fuel injection valve 30 so that at least one (this corresponds to the additional injection amount) of the amount of the injection during the post-injection and the amount of the injection during the after-injection increases in accordance with the in-cylinder oxygen concentration increment during the execution of the in-cylinder oxygen concentration control.

The specific method by which the additional injection amount control according to Step S83 is executed is not limited to the method described above. Another example of Step S83 is as follows. First of all, the in-cylinder oxygen concentration control according to Step S70 is executed so that the in-cylinder oxygen concentration increases as the difference between the target in-cylinder temperature and the actual in-cylinder temperature according to Step S60 increases. Then, in Step S83, the control device 100 may control the fuel injection valve 30 so that the additional injection amount increases as the as the difference between the target in-cylinder temperature and the actual in-cylinder temperature according to Step S60 increases. As a result, the control device 100 controls the additional injection amount in accordance with the in-cylinder oxygen concentration increment during the execution of the in-cylinder oxygen concentration control even in this case. In this case, a map in which the difference between the target in-cylinder temperature and the actual in-cylinder temperature and the additional injection amount are defined in association with each other is stored in the storage unit of the control device 100, and the control device 100 executes the additional injection amount control according to Step S83 by referring to this map.

Yet another example of Step S83 is as follows. Specifically, in a case where the control device 100 executes the additional injection in accordance with a predetermined numerical formula (hereinafter, referred to as a numerical formula for additional injection), Step S83 is executed by introducing a predetermined correction term into the numerical formula for additional injection instead of the execution of Step S83 based on the use of the map described above. Specifically, in Step S83, the control device 100 adds, to the numerical formula for additional injection, a correction term with which the additional injection amount is to increase in accordance with the in-cylinder oxygen concentration increment during the execution of the in-cylinder oxygen concentration control according to Step S70. Even in this case, the control device 100 can control the additional injection amount in accordance with the in-cylinder oxygen concentration increment during the execution of the in-cylinder oxygen concentration control.

After Step S83, the control device 100 executes Step S82. The control device 100 terminates the execution of the flowchart after Step S81. In this manner, the control device 100 according to this embodiment executes the fuel addition according to Step S82 after the execution of the additional injection amount control according to Step S83 (post-injection in this embodiment) in a case where the exhaust gas temperature is reduced to become lower than the predetermined value (Tx) by the execution of Step S70 (in the case of a negative determination in Step S81).

The CPU 101 of the control device 100 that executes the additional injection amount control in Step S83 corresponds to an additional injection amount control unit.

According to the control device 100 of this embodiment, the in-cylinder temperature can become closer to the target in-cylinder temperature during the main injection as the difference between the target in-cylinder temperature and the in-cylinder temperature (actual in-cylinder temperature) during the main injection is decreased by the execution of the in-cylinder oxygen concentration control. Then, deterioration of the combustion state of the internal combustion engine 5a can be suppressed even in a case where a fuel having a low cetane number is used as the fuel of the internal combustion engine 5a. Specifically, according to the control device 100, an in-cylinder temperature at which the combustion state of the internal combustion engine 5a during the main injection is to be constant is used as the target in-cylinder temperature (Step S50), and thus the combustion state of the internal combustion engine 5a can be constant even in a case where the fuel having a low cetane number is used. More specifically, the the internal combustion engine 5a can be constant. In addition, the occurrence of the misfire and deterioration of drivability can also be suppressed.

In addition, the additional injection amount during the additional injection can be controlled in accordance with the in-cylinder oxygen concentration increment (Step S83), even in a case where the in-cylinder oxygen concentration increases during the execution of the in-cylinder oxygen concentration control (that is, even in a case where the air-fuel ratio becomes lean), according to the control device 100. Then, the reduction in the exhaust gas temperature that results from an increase in the in-cylinder oxygen concentration can be supplemented by a rise in the exhaust gas temperature that results from the additional injection. As a result, reduction in the performance of the exhaust gas control apparatus 110 can be suppressed. In this manner, deterioration of the emission of the exhaust gas can be suppressed. As described above, deterioration of the combustion state of the internal combustion engine 5a can be suppressed and the deterioration of the exhaust gas emission can be suppressed, even in a case where a fuel having a low cetane number is used, according to the control device 100 of this embodiment.

As described with reference to FIG. 3(b), the map that is used during the acquisition of the target in-cylinder temperature according to this embodiment is a map in which the in-cylinder oxygen concentration and the target temperature are defined in association with each other so that the acquired target in-cylinder temperature decreases as the in-cylinder oxygen concentration increases. Since the control device 100 according to this embodiment acquires the target in-cylinder temperature by using this map, the control device 100 decreases the value of the acquired target in-cylinder temperature as the in-cylinder oxygen concentration increases. In other words, the target in-cylinder temperature acquisition unit of the control device 100 decreases the value of the acquired target in-cylinder temperature as the in-cylinder oxygen concentration that is acquired by the in-cylinder oxygen concentration acquisition unit increases. Herein, the in-cylinder temperature also rises since the amount of heat generation resulting from the combustion in the cylinders 11 increases as the in-cylinder oxygen concentration increases. Accordingly, the target in-cylinder temperature may be decreased as the in-cylinder oxygen concentration increases. Accordingly, an appropriate target in-cylinder temperature in accordance with the in-cylinder oxygen concentration can be acquired according to this configuration. As a result, the in-cylinder oxygen concentration control can be appropriately executed in accordance with the in-cylinder oxygen concentration. Then, deterioration of the combustion state of the internal combustion engine 5a can be effectively suppressed.

The control device 100 according to this embodiment executes the in-cylinder oxygen concentration control (Step S70) in a case where the cetane number has a value that is equal to or less than a predetermined value (in the case of a positive determination in Step S20). According to this configuration, the in-cylinder oxygen concentration control can be executed in a case where a fuel having a low cetane number, which is likely to cause a deterioration of the combustion state of the internal combustion engine 5a is actually used.

Sixth Embodiment

Figure 19:
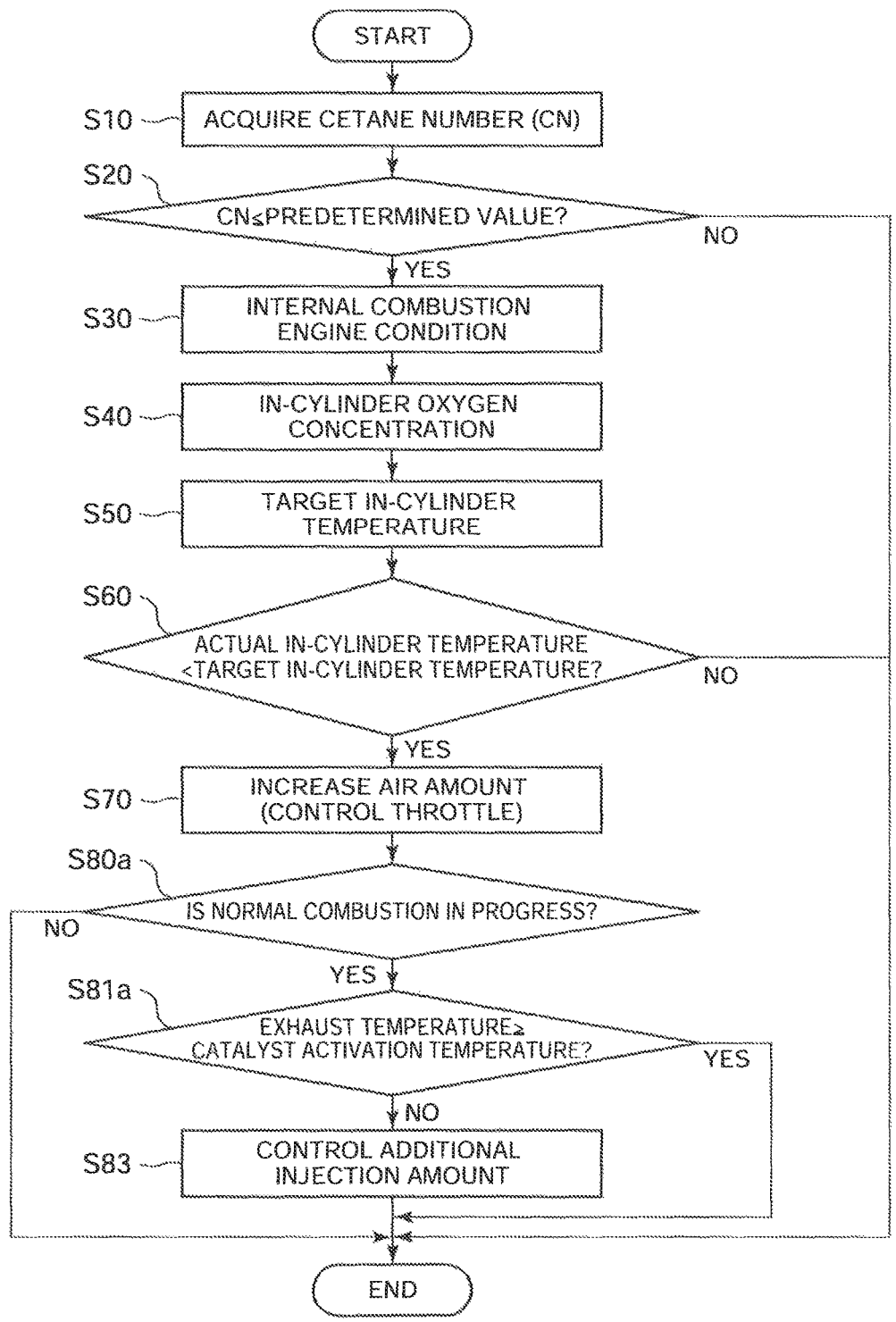
FIG. 19 is a diagram illustrating an example of a flowchart for the execution of in-cylinder oxygen concentration control and additional injection amount control by a control device according to a sixth embodiment.

Hereinafter, the control device 100 for an internal combustion engine according to a sixth embodiment of the invention will be described. The control device 100 according to this embodiment is different from the control device 100 according to the fifth embodiment in that the flowchart in FIG. 19 to be described below is executed instead of the flowchart in FIG. 17. The rest of the configuration of the control device 100 according to this embodiment is identical to that of the control device 100 according to the fifth embodiment. The hardware configuration of the internal combustion engine 5a to which the control device 100 according to this embodiment is applied is identical to that in FIG. 16. FIG. 19 is a diagram illustrating an example of a flowchart for the execution of the in-cylinder oxygen concentration control and the additional injection amount control by the control device 100 according to this embodiment. The flowchart in FIG. 19 differs from the flowchart illustrated in FIG. 17 in that Step S80a is provided instead of Step S80, Step S81a is provided instead of Step S81, and Step S82 is not provided.

In Step S80a, the control device 100 determines whether or not the internal combustion engine 5a is performing normal combustion. The control device 100 according to this embodiment uses, as an example of the normal combustion, the non-performance of the fuel injection control for the combustion of the PM accumulated in the DPF 112.

In the case of a negative determination in Step S80a, the control device 100 terminates the execution of the flowchart. In the case of a positive determination in Step S80a, the control device 100 executes Step S81a. In Step S81a, the control device 100 determines whether or not the exhaust gas temperature is at least a catalyst activation temperature (temperature at which the catalyst 111 is activated). In this embodiment, 200° C. is used as an example of the catalyst activation temperature. This catalyst activation temperature is stored in the storage unit. In other words, in Step S81a, the control device 100 determines whether or not the exhaust gas temperature that is acquired based on the detection result from the temperature sensor 84 is at least the catalyst activation temperature that is stored in the storage unit (200° C.).

In the case of a positive determination in Step S81a (in a case where the exhaust gas temperature is at least the catalyst activation temperature), the control device 100 terminates the execution of the flowchart. In the case of a negative determination in Step S81a (in a case where the exhaust gas temperature is lower than the catalyst activation temperature), the control device 100 executes Step S83. Step S83 is similar to Step S83 in FIG. 17. In other words, the additional injection amount control unit of the control device 100 according to this embodiment executes the additional injection amount control according to Step S83 in a case where the exhaust gas temperature is lower than the catalyst activation temperature. After Step S83, the control device 100 terminates the execution of the flowchart.

According to the control device 100 of this embodiment, deterioration of the combustion state of the internal combustion engine 5a can be suppressed, even in a case where a fuel having a low cetane number is used as the fuel of the internal combustion engine 5a, since the in-cylinder oxygen concentration control according to Step S70 is executed. In addition, according to the control device 100 of this embodiment, the exhaust gas temperature can be raised by the execution of the additional injection amount control according to Step S83 even in a case where the exhaust gas temperature is lower than the catalyst activation temperature due to the execution of the in-cylinder oxygen concentration control (in the case of a negative determination in Step S81a). Since the catalyst 111 can be activated in this manner, the performance of the catalyst 111 can be sufficiently exhibited. As a result, the purification of HC, CO, and the like can be promoted, and thus deterioration of the exhaust gas emission can be suppressed even in a case were a fuel having a low cetane number is used.

Seventh Embodiment

Figure 20:
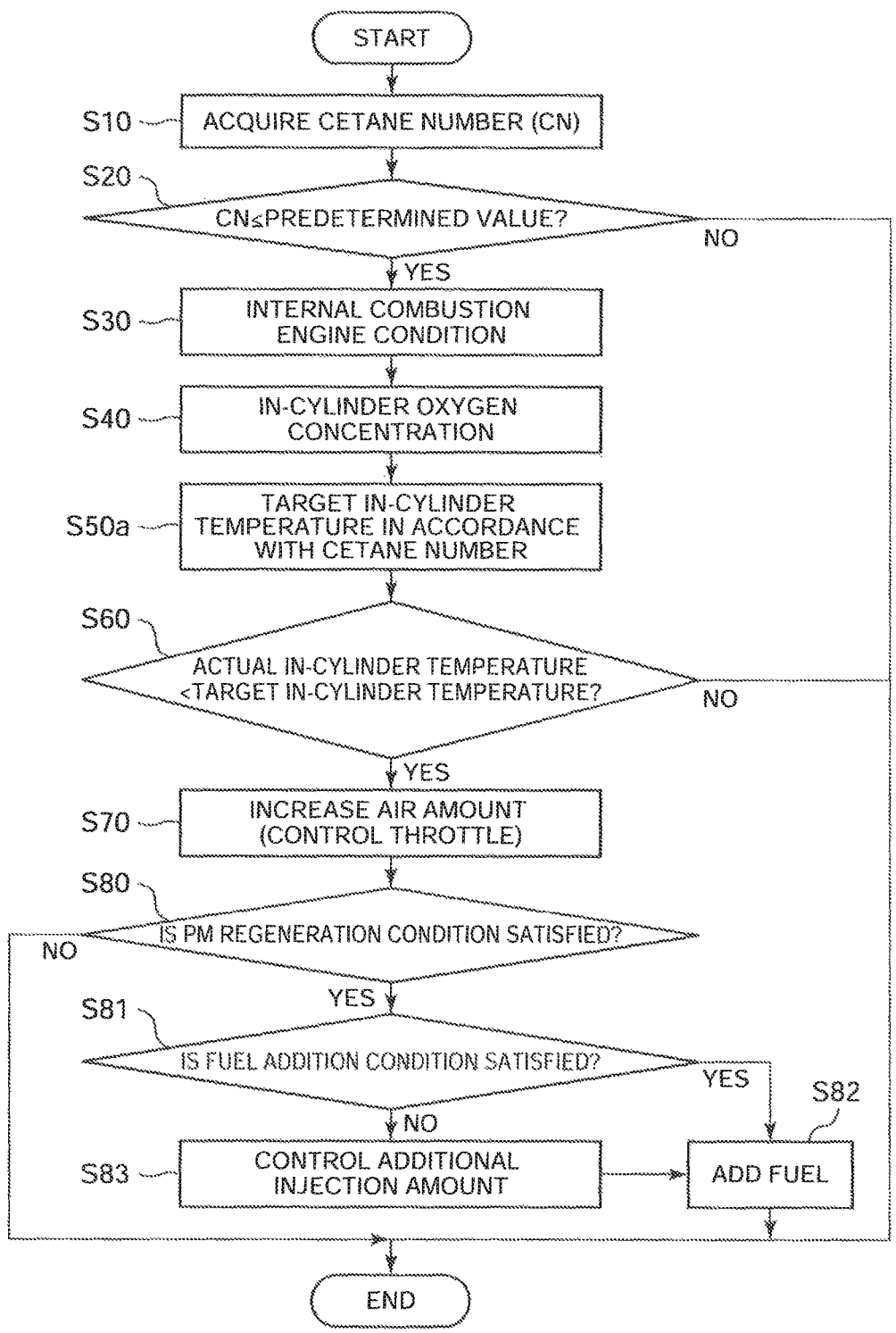
FIG. 20 is a diagram illustrating an example of a flowchart for the execution of in-cylinder oxygen concentration control and additional injection amount control by a control device according to a seventh embodiment.

Hereinafter, the control device 100 for an internal combustion engine according to a seventh embodiment of the invention will be described. The control device 100 according to this embodiment is different from the control device 100 according to the fifth embodiment in that the flowchart in FIG. 20 to be described below is executed instead of the flowchart for the fifth embodiment in FIG. 17. The rest of the configuration of the control device 100 according to this embodiment is identical to that of the control device 100 according to the fifth embodiment. The hardware configuration of the internal combustion engine 5a to which the control device 100 according to this embodiment is applied is identical to that in FIG. 16. FIG. 20 is a diagram illustrating an example of a flowchart for the execution of the in-cylinder oxygen concentration control and the additional injection amount control by the control device 100 according to this embodiment. The flowchart in FIG. 20 differs from the flowchart illustrated in FIG. 17 in that Step S50a is provided instead of Step S50.

In Step S50a, the control device 100 (specifically, the target in-cylinder temperature acquisition unit of the control device 100) acquires a target in-cylinder temperature in accordance with the cetane number. Specifically, in Step S50a, the control device 100 acquires a target in-cylinder temperature at which the combustion state of the internal combustion engine 5a during the main injection is to be constant based on the cetane number that is acquired in Step S10 as well as the ha-cylinder oxygen concentration that is acquired in Step S40. More specifically, in Step S50a, the control device 100 increases the target in-cylinder temperature as the cetane number decreases. Step S50a is identical to Step S50a in FIG. 5 described above. Accordingly, any further detailed description of Step S50a in FIG. 20 will not be provided herein.

According to the control device 100 of this embodiment, effects identical to those of the fifth embodiment can be achieved since control processing similar to that of the fifth embodiment is executed with the only exception that Step S50a is executed instead of Step S50 according to the fifth embodiment. In addition, according to the control device 100 of this embodiment, the following effects can be achieved in addition to the effects of the fifth embodiment. Specifically, a higher target in-cylinder temperature is considered to be preferable since ignitability decreases as the cetane number decreases. According to the control device 100 of this embodiment, the acquired target in-cylinder temperature is increased as the cetane number of the fuel decreases in Step S50a, and thus an appropriate target in-cylinder temperature in accordance with the cetane number can be acquired. In this manner, deterioration of the combustion state of the internal combustion engine 5a can be effectively suppressed.

The control device 100 according to the sixth embodiment may execute Step S50a according to this embodiment instead of Step S50 of the flowchart in FIG. 19.

Eighth Embodiment

Figure 21:
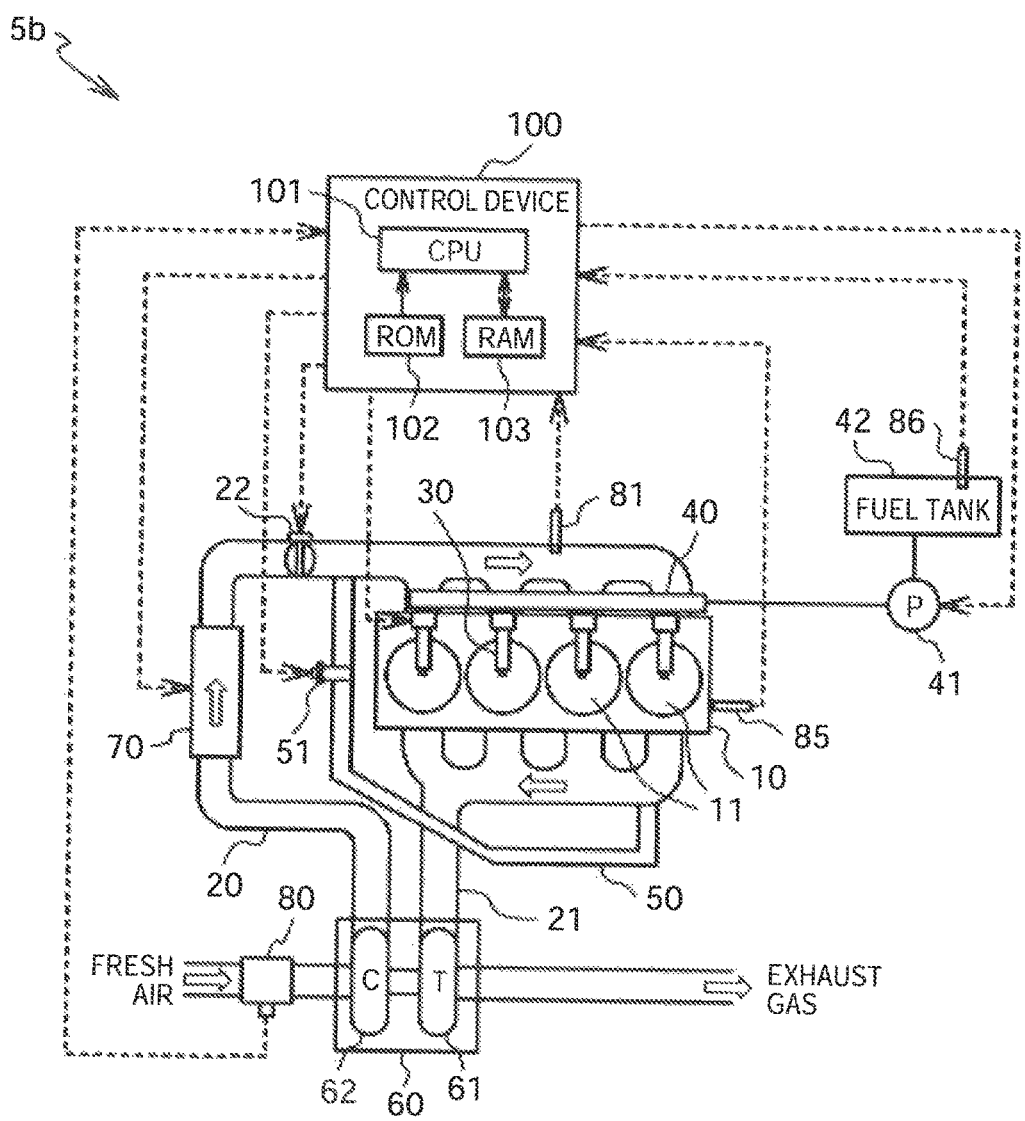
FIG. 21 is a schematic diagram illustrating an example of an internal combustion engine according to an eighth embodiment.

Hereinafter, the control device 100 for an internal combustion engine according to an eighth embodiment of the invention will be described. FIG. 21 is a schematic diagram illustrating an example of an internal combustion engine 5b to which the control device 100 according to this embodiment is applied. The internal combustion engine 5b that is illustrated in FIG. 21 differs from the internal combustion engine 5 of the first embodiment that is illustrated in FIG. 1 in that the internal combustion engine 5b is additionally provided with a fuel oxygen concentration detector 86. In addition, a crank position sensor 85, which is not illustrated in FIG. 1, is illustrated in FIG. 21. In addition, the internal combustion engine 5b that is illustrated in FIG. 21 differs from the internal combustion engine 5 in that the internal combustion engine 5b is not provided with the A/F sensor 82 and the in-cylinder pressure sensor 83. The configuration of the internal combustion engine 5b is not limited to the configuration in FIG. 21. For example, the internal combustion engine 5b may be provided with the A/F sensor 82 and the in-cylinder pressure sensor 83.

The fuel oxygen concentration detector 86 is an instrument that detects fuel oxygen concentration that is the oxygen concentration of the fuel of the internal combustion engine 5b or an index that has a correlation with the fuel oxygen concentration. The fuel oxygen concentration detector 86 according to this embodiment detects the oxygen concentration of the fuel that is stored in the fuel tank 42 and transmits the result of the detection to the control device 100. The specific place of the detection of the fuel oxygen concentration that is detected by the fuel oxygen concentration detector 86 is not limited to the fuel in the fuel tank 42 as in this embodiment insofar as the fuel oxygen concentration can be detected at the place.

A known sensor instrument that detects the oxygen concentration of a fuel, such as an instrument that detects the oxygen concentration of the fuel by, for example, infrared spectroscopy (FTIR), can be used as the fuel oxygen concentration detector 86. Alternatively, the fuel oxygen concentration can also be detected by the following method. The fuel oxygen concentration tends to increase as the concentration of the fuel containing oxygen (referred to as an oxygen-containing fuel), such as a bio fuel and an alcohol-containing fuel, increases, that is, as the concentration of the oxygen-containing fuel included in the diesel oil in this embodiment increases. A concentration sensor that detects the concentration of the oxygen-containing fuel of the diesel oil can also be used as the fuel oxygen concentration detector 86. In this case, the control device 100 may acquire the concentration of the oxygen-containing fuel of the diesel oil based on the detection result from the concentration sensor and may acquire the fuel oxygen concentration based on the acquired oxygen-containing fuel concentration. Various methods can be used as the method for acquiring the fuel oxygen concentration from the concentration of the oxygen-containing fuel, examples of which include, for example, a method for fuel oxygen concentration acquisition based on a map in which the concentration of the oxygen-containing fuel and the fuel oxygen concentration are defined in association with each other, a method for fuel oxygen concentration acquisition based on the use of a relational expression for the calculation of the fuel oxygen concentration from the fuel of the oxygen-containing fuel.

Figure 22:
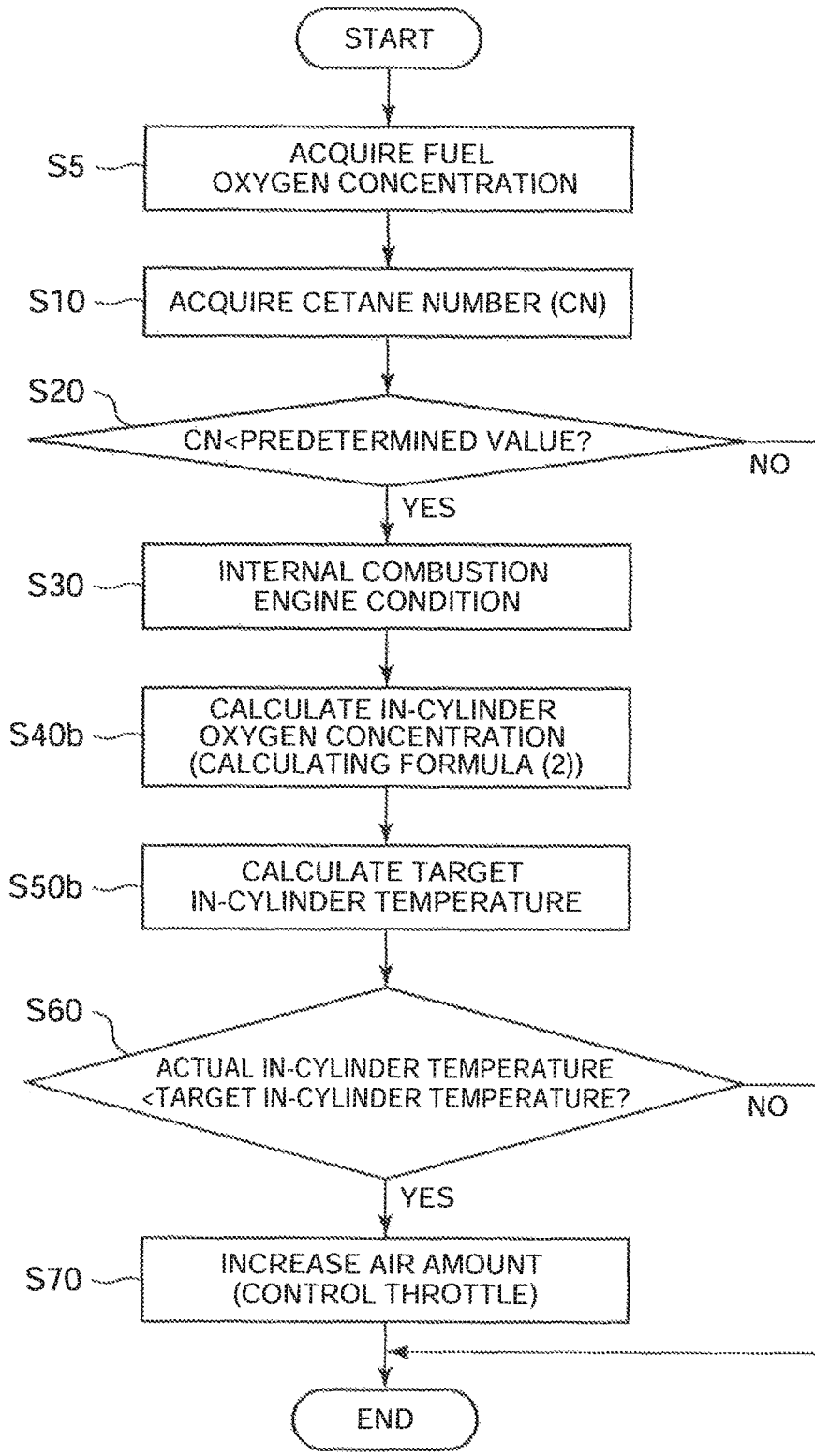
FIG. 22 is a diagram illustrating an example of a flowchart for the execution of in-cylinder oxygen concentration control by a control device according to the eighth embodiment.

FIG. 22 is a diagram illustrating an example of a flowchart for the execution of the in-cylinder oxygen concentration control by the control device 100 according to this embodiment. The control device 100 executes the flowchart in FIG. 22 during the execution of the pilot injection, more specifically, immediately before the execution of the pilot injection. The control device 100 repeatedly executes the flowchart in FIG. 22 at a predetermined cycle. The flowchart in FIG. 22 differs from the flowchart according to the first embodiment that is illustrated in FIG. 2 in that the flowchart in FIG. 22 is additionally provided with Step S5, is provided with Step S40b instead of Step S40, and is provided with Step S50b instead of Step S50.

In Step S5, the control device 100 acquires the fuel oxygen concentration. Specifically, the control device 100 according to this embodiment acquires the fuel oxygen concentration by acquiring the detection result from the fuel oxygen concentration detector 86. After Step S5, the control device 100 executes Step S10.

In Step S40b, the control device 100 calculates the in-cylinder oxygen concentration that is the oxygen concentration in the cylinders 11. The control device 100 according to this embodiment acquires the mol concentration (mol/cc) of the oxygen in the cylinders 11 as the in-cylinder oxygen concentration. Specifically, the control device 100 acquires the mol concentration of the oxygen in the cylinders 11 based on fuel oxygen amount that is the amount of the oxygen contained in the fuel, the amount of the air flowing into the cylinders 11 and the volume of the combustion chamber at the fuel injection timing. More specifically, the control device 100 acquires the mol concentration of the oxygen in the cylinders 11 based on the following equation (2).

mol concentration of the oxygen in the cylinders 11=((fuel oxygen amount+amount of the air flowing into the cylinders 11)×0.23))÷(32×volume of the combustion chamber at the fuel injection timing)     (2)

The control device 100 calculates the fuel oxygen amount for the equation (2) based on the fuel oxygen concentration that is acquired in Step S5. Specifically, the control device 100 uses the value obtained by multiplying the amount of the fuel that is injected during the pilot injection by the fuel oxygen concentration that is acquired in Step S5 as the fuel oxygen amount for the equation (2). In addition, the control device 100 uses, as the amount of the air flowing into the cylinders 11 for the equation (2), the air amount that is acquired in Step S30 (that is, the amount of the air flowing into the cylinders 11 during an intake stroke immediately before the pilot injection). The control device 100 uses the volume of the combustion chamber that is acquired in Step S30 (that is, the volume of the combustion chamber at pilot injection executing timing) as the volume of the combustion chamber at the fuel injection timing for the equation (2). As is apparent from the equation (2), the in-cylinder oxygen concentration that is calculated in Step S40b according to this embodiment has a higher value as the fuel oxygen amount increases as a result of an increase in the fuel oxygen concentration.

Then, the control device 100 calculates the target in-cylinder temperature during the main injection (Step S50b). Details of Step S50b will be described as follows with reference to drawings. As described with reference to FIG. 3(a) for the first embodiment, the in-cylinder temperature during the main injection (T° C.) at which the combustion state index is constant (specifically, the ignition delay is constant and the HC amount is also constant) regardless of the value of the cetane number is present. In Step S50b an FIG. 22, the control device 100 according to this embodiment calculates the in-cylinder temperature during the main injection (T° C.) at Which the combustion state index is constant regardless of the value of the cetane number as the target in-cylinder temperature during the main injection. Specifically, the control device 100 calculates the target in-cylinder temperature based on the in-cylinder oxygen concentration that is calculated in Step S40b. In calculating the target in-cylinder temperature based on the in-cylinder oxygen concentration in Step S50b, the control device 100 according to this embodiment calculates the target in-cylinder temperature by using a map to be described below to be specific.

FIG. 23(a) is a diagram visualizing a map that is used during the calculation of the target in-cylinder temperature according to this embodiment. The line 300 that is illustrated in FIG. 23(a) represents the in-cylinder temperature during the main injection at which the HC amount is constant regardless of the value of the cetane number. An in-cylinder temperature during the main injection at which the degree of the ignition delay is constant regardless of the cetane number can be used as the line 300 that is illustrated in FIG. 23(a). According to the line 300 in FIG. 23(a), the acquired target in-cylinder temperature decreases as the in-cylinder oxygen concentration increases. As described above, the map in FIG. 23(a) according to this embodiment is a map in which the target in-cylinder temperature and the in-cylinder oxygen concentration are defined in association with each other so that the acquired target in-cylinder temperature decreases as the in-cylinder oxygen concentration increases. This map is obtained in advance by an experiment, simulation, or the like and is stored in the storage unit of the control device 100.

In Step S50b, the control device 100 calculates the target in-cylinder temperature by extracting, from the map in the storage unit, the target in-cylinder temperature corresponding to the in-cylinder oxygen concentration that is calculated in Step S40b. For example, the control device 100 acquires $T_1$ as the target in-cylinder temperature in a case where the in-cylinder oxygen concentration calculated in Step S40b is $D_1$ and calculates $T_2$ as the target in-cylinder temperature in a case where the in-cylinder oxygen concentration is $D_2$. The in-cylinder oxygen concentration that is calculated based on the equation (2) as described above has a higher value as the fuel oxygen amount increases as a result of an increase in the fuel oxygen concentration, and this $D_2$ is higher in fuel oxygen concentration than $D_1$ in the map of FIG. 23(a). Accordingly, the target in-cylinder temperature that is calculated based on the map of FIG. 23(a) has a lower value as the fuel oxygen concentration increases. In other words, the control device 100 according to this embodiment decreases the calculated target in-cylinder temperature as the fuel oxygen concentration increases.

Herein, the control device 100 according to this embodiment calculates the target in-cylinder temperature based on the in-cylinder oxygen concentration as described above and, according to this embodiment, the fuel oxygen concentration that is acquired in Step S5 is used during the calculation of the in-cylinder oxygen concentration in the equation (2) as described above. Accordingly, it can be said that the control device 100 according to this embodiment acquires the target in-cylinder temperature based on a predetermined parameter including the fuel oxygen concentration (specifically, the amount of the air flowing into the cylinders 11 and the volume of the combustion chamber at the fuel injection timing according to the equation (2) in addition to the fuel oxygen concentration). In other words, in this embodiment, the in-cylinder oxygen concentration is a value that is calculated in view of the fuel oxygen concentration, and the target in-cylinder temperature is also a value that is calculated in view of the fuel oxygen concentration since the target in-cylinder temperature is calculated based on the in-cylinder oxygen concentration.

The calculation of the target in-cylinder temperature by the control device 100 is not limited to the above-described map-based target in-cylinder temperature calculation method. For example, the control device 100 may calculate the target in-cylinder temperature based on the in-cylinder oxygen concentration by using a predetermined relational expression defining a relationship between the in-cylinder oxygen concentration and the target in-cylinder temperature.

Referring to FIG. 22, the control device 100 acquires the actual in-cylinder temperature after Step S50b and determines (Step S60) whether or not the acquired actual in-cylinder temperature is lower than the target in-cylinder temperature that is acquired in Step S50b. Step S60 is similar to Step S60 in FIG. 2, and thus detailed description thereof will be omitted. In a case where it is not determined in Step S60 that the actual in-cylinder temperature is lower than the target in-cylinder temperature (case of No), the control device 100 terminates the execution of the flowchart. In this case, the control device 100 controls the opening of the throttle 22 to the normal value. Then, the control device 100 executes the pilot injection.

In a case where it is determined in Step S60 that the actual in-cylinder temperature is lower than the target in-cylinder temperature (case of Yes), the control device 100 controls the opening of the throttle 22 so that the amount of the air flowing into the cylinders 11 is increased (Step S70). Specifically, the control device 100 controls the opening of the throttle 22 to exceed the normal value (opening of the throttle 22 in the case of a No determination in Step S60) so that the throttle amount of the throttle 22 is decreased and the amount of the air flowing into the cylinders 11 is increased. The in-cylinder oxygen concentration during the pilot injection is increased since the amount of the air flowing into the cylinders 11 is increased. Step S70 is similar to Step S70 in FIG. 2, and thus detailed description thereof will be omitted.

In other words, the control device 100 according to this embodiment allows the in-cylinder oxygen concentration during the pilot injection to be higher in a case where the actual in-cylinder temperature is lower than the target in-cylinder temperature (in the case of Yes in Step S60) than in a case where the actual in-cylinder temperature is equal to or higher than the target in-cylinder temperature (in the case of No in Step S60). In this manner, the control device 100 according to this embodiment controls the in-cylinder oxygen concentration during the pilot injection that is performed prior to the main injection based on the difference between the target in-cylinder temperature and the actual in-cylinder temperature. Step S70 corresponds to the in-cylinder oxygen concentration control according to this embodiment.

The combustion in the cylinders 11 becomes active and the actual in-cylinder temperature rises as Step S70 is executed and the in-cylinder oxygen concentration is increased. Then, the difference between the target in-cylinder temperature and the actual in-cylinder temperature during the main injection can be decreased. In other words, the actual in-cylinder temperature can become closer to the target in-cylinder temperature that is calculated by a parameter including the fuel oxygen concentration. After Step S70, the control device 100 terminates the execution of the flowchart. Then, the control device 100 executes the pilot injection.

The CPU 101 of the control device 100 that acquires the fuel oxygen concentration in Step S5 corresponds to a fuel oxygen concentration acquisition unit that acquires the fuel oxygen concentration. The CPU 101 of the control device 100 that acquires the target in-cylinder temperature in Step S50b corresponds to the target in-cylinder temperature calculation unit that calculates the target in-cylinder temperature during the main injection based on a predetermined parameter including the fuel oxygen concentration. The CPU 101 of the control device 100 that acquires the actual in-cylinder temperature in Step S60 corresponds to the in-cylinder temperature acquisition unit that acquires the in-cylinder temperature. The CPU 101 of the control device 100 that executes the in-cylinder oxygen concentration control in Step S70 corresponds to the in-cylinder oxygen concentration control unit that executes the in-cylinder oxygen concentration control for controlling the in-cylinder oxygen concentration during the pilot injection based on the difference between the target in-cylinder temperature during the main injection calculated by the target in-cylinder temperature calculation unit and the in-cylinder temperature acquired by the in-cylinder temperature acquisition unit.

Hereinafter, effects of the control device 100 according to this embodiment will be described after unique objects of this embodiment are described. First of all, the oxygen concentration in the fuel is higher in a case where the oxygen-containing fuel is used as the fuel of the internal combustion engine 5b than in a case where the oxygen-containing fuel is not used. In a case where the oxygen concentration in the fuel becomes higher than an initially-assumed oxygen concentration in this case, the in-cylinder temperature may become excessively greater than the initially-assumed value. As a result, emission of the internal combustion engine 5b may be deteriorated and combustion noise may also be deteriorated.

According to the control device 100 of this embodiment, in contrast, it can be said that the target in-cylinder temperature according to this embodiment is a temperature calculated in view of the fuel oxygen concentration since the parameter that is used during the calculation of the target in-cylinder temperature includes the fuel oxygen concentration as described with reference to Step S50b. As a result, according to the control device 100 of this embodiment, the in-cylinder oxygen concentration during the pilot injection is controlled based on the difference between the target in-cylinder temperature that is calculated in view of the fuel oxygen concentration and the in-cylinder temperature (actual in-cylinder temperature) that is acquired by the in-cylinder temperature acquisition unit. In this manner, deterioration of the emission and the combustion noise of the internal combustion engine 5b can be suppressed even in a case where an oxygen-containing fuel having a low cetane number is used as the fuel.

More specifically, according to the control device 100 of this embodiment, the in-cylinder oxygen concentration during the pilot injection is allowed to be higher in a case where the in-cylinder temperature (actual in-cylinder temperature) acquired by the in-cylinder temperature acquisition unit is lower than the target in-cylinder temperature during the main injection calculated by the target in-cylinder temperature calculation unit as described with reference to Step S70 than in a case where the in-cylinder temperature is equal to or higher than the target in-cylinder temperature, and thus the in-cylinder temperature can become closer to the target in-cylinder temperature that is calculated in view of the fuel oxygen concentration. As a result, an excessive rise in the in-cylinder temperature can be suppressed and deterioration of the emission and deterioration of the combustion noise can be suppressed even in a case where an oxygen-containing fuel having a low cetane number is used as the fuel.

According to the control device 100 of this embodiment, the in-cylinder temperature during the main injection at which the combustion state index is constant regardless of the value of the cetane number is used as the target in-cylinder temperature as described with reference to FIG. 23(a), and thus deterioration of the emission can be reliably suppressed in a case where a fuel having a low cetane number is used.

According to the control device 100 of this embodiment, the target in-cylinder temperature is calculated based on the in-cylinder oxygen concentration that is calculated based on the equation (2), and thus fuel economy deterioration can be minimized. The reason for this is as follows. FIG. 23(b) is a schematic diagram illustrating a relationship between the target in-cylinder temperature and the fuel economy of the internal combustion engine 5b. The horizontal axis in FIG. 23(b) represents the target in-cylinder temperature, and the vertical axis in FIG. 23(b) represents the degree of fuel economy deterioration. As illustrated in FIG. 23(b), the fuel economy tends to be deteriorated as the target in-cylinder temperature increases. Accordingly, it may be impossible to suppress the deterioration of the emission of a case where a fuel having a low cetane number is used in a case where the target in-cylinder temperature is simply set to be increased so as to suppress the deterioration of the emission of a case where a fuel having a low cetane number is used (that is, in a case where the target in-cylinder temperature is set to be simply increased without being based on the calculating formula as in this embodiment). In this case, however, the fuel economy may be deteriorated. According to this embodiment, however, the target in-cylinder temperature is calculated based on the in-cylinder oxygen concentration that is calculated based on the equation (2) as described above, and thus fuel economy deterioration can be suppressed.

According to the control device 100 of this embodiment, the amount of the air flowing into the cylinders 11 is increased when the in-cylinder oxygen concentration during the pilot injection is increased in Step S70. Herein, the actual in-cylinder temperature can be raised by increasing the pilot injection amount (fuel injection amount during the pilot injection) as well. As a result, the actual in-cylinder temperature can become closer to the target in-cylinder temperature. Accordingly, the control device 100 may raise the actual in-cylinder temperature by, for example, increasing the pilot injection amount instead of increasing the amount of the air flowing into the cylinders 11 by the control of the throttle 22 in Step S70. However, the combustion of the fuel in the cylinders is considered to be significantly affected by the in-cylinder oxygen concentration, and the control of the air amount based on the throttle 22 is considered to be a method particularly effective for the control of the in-cylinder oxygen concentration. Accordingly, the in-cylinder oxygen concentration during the pilot injection can be more effectively increased in a case where the amount of the air flowing into the cylinders 11 is controlled based on the control of the throttle 22 as in this embodiment than in a case where the pilot injection amount is increased, and thus it can be said that the control of the amount of the air flowing into the cylinders 11 based on the control of the throttle 22 as in this embodiment is more preferable in that the actual in-cylinder temperature can become closer, more effectively, to the target in-cylinder temperature.

Figure 23:
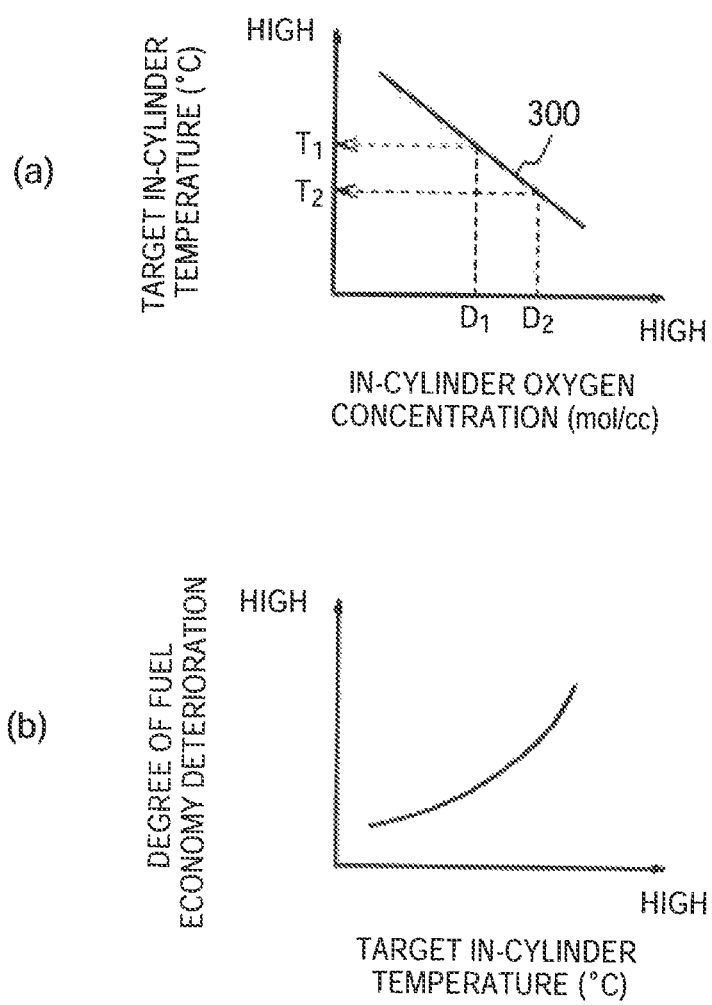
FIG. 23(a) is a diagram visualizing a map that is used during the calculation of a target in-cylinder temperature according to the eighth embodiment.
FIG. 23(b) is a schematic diagram illustrating a relationship between the target in-cylinder temperature and fuel economy of the internal combustion engine.

According to the control device 100 of this embodiment, the calculated target in-cylinder temperature decreases as the fuel oxygen concentration increases as described with reference to FIG. 23(*a*). Herein, the amount of heat generation resulting from the combustion in the cylinders 11 increases as the fuel oxygen concentration increases, and thus the in-cylinder temperature rises as well. Accordingly, the target in-cylinder temperature may decrease as the fuel oxygen concentration increases. Accordingly, an appropriate target m-cylinder temperature in accordance with the fuel oxygen concentration can be calculated according to this configuration. In this manner, deterioration of the emission and the combustion noise of the internal combustion engine 5*b* can be effectively suppressed in accordance with the fuel oxygen concentration.

According to the control device 100 of this embodiment, the in-cylinder oxygen concentration control according to Step S70 is executed in a case where the cetane number is equal to or less than a predetermined value (specifically, in the case of a Yes determination in Step S20). According to this configuration, the in-cylinder oxygen concentration control can be executed in a case where a fuel having a cetane number that is so low as to cause the misfire in the internal combustion engine 5*b* is actually used.

Ninth Embodiment

Figure 24:
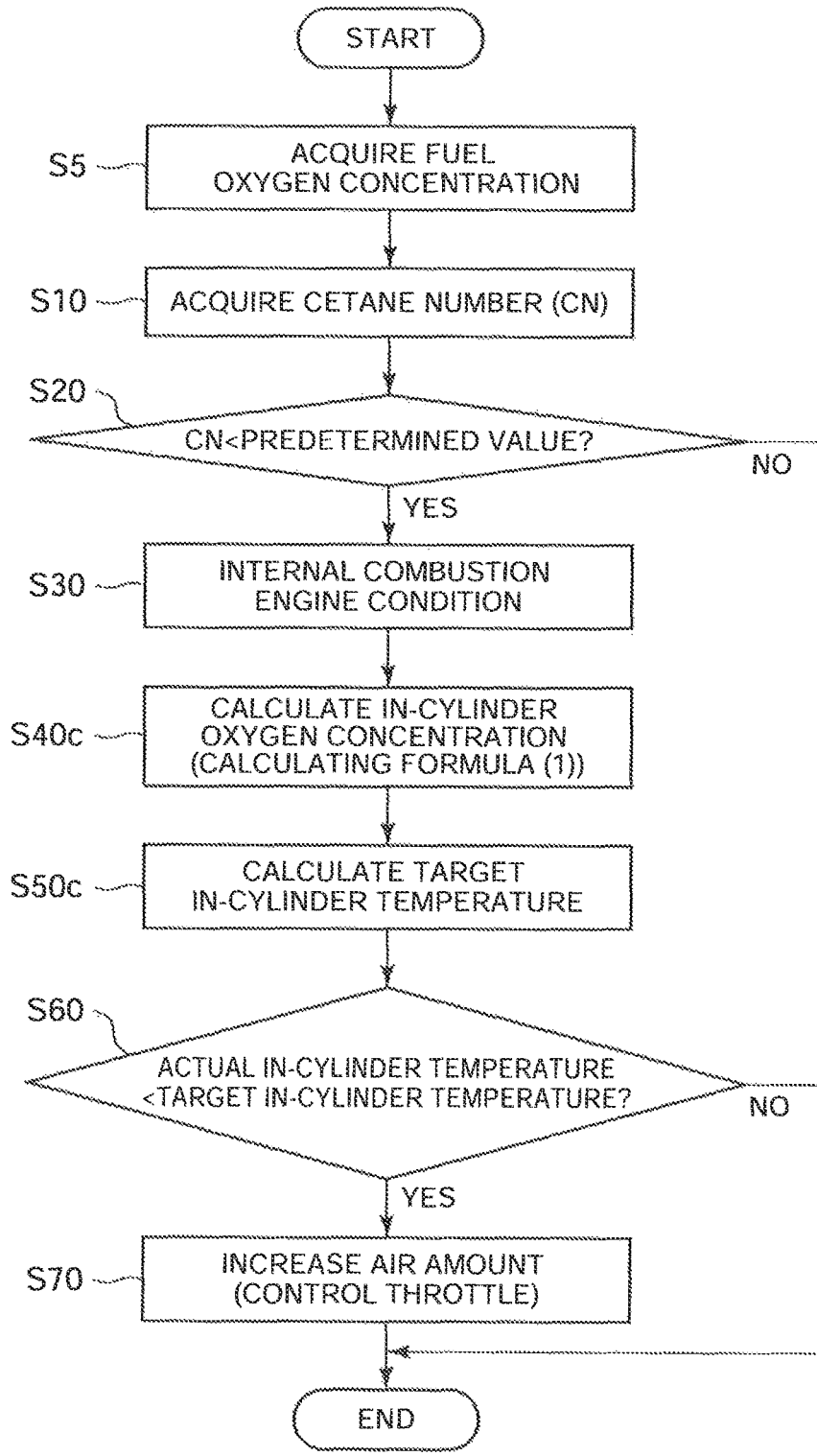
FIG. 24 is a diagram illustrating an example of a flowchart for the execution of in-cylinder oxygen concentration control by a control device according to a ninth embodiment.

Hereinafter, the control device 100 for an internal combustion engine according to a ninth embodiment of the invention will be described. The hardware configuration of the control device 100 according to this embodiment and the hardware configuration of the internal combustion engine 5*b* to which the control device 100 according to this embodiment is applied are similar to the control device 100 and the internal combustion engine 5*b* illustrated in FIG. 21 for the eighth embodiment. The control device 100 according to this embodiment is different from the control device 100 according to the eighth embodiment in that the flowchart in FIG. 24 to be described below is executed instead of the flowchart for the fifth embodiment in FIG. 22. FIG. 24 is a diagram illustrating an example of a flowchart for the execution of the in-cylinder oxygen concentration control by the control device 100 according to this embodiment. The flowchart in FIG. 24 is different from the flowchart in FIG. 22 in that Step S40*c* is provided instead of Step S40*b* and Step S50*c* is provided instead of Step S50*b*.

In Step S40*c*, the control device 100 calculates the in-cylinder oxygen concentration based on the amount of the air flowing into the cylinders 11 and the volume of the combustion chamber at the fuel injection timing. Specifically, the control device 100 calculates the in-cylinder oxygen concentration based on the equation (1) described above for the first embodiment. This equation (1) differs from the equation (2) for the eighth embodiment in that the fuel oxygen amount is included in the numerator on the right-hand side. In other words, the control device 100 according to this embodiment calculates the in-cylinder oxygen concentration without using the fuel oxygen concentration that is acquired in Step S5.

After Step S40*c*, the control device 100 executes Step S50*c*. In Step S50*c*, the control device 100 calculates the target in-cylinder temperature during the main injection. Step S50*c* according to this embodiment is identical to Step S50*b* according to the eighth embodiment in that the in-cylinder temperature during the main injection (T° C.) at which the combustion state index is constant regardless of the value of the cetane number is calculated as the target in-cylinder temperature but differs from Step S50*b* according to the eighth embodiment regarding the target in-cylinder temperature calculation method.

Figure 25:
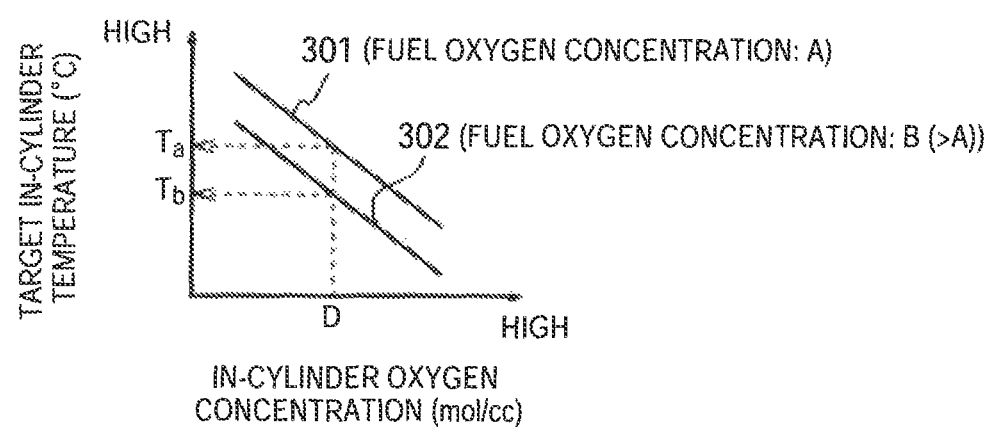
FIG. 25 is a diagram visualizing a map that is used during the calculation of a target in-cylinder temperature according to the ninth embodiment.

FIG. 25 is a diagram visualizing a map that is used during the calculation of the target in-cylinder temperature according to this embodiment. The line 301 that is illustrated in FIG. 25 represents the in-cylinder temperature during the main injection at which the HC amount is constant regardless of the value of the cetane number in a case where the fuel oxygen concentration is A. The line 302 represents the in-cylinder temperature during the main injection at which the HC amount is constant regardless of the value of the cetane number in a case where the fuel oxygen concentration is B (B has a value exceeding that of A). According to both the line 301 and the line 302, the target in-cylinder temperature decreases as the in-cylinder oxygen concentration increases. In addition, on the vertical axis, the line 302 is positioned below the line 301. Accordingly, the map of FIG. 25 is a map in which the target in-cylinder temperature is defined in association with the in-cylinder oxygen concentration and the fuel oxygen concentration so that the calculated target in-cylinder temperature decreases as the in-cylinder oxygen concentration increases and the calculated target in-cylinder temperature decreases as the fuel oxygen concentration increases. The map of FIG. 25 is obtained in advance by an experiment, simulation, or the like and is stored in the storage unit.

In Step S50*c*, the control device 100 according to this embodiment selects, from the map of FIG. 25, the line that corresponds to the fuel oxygen concentration which is acquired in Step S5, and calculates the target in-cylinder temperature by extracting, from the selected line, the target in-cylinder temperature corresponding to the in-cylinder oxygen concentration calculated in Step S40*c*. For example, the control device 100 selects the line 301 in FIG. 25 in a case where the fuel oxygen concentration that is acquired in Step S5 is A. Then, the control device 100 acquires $T_a$ as the target in-cylinder temperature in a case where the in-cylinder oxygen concentration that is calculated in Step S40*c* is D. In a case where the fuel oxygen concentration that is acquired in Step S5 is B (>A), the control device 100 selects the line 302 in FIG. 25. Then, the control device 100 acquires $T_b$ as the target in-cylinder temperature in a case where the in-cylinder oxygen concentration that is calculated in Step S40c is D.

Although only the two lines are illustrated in FIG. 25, it is preferable that more lines are set in actuality to correspond to predicted fuel oxygen concentrations. It can be considered that the line that directly corresponds to the fuel oxygen concentration that is acquired in Step S5 is not present in the map of FIG. 25 even in a case where multiple lines are set as described above. In this case, however, the control device 100 may select, for example, the line for the value that is the closest to the value of the fuel oxygen concentration which is acquired in Step S5.

As described above, the control device 100 according to this embodiment uses the fuel oxygen concentration as well as the in-cylinder oxygen concentration (in-cylinder oxygen concentration calculated without using the fuel oxygen concentration in this embodiment) as a predetermined parameter that is used during the calculation of the target in-cylinder temperature according to Step S50c. In other words, even in this embodiment, the predetermined parameter that is used in the calculation of the target in-cylinder temperature includes the fuel oxygen concentration. Specifically, the fuel oxygen concentration and the amount of the air flowing into the cylinders 11 and the volume of the combustion chamber at the fuel injection timing used in the equation (1) are used as the predetermined parameters used in the calculation of the target in-cylinder temperature. In addition, even in this embodiment, the control device 100 decreases the calculated target in-cylinder temperature as the fuel oxygen concentration increases since the calculated target in-cylinder temperature decreases as the fuel oxygen concentration increases according to the map of FIG. 25.

The control device 100 according to this embodiment can achieve effect similar to those of the eighth embodiment. Specifically, the in-cylinder oxygen concentration during the pilot injection is controlled based on the difference between the target in-cylinder temperature calculated in view of the fuel oxygen concentration and the in-cylinder temperature (actual in-cylinder temperature) acquired by the in-cylinder temperature acquisition unit even in the control device 100 according to this embodiment, and thus deterioration of the emission and the combustion noise of the internal combustion engine 5b can be suppressed even in a case where an oxygen-containing fuel having a low cetane number is used as the fuel. In addition, the in-cylinder temperature during the main injection at which the combustion state index is constant regardless of the value of the cetane number is used as the target in-cylinder temperature even in this embodiment, and thus deterioration of the emission can be reliably suppressed in a case where a fuel having a low cetane number is used. In addition, according to the control device 100 of this embodiment, the target in-cylinder temperature is calculated based on the in-cylinder oxygen concentration calculated based on the equation (1) and the fuel oxygen concentration acquired in Step S5, and thus fuel economy deterioration can be suppressed, compared to a case where the target in-cylinder temperature is set to be simply increased, because of a reason similar to that in the description of FIG. 23(b) according to the eighth embodiment.

Even in the control device 100 according to this embodiment, the amount of the air flowing into the cylinders 11 is increased when the in-cylinder oxygen concentration during the pilot injection is increased in Step S70, and thus the in-cylinder oxygen concentration during the pilot injection can be effectively increased, and the actual in-cylinder temperature can become closer to the target in-cylinder temperature effectively. Even in the control device 100 according to this embodiment, the calculated target in-cylinder temperature decreases as the fuel oxygen concentration increases in Step S50c, and thus an appropriate target in-cylinder temperature can be calculated in accordance with the fuel oxygen concentration. Accordingly, deterioration of the emission and the combustion noise of the internal combustion engine 5b can be effectively suppressed in accordance with the fuel oxygen concentration. Even in this embodiment, the in-cylinder oxygen concentration control according to Step S70 is executed in a case where the cetane number is equal to or less than a predetermined value (in the case of a Yes determination in Step S20), and thus the in-cylinder oxygen concentration control can be executed in a case where a fuel having a low cetane number that is so low as to cause the misfire in the internal combustion engine 5b is actually used.

Preferred embodiments of the invention have been described in detail. However, the invention is not limited to the specific embodiments. The invention can be changed and modified in various forms without departing from the scope of the invention described in the claims.

REFERENCE SIGNS LIST

5 INTERNAL COMBUSTION ENGINE
10 ENGINE MAIN BODY
11 CYLINDER
20 INTAKE PASSAGE
21 EXHAUST PASSAGE
22 THROTTLE
30 FUEL INJECTION VALVE
40 COMMON RAIL
50 EGR PASSAGE
51 EGR VALVE
60 SUPERCHARGER
70 INTERCOOLER
100 CONTROL DEVICE

The invention claimed is:

1. A control device for an internal combustion engine, the control device comprising:
an electronic control device configured to
i) acquire an in-cylinder oxygen concentration as the oxygen concentration in a cylinder of the internal combustion engine,
ii) acquire an in-cylinder temperature as the temperature in the cylinder,
iii) acquire a target in-cylinder temperature during main injection based on the in-cylinder oxygen concentration, and
iv) execute in-cylinder oxygen concentration control for controlling an in-cylinder oxygen concentration during pilot injection performed prior to the main injection based on a difference between the target in-cylinder temperature during the main injection and the in-cylinder temperature.

2. The control device for an internal combustion engine according to claim 1,
wherein the electronic control device is configured to decrease the target in-cylinder temperature as the in-cylinder oxygen concentration increases.

3. The control device for an internal combustion engine according to claim 1, wherein the electronic control device is configured to increase the target in-cylinder temperature as the cetane number of a fuel used in the internal combustion engine decreases.

4. The control device for an internal combustion engine according to claim 1,
wherein the internal combustion engine is provided with a throttle arranged in an intake passage and an EGR valve arranged in an EGR passage, and
wherein the electronic control device is configured to control the EGR valve to be closed after decreasing a throttle amount in a case where the in-cylinder oxygen concentration during the pilot injection is increased, the EGR valve is open, and the throttle amount of the throttle exceeds a predetermined value.

5. The control device for an internal combustion engine according to claim 1,
wherein the electronic control device is configured to execute the in-cylinder oxygen concentration control in a case where the cetane number of the fuel used in the internal combustion engine is equal to or less than a predetermined value.

6. The control device for an internal combustion engine according to claim 1,
wherein the electronic control device is configured to control an additional injection amount as the amount of fuel injection during additional injection after the main injection in accordance with an increment in the in-cylinder oxygen concentration during the execution of the in-cylinder oxygen concentration control.

7. The control device for an internal combustion engine according to claim 1,
wherein the electronic control device is configured to allow the in-cylinder oxygen concentration during the pilot injection to be higher in a case where the in-cylinder temperature is lower than the target in-cylinder temperature during the main injection than in a case where the in-cylinder temperature is equal to or higher than the target in-cylinder temperature.

8. The control device for an internal combustion engine according to claim 7,
wherein the electronic control device is configured to increase an amount of air flowing into the cylinder in increasing the in-cylinder oxygen concentration during the pilot injection.

* * * * *